(12) United States Patent
Fukuda et al.

(10) Patent No.: US 11,891,780 B2
(45) Date of Patent: Feb. 6, 2024

(54) WORKING MACHINE

(71) Applicant: KUBOTA CORPORATION, Osaka (JP)

(72) Inventors: Yuji Fukuda, Osaka (JP); Ryota Hamamoto, Osaka (JP); Jun Tomita, Osaka (JP); Yuya Konishi, Osaka (JP); Kazuki Ueda, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 409 days.

(21) Appl. No.: 17/397,154

(22) Filed: Aug. 9, 2021

(65) Prior Publication Data

US 2022/0049465 A1  Feb. 17, 2022

(30) Foreign Application Priority Data

Aug. 15, 2020 (JP) ................. 2020-137165
Aug. 15, 2020 (JP) ................. 2020-137166
Aug. 5, 2021 (JP) ................. 2021-129155

(51) Int. Cl.
   *E02F 9/22* (2006.01)
   *F16H 61/423* (2010.01)
   (Continued)

(52) U.S. Cl.
   CPC .......... *E02F 9/2235* (2013.01); *E02F 9/2246* (2013.01); *E02F 9/2253* (2013.01);
   (Continued)

(58) Field of Classification Search
   CPC .. E02F 9/2246; E02F 9/2253; F16H 61/4008; F16H 61/4138; F16H 61/421; F16H 61/423; F16H 61/47
   See application file for complete search history.

(56) References Cited

U.S. PATENT DOCUMENTS 6,915,631 B2 * 7/2005 Kado .................... F16H 61/438
                                                      60/423
7,686,737 B2 * 3/2010 Nishi .................... F16H 61/423
                                                      477/68
(Continued)

FOREIGN PATENT DOCUMENTS

| JP | 2008-045639 A | 2/2008 |
| JP | 2017-179922 A | 10/2017 |
| JP | 2018-062848 A | 4/2018 |

OTHER PUBLICATIONS

Office Action dated Jun. 20, 2023 in Japanese family member Patent Appl. No. 2020-137165, with an English translation thereof.

*Primary Examiner* — Michael Leslie
(74) *Attorney, Agent, or Firm* — Greenblum & Bernstein, P.L.C.

(57) ABSTRACT

A working machine includes a prime mover, a traveling pump configured to deliver hydraulic fluid at a flow rate corresponding to an angle of the swashplate, a traveling motor configured to be rotated by the hydraulic fluid delivered from the traveling pump so as to have a rotation speed shiftable between a first speed and a second speed higher than the first speed, a traveling change-over valve shiftable between a first state to set the rotation speed of the traveling motor to the first speed and a second state to set the rotation speed of the traveling motor to the second speed, an operation device, an operation valve configured to change the angle of the swashplate of the traveling pump according to operation of the operation device, an actuation valve provided upstream or downstream of the operation valve and fluidly connected to the operation valve, and a controller configured or programmed to output a control signal to control the actuation valve in such a way that, when the traveling change-over valve is shifted from the second state to the first state, a value of the control signal is reduced from (Continued)

a set value to a mitigation value less than the set value and then restores to the set value. The controller is configured or programmed to reduce the value of the control signal from the set value to the mitigation value for a mitigation period in such a way that a first reduction rate that is a rate of reducing the value of the control signal for a first part of the mitigation period between a start point thereof and an intermediate point thereof larger than a second reduction rate that is a rate of reducing the value of the control signal for a second part of the mitigation period between the intermediate point thereof and an end point thereof.

20 Claims, 19 Drawing Sheets

(51) Int. Cl.
*F16H 61/421* (2010.01)
*F16H 61/47* (2010.01)
*F16H 61/4008* (2010.01)
*E02F 3/34* (2006.01)

(52) U.S. Cl.
CPC .......... *E02F 9/2267* (2013.01); *E02F 9/2296* (2013.01); *F16H 61/4008* (2013.01); *F16H 61/421* (2013.01); *F16H 61/423* (2013.01); *F16H 61/47* (2013.01); *E02F 3/3414* (2013.01); *E02F 9/2285* (2013.01); *E02F 9/2289* (2013.01)

(56) References Cited

U.S. PATENT DOCUMENTS

| | | | |
|---|---|---|---|
| 10,451,097 B2 * | 10/2019 | Brännström | F16B 12/26 |
| 11,236,491 B2 * | 2/2022 | Fukuda | E02F 9/2289 |
| 11,384,511 B2 * | 7/2022 | Ooruchi | F16H 61/4078 |
| 11,635,141 B2 * | 4/2023 | Hamamoto | E02F 9/2285 |
| | | | 60/484 |
| 11,788,255 B2 * | 10/2023 | Fukuda | F16H 61/44 |
| | | | 701/50 |

* cited by examiner

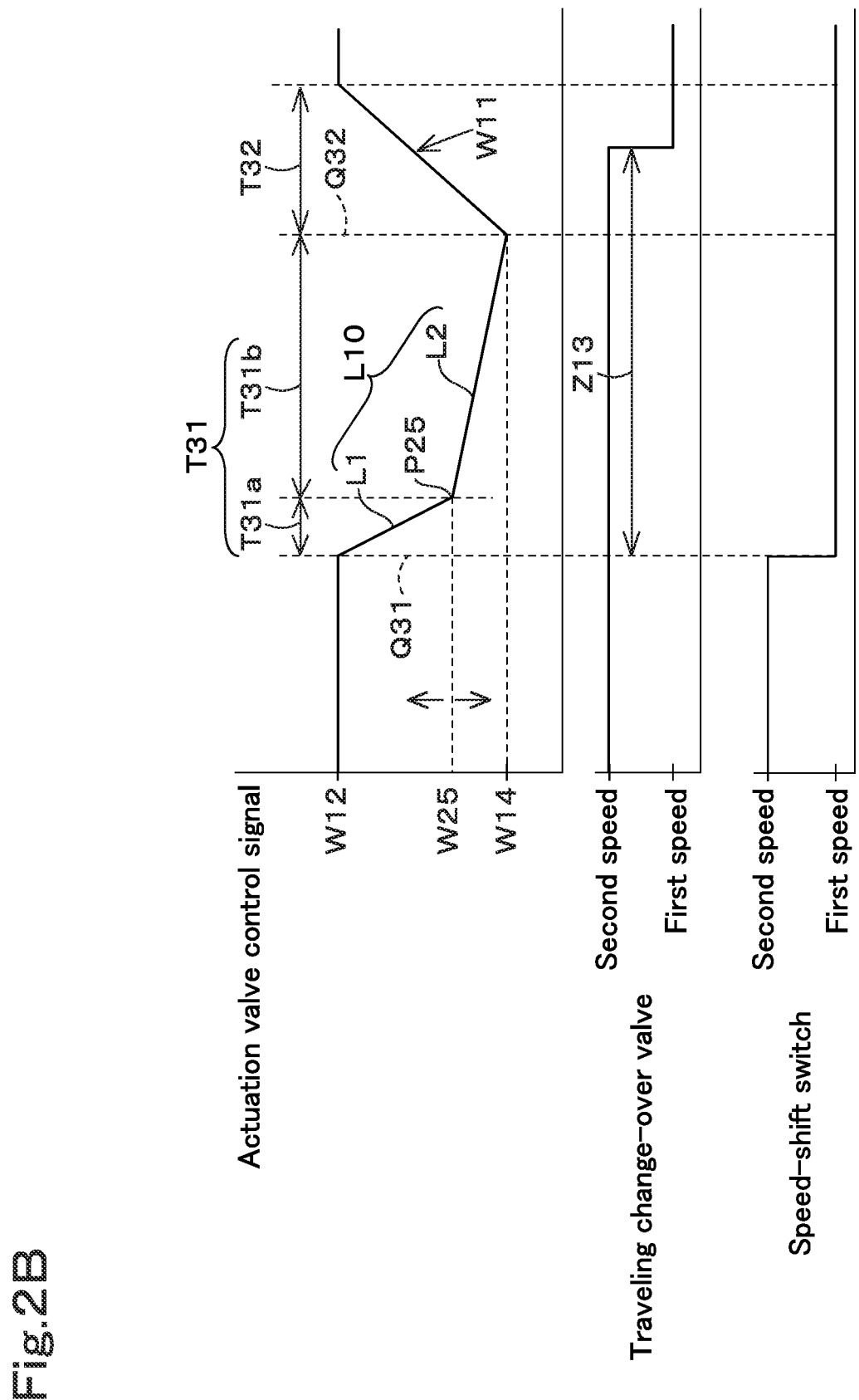

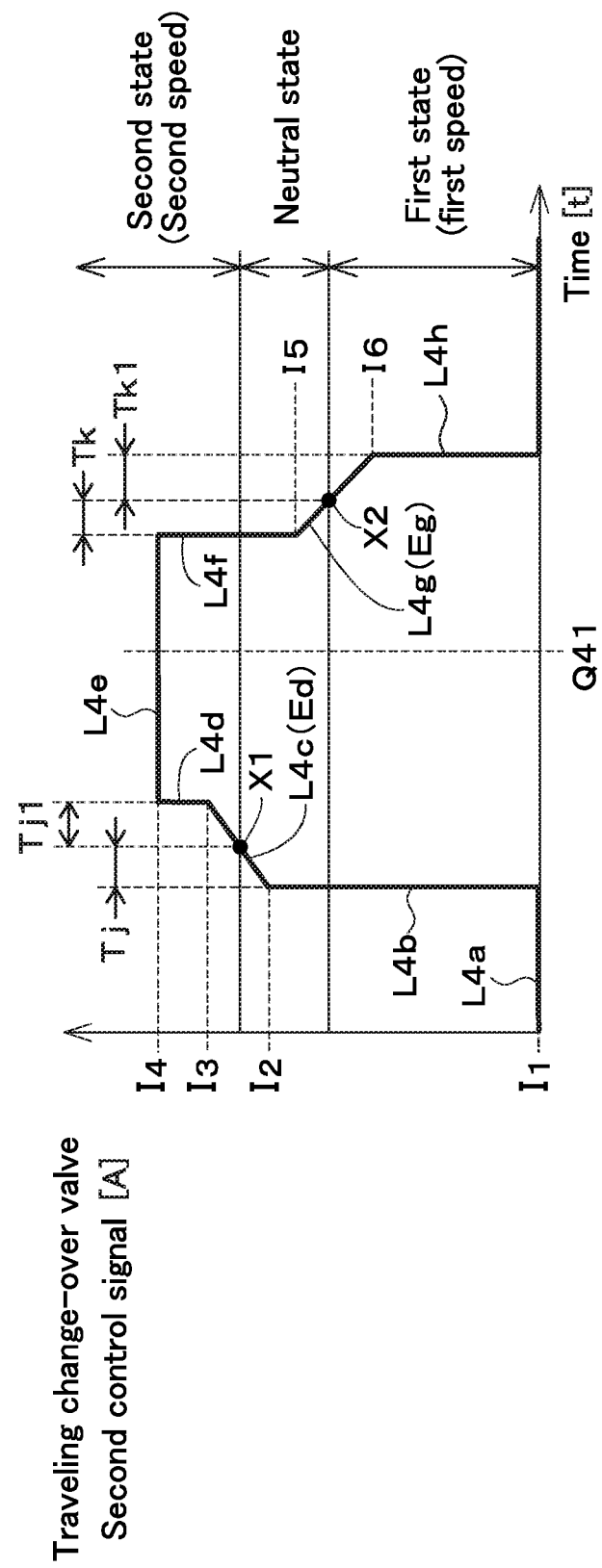

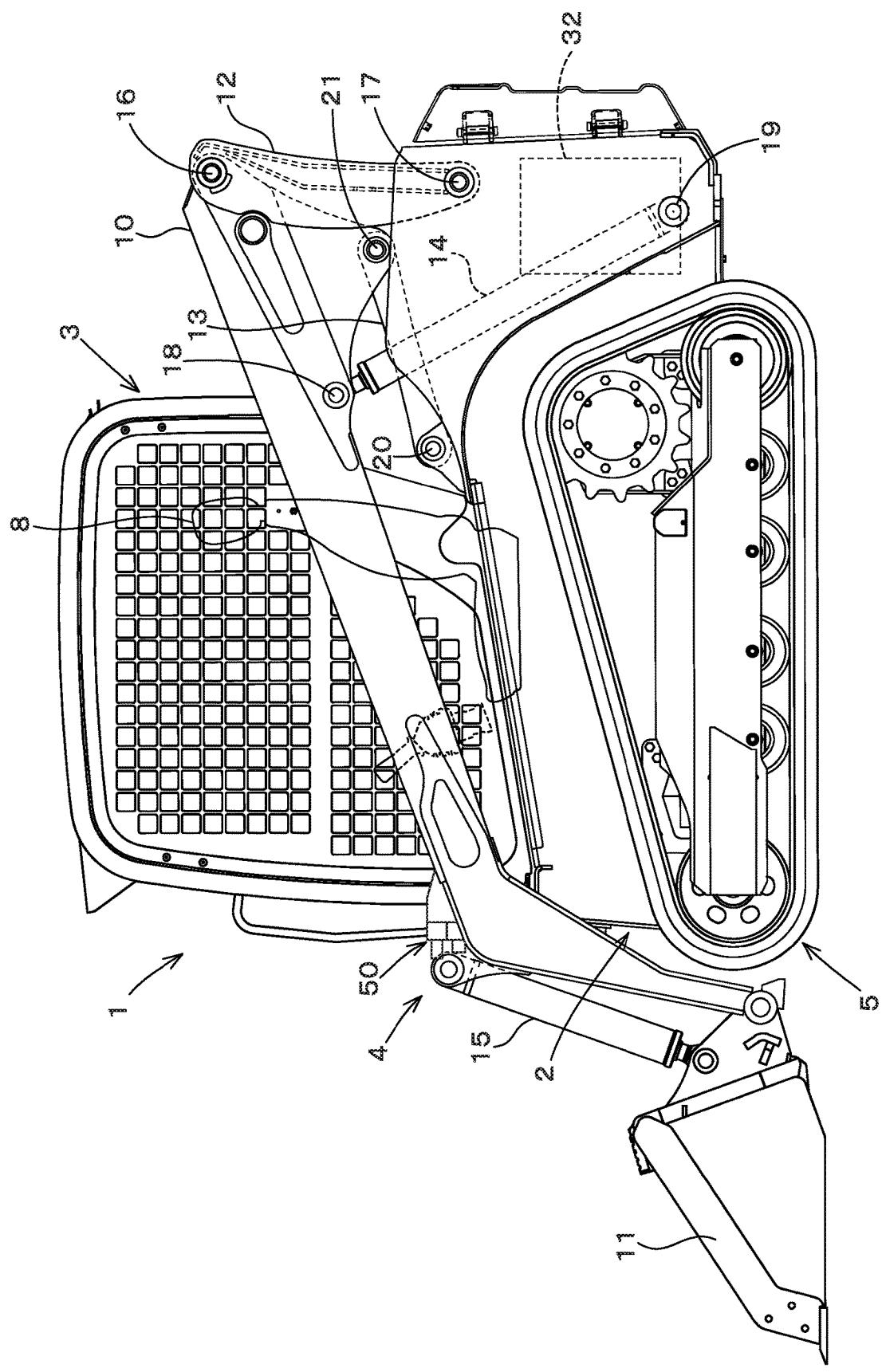

WORKING MACHINE

FIELD OF THE INVENTION

The present invention relates to a working machine such as a skid steer loader, a compact track loader, or a backhoe.

DESCRIPTION OF THE RELATED ART

A technique for performing deceleration and acceleration in a working machine is disclosed in Japanese Unexamined Patent Publication No. 2017-179922. The working machine and a hydraulic system for the working machine disclosed in Japanese Unexamined Patent Publication No. 2017-179922 include a prime mover, a hydraulic pump actuated by an operation of the prime mover and configured to deliver hydraulic fluid, a hydraulic change-over valve configured to be shifted between a plurality of switching positions according to a pressure of the hydraulic fluid, a proportional valve configured to control the hydraulic fluid applied to the hydraulic change-over valve, a traveling hydraulic device configured to shift a speed according to a shifted position of the hydraulic change-over valve, and a controller configured to control the proportional valve according to a traveling state of the working machine or a state of the prime mover.

SUMMARY OF THE INVENTION

In the working machine of Japanese Unexamined Patent Publication No. 2017-179922, a bleed fluid passage is disposed in a pressure-receiving portion of the hydraulic change-over valve, which makes it possible to mitigate a speed-shift shock in acceleration and deceleration of the working machine. However, in Japanese Unexamined Patent Publication No. 2017-179922, the bleed fluid passage has to be disposed to mitigate the speed-shift shock, which increases the number of parts. In addition, there is a need to mitigate the speed-shift shock more sufficiently in a traveling motor that does not have a neutral position.

In addition, in the working device of Japanese Unexamined Patent Publication No. 2017-179922, the speed-shift shock (impact, discomfort) is mitigated because pressure characteristics in the shifting of the hydraulic change-over valve are changed in the speed shift to the deceleration in the working machine. However, depending on a traveling speed of the working machine, a delivering amount of the hydraulic fluid delivered from the hydraulic pump and a speed of the traveling hydraulic system may change suddenly before and after the speed shift, and the speed-shift shock may be failed to be effectively mitigated.

To solve the problems of the conventional technique described above, the present invention intends to provide a working device capable of mitigating a speed-shift shock while ensuring responsiveness in deceleration.

In addition, to solve the problems of the conventional technique described above, the present invention intends to efficiently mitigate the speed-shift shock in the speed shift of the working machine.

Means of Solving the Problems

The technical means adopted by the present invention to solve the technical problems are as follows.

A working machine includes a traveling pump including a swashplate and configured to deliver hydraulic fluid and change a flow rate of the hydraulic fluid delivered therefrom in correspondence to an angle of the swashplate, a traveling motor configured to be rotated by the hydraulic fluid delivered from the traveling pump so as to have a rotation speed shiftable between a first speed and a second speed higher than the first speed, a traveling change-over valve shiftable between a first state to set the rotation speed of the traveling motor to the first speed and a second state to set the rotation speed of the traveling motor to the second speed, an operation device, an operation valve configured to change the angle of the swashplate of the traveling pump according to operation of the operation device, an actuation valve provided upstream or downstream of the operation valve and fluidly connected to the operation valve, and a controller configured or programmed to output a control signal to control the actuation valve in such a way that, when the traveling change-over valve is shifted from the second state to the first state, a value of the control signal is reduced from a set value to a mitigation value less than the set value and then restores to the set value. The controller is configured or programmed to reduce the value of the control signal from the set value to the mitigation value for a mitigation period in such a way that a first reduction rate that is a rate of reducing the value of the control signal for a first part of the mitigation period between a start point thereof and an intermediate point thereof larger than a second reduction rate that is a rate of reducing the value of the control signal for a second part of the mitigation period between the intermediate point thereof and an end point thereof.

The controller includes a setting unit configured or programmed to set a first line representing the first reduction rate that is a first reduction amount per unit time kept constant for the first part of the mitigation period between the start point thereof and the intermediate point thereof, and to set a second line representing the second reduction rate that is a second reduction amount per unit time kept constant for the second part of the mitigation period between the intermediate point thereof and the end point thereof, the second reduction amount being less than the first reduction amount, and a control unit configured or programmed to control the first reduction rate and the second reduction rate based on the first line and the second line set by the setting unit.

The control unit is configured or programmed to control the first reduction rate and the second reduction rate based on the first line and the second line when a traveling load is not less than a predetermined threshold value.

The setting unit is configured or programmed to change the value of the control signal at a bending point defined as a boundary point between the first line and the second line based on the traveling load when the traveling change-over valve is shifted from the second state to the first state.

The setting unit is configured or programmed to adopt, as the traveling load, the highest pressure of the hydraulic pressure delivered from the traveling pump.

The setting unit is configured or programmed to shift the value of the control signal at the bending point toward the set value as the traveling load becomes larger, and to shift the value of the control signal at the bending point toward the mitigation value as the traveling load becomes smaller.

The controller is configured or programmed to restore, after the reduced value of the control signal reaches the mitigation value, the set value of the control signal by increasing the value of the control signal at a restoration amount per unit time, the restoration amount per unit time being larger than the second reduction amount per unit time that is the second reduction rate.

A working machine includes a prime mover, a traveling pump configured to change a flow rate of hydraulic fluid delivered according to an angle of a swashplate thereof, a traveling motor configured to be rotated by the hydraulic fluid delivered from the traveling pump so as to have a rotation speed shiftable between a first speed and a second speed higher than the first speed, a traveling change-over valve shiftable between a first state to set the rotation speed of the traveling motor to the first speed and a second state to set the rotation speed of the traveling motor to the second speed, an operation device, an operation valve configured to change an angle of the swashplate of the traveling pump according to operation of the operation device, an actuation valve disposed upstream or downstream of the operation valve, a controller configured or programmed to increase a control signal for controlling the actuation valve to an increased value higher than a set value and then restore the control signal in shifting the traveling change-over valve from the second state to the first state, wherein, in an increasing period the control signal reaches the increased value from the set value, the controller increases a first increase rate of the control signal in a period from the starting of the increase period to an intermediate point of the increase period to be higher than a second increase rate of the control signal in a period from the intermediate point of the increase period to the end of the increase period.

The controller includes a setting unit configured or programmed to set a first line having a constant first increase amount per unit time and representing the first increase rate in the period from the starting to the intermediate point and a second line having a second increase amount per unit time smaller than the first increase amount and representing the second increase rate in the period from the intermediate point to the end, and a control unit configured or programmed to control the first increase speed and the second increase speed based on the first and second lines set by the setting unit.

The control unit controls the first increase rate and the second increase rate based on the first and second lines when a traveling load is not less than a preliminarily-determined threshold.

The setting unit changes a value of a control signal at a bending point based on the traveling load given when the traveling change-over valve is shifted from the second state to the first state, the bending point being a boundary line between the first line and the second line.

The setting unit shifts a value of a control signal at the bending point toward the set value as the traveling load is increased and shifts a value of a control signal at the bending point toward the increase value as the traveling load is reduced.

In restoring the control signal after the control signal has reached the increase value, the controller increases a restoration amount per unit time in the restoration to be larger than a second increase amount per unit time of the second increase rate.

A working machine includes a prime mover, a traveling pump driven by power of the prime mover so as to deliver hydraulic fluid, a traveling motor configured to be rotated by the hydraulic fluid delivered from the traveling pump so as to have a rotation speed shiftable between a first speed and a second speed higher than the first speed, a machine body provided thereon with the prime mover, the traveling pump and the traveling motor, a traveling change-over valve shiftable between a first state to set the rotation speed of the traveling motor to the first speed and a second state to set the rotation speed of the traveling motor to the second speed, a speed-shift switch operable to issue a speed-shift command that is either one of an acceleration command to shift the rotation speed of the traveling motor from the first speed stage to the second speed stage and a deceleration command to shift the rotation speed of the traveling motor from the second speed stage to the first speed stage, an actuation valve configured to control hydraulic fluid flowing to the traveling pump, and a controller configured or programmed to selectively perform either automatic deceleration to shift the traveling change-over valve from the second state to the first state or manual deceleration to shift the traveling change-over valve from the second state to the first state according to the speed-shift command issued by the speed-shift switch. The controller is configured or programmed to be capable of performing a first shock mitigation control to reduce an opening degree of the actuation valve and a second shock mitigation control to reduce the rotation speed of the prime mover.

The controller is configured or programmed to perform the first shock mitigation control when performing the automatic deceleration, and to perform the first shock mitigation control or the second shock mitigation control when performing the automatic deceleration.

The controller is configured or programmed to perform the first shock mitigation control in addition to the second shock mitigation control when performing the manual deceleration.

The controller is configured or programmed to set the opening degree of the actuation valve in the first shock mitigation control when performing the manual deceleration as smaller than the opening degree of the actuation valve in the first shock mitigation control when performing the automatic deceleration.

The actuation valve is configured to change the opening degree thereof in correspondence to a control signal output from the controller. The controller is configured or programmed to perform the first shock mitigation control by reducing a value of the control signal to a first mitigation value, and to perform the second shock mitigation control by reducing the rotation speed of the prime mover to a second mitigation value less than a target rotation speed of the prime mover.

In the mitigation period in which the control signal output to the actuation valve reaches the mitigation value from the set value, the controller, when performing the first shock mitigation control, is configured or programmed to reduce the value of the control signal from the set value to the mitigation value for a mitigation period in such a way that a first reduction rate that is a rate of reducing the value of the control signal for a first part of the mitigation period between a start point thereof and an intermediate point thereof larger than a second reduction rate that is a rate of reducing the value of the control signal for a second part of the mitigation period between the intermediate point thereof and an end point thereof.

The controller, when performing the second shock mitigation control, is configured or programmed to reduce an actual rotation speed of the prime mover for a second mitigation period until the reduced actual rotation speed reaches the mitigation value in such a way that a third reduction rate of that is a rate of reducing the actual rotation speed of the prime mover be kept constant for the second mitigation period until the actual rotation speed reaches the mitigation value.

The working machine includes a first traveling device disposed on a left portion of the machine body, and a second traveling device disposed on a right portion of the machine body. The traveling motor includes a first traveling motor configured to transmit a traveling power to the first traveling device, and a second traveling motor configured to transmit a traveling power to the second traveling device. The traveling pump is configured to activate the first traveling motor and the second traveling motor. The traveling change-over valve is configured to shift the first traveling motor and the second traveling motor between the first speed and the second speed.

A working machine includes a traveling device travelably supporting a machine body, a traveling pump to deliver hydraulic fluid, a traveling motor configured to be rotated by the hydraulic fluid delivered from the traveling pump so as to output power to the traveling device, a traveling change-over valve configured to shift an operation state thereof so as to shift a rotation speed of the traveling motor, an actuation valve configured to change an operation state thereof so as to change the delivery rate of hydraulic fluid delivered from the traveling pump, and a controller to control the traveling change-over valve and the actuation valve. The controller, when shifting the rotation speed of the traveling motor, is configured or programmed to output a first control signal to control the operation state of the actuation valve and change a control value of the first control signal output therefrom in such a way that the control value of the first control signal is changed to a mitigation value such as to reduce the delivery rate of hydraulic fluid delivered from the traveling pump to a value less than that corresponding to a set value of the control value, and then is set to the set value, and during the changing of the control value of the first control signal, the controller is configured or programmed to perform a shock mitigation control for mitigating a speed-shift shock by shifting the operation state of the traveling change-over valve, and to change a value of a control parameter for performing the shock mitigation control in correspondence to a traveling speed of the machine body.

The controller is configured or programmed to change, in correspondence to the traveling speed of the machine body, the first change rate at which a control value of the first control signal is changed to the mitigation value, the first change rate being defined as the control parameter.

The controller increases the first change rate as a traveling speed of the machine body is increased.

The controller is configured or programmed to change, in correspondence to the traveling speed of the machine body, a delay time for which an operation state of the traveling change-over valve is shifted, the delay time being defined as the control parameter.

The controller is configured or programmed to elongate the delay time according to increase of a traveling speed of the machine body.

The controller is configured or programmed to change, in correspondence to the traveling speed of the machine body, the first change amount in which a control value of the first control signal is changed to the mitigation value, the first change amount being defined as the control parameter.

The controller is configured or programmed to increase the first change amount according to increase of the traveling speed of the machine body.

The working machine includes a prime mover serving as a power source for the traveling pump, and a first detection device configured to detect a rotation speed of the prime mover. A value of either a first change rate or a first change amount of changing the control value of the first control signal to the mitigation value or a length of a delay time of shifting the operation state of the traveling change-over valve after start of changing the control value of the first control signal toward the mitigation value is defined as the control parameter, and the controller is configured or programmed to change the first change rate, the first change amount or the delay time defined as the control parameter in correspondence to the rotation speed of the prime mover detected by the first detection device.

The controller is configured or programmed to increase the first change rate or the first change amount or elongate the delay time according to increase of the rotation speed of the prime mover.

The traveling change-over valve is shiftable between a first state to set the rotation speed of the traveling motor to a first speed and a second state to set the rotation speed of the traveling motor to a second speed faster than the first speed. The controller, when performing the shock mitigation control in reduction of the rotation speed of the traveling motor from the second speed to the first speed, is configured or programmed to change a control value of the first control signal to the mitigation value before setting the set value, and to shift the traveling change-over valve from the second state to the first state during the change of the control value of the first control signal from the mitigation value to the set value.

The traveling change-over valve is shiftable between a first state in which a rotation speed of the traveling motor is shifted to a first speed and a second state in which the rotation speed is shifted to a second speed higher than the first speed. In the shock mitigation control in accelerating the rotation speed of the traveling motor from the first speed to the second speed, the controller temporarily changes a control value of the first control signal to the mitigation value and then sets the control value to the set value, and shifts the traveling change-over valve from the first state to the second state during changing of the first control signal to the mitigation value.

The working machine includes an operation device configured to operate the traveling device, and an operation valve configured to change an angle of a swashplate of the traveling pump according to operation of the operation device. The actuation value is constituted of a solenoid proportional valve disposed in a fluid passage fluidly connected upstream of the operation valve or a fluid passage connected downstream of the operation valve. The controller inputs, as the first control signal, an electric current signal to the actuation valve.

The working machine includes a speed-shift switch operable to issue a speed-shift command. The controller is configured or programmed to selectively perform either automatic speed-shift to automatically shift the rotation speed of the traveling motor or manual speed-shift to shift the rotation speed of the traveling motor according to the speed-shift command issued by the speed-shift switch. The controller, when performing each of the automatic speed-shift and the manual speed-shift, is configured or programmed to perform the shock mitigation control, and the controller is configured or programed to change a value of the control parameter in each of the automatic speed-shift and the manual speed-shift.

The controller is configured or programmed to selectively perform either automatic deceleration to automatically reduce the rotation speed of the traveling motor when a predetermined deceleration condition is satisfied or manual deceleration to reduce the rotation speed of the traveling motor according to the speed-shift command issued by the speed-shift switch. The controller, when performing each of the automatic deceleration and the manual deceleration, is configured or programmed to change a control value of a second control signal input to a proportional solenoid valve serving as the traveling change-over valve so as to shift the traveling change-over valve into a state to reduce the rotation speed of the traveling motor. A second change rate of changing a control value of the second control signal and a length of a shifting period included in the delay time, the shifting period extending from start of changing the control value of the second control signal until the operation state of the traveling change-over valve is completely shifted, and the controller, when performing each of the automatic deceleration and the manual deceleration, is configured or programmed to change a value of the second change rate and a length of the shifting period, which are each defined as the value of the control parameter.

The controller is configured or programmed to selectively perform either automatic acceleration to automatically increase the rotation speed of the traveling motor when a predetermined acceleration condition is satisfied or manual acceleration to increase the rotation speed of the traveling motor according to the speed-shift command issued by the speed-shift switch. The controller, when performing each of the automatic acceleration and the manual acceleration, is configured or programmed to change the control value of the second control signal input to the proportional solenoid valve serving as the traveling change-over valve so as to shift the traveling change-over valve into a state to increase the rotation speed of the traveling motor. The controller is configured or programmed to change the value of the second change rate as the control parameter and the length of the shifting period as the control parameter in each of the automatic acceleration and the manual acceleration. The controller is configured or programmed so that the second change rate of changing the control value of the second control signal when performing the automatic deceleration is greater than the second change rate of changing the control value of the second control signal when performing the manual deceleration, or the second change rate of changing the control value of the second control signal when performing the automatic acceleration is greater than the second change rate of changing the control value of the second control signal when performing the manual acceleration, and the shifting period when performing the automatic speed-shift is shorter than the shifting period when performing the manual speed-shift.

The controller is configured or programmed to selectively perform either automatic acceleration to automatically increase the rotation speed of the traveling motor when a predetermined acceleration condition is satisfied or manual acceleration to increase the rotation speed of the traveling motor according to the acceleration command issued by the speed-shift switch. The controller, when performing each of the automatic acceleration and the manual acceleration, is configured or programmed to change the control value of the second control signal input to the proportional solenoid valve serving as the traveling change-over valve so as to shift the traveling change-over valve into a state to increase the rotation speed of the traveling motor. The controller is configured or programmed to change the value of the second change rate as the control parameter and the length of the shifting period as the control parameter in each of the automatic acceleration and the manual acceleration.

The controller changes the second change rate of the second control signal and the shifting period according to a traveling speed of the machine body.

In respectively performing the automatic speed-shift and the manual speed-shift, the controller changes a control value of a second control signal input to the traveling change-over valve constituted of a solenoid proportional valve, shifts the traveling change-over valve to a state in which rotation speeds of the traveling motor is shifted, sets change in the control value of the second control signal in performing the manual speed-shift to be slower than change in change in the control value of the second control signal in performing the automatic speed-shift, and sets a waveform of the second control signal in performing the manual speed-shift to be more moderate than a waveform of the second control signal in performing the automatic speed-shift.

The working machine includes a second detection device configured to detect a traveling load applied to the traveling motor. The traveling change-over valve shiftable between a first state to set a rotation speed of the traveling motor to the first speed and a second state to set the rotation speed of the traveling motor to the second speed. The controller shifts the traveling change-over valve from the second state to the first state to perform automatic deceleration to automatically decelerate a rotation speed of the traveling motor from the second speed to the first speed, shifts the traveling change-over valve from the first state to the second state during or immediately after the automatic deceleration when the traveling load detected by the second detection device is not less than a restoration threshold, automatically restores the rotation speed of the traveling motor to a speed before the automatic deceleration, and sets the restoration threshold to be higher than the traveling load detected by the second detection device in normal traveling of the machine body.

According to the present invention, a speed-shift shock can be mitigated while ensuring responsiveness in deceleration.

In addition, the present invention makes it possible to easily mitigate a speed-shift shock.

In addition, the present invention is capable of effectively mitigating the speed-shift shock in speed shift of a working machine.

BRIEF DESCRIPTION OF THE DRAWINGS

FIG. 2B is a view showing the relationship among the control signal to the actuation value, the traveling change-over valve, and the speed-shift switch in the manual acceleration.

FIG. 9A is a view showing an example of change of a second control signal in an automatic speed-shift.

FIG. 13 is a side view showing the working machine.

DETAILED DESCRIPTION OF THE PREFERRED EMBODIMENTS

Figure 1:
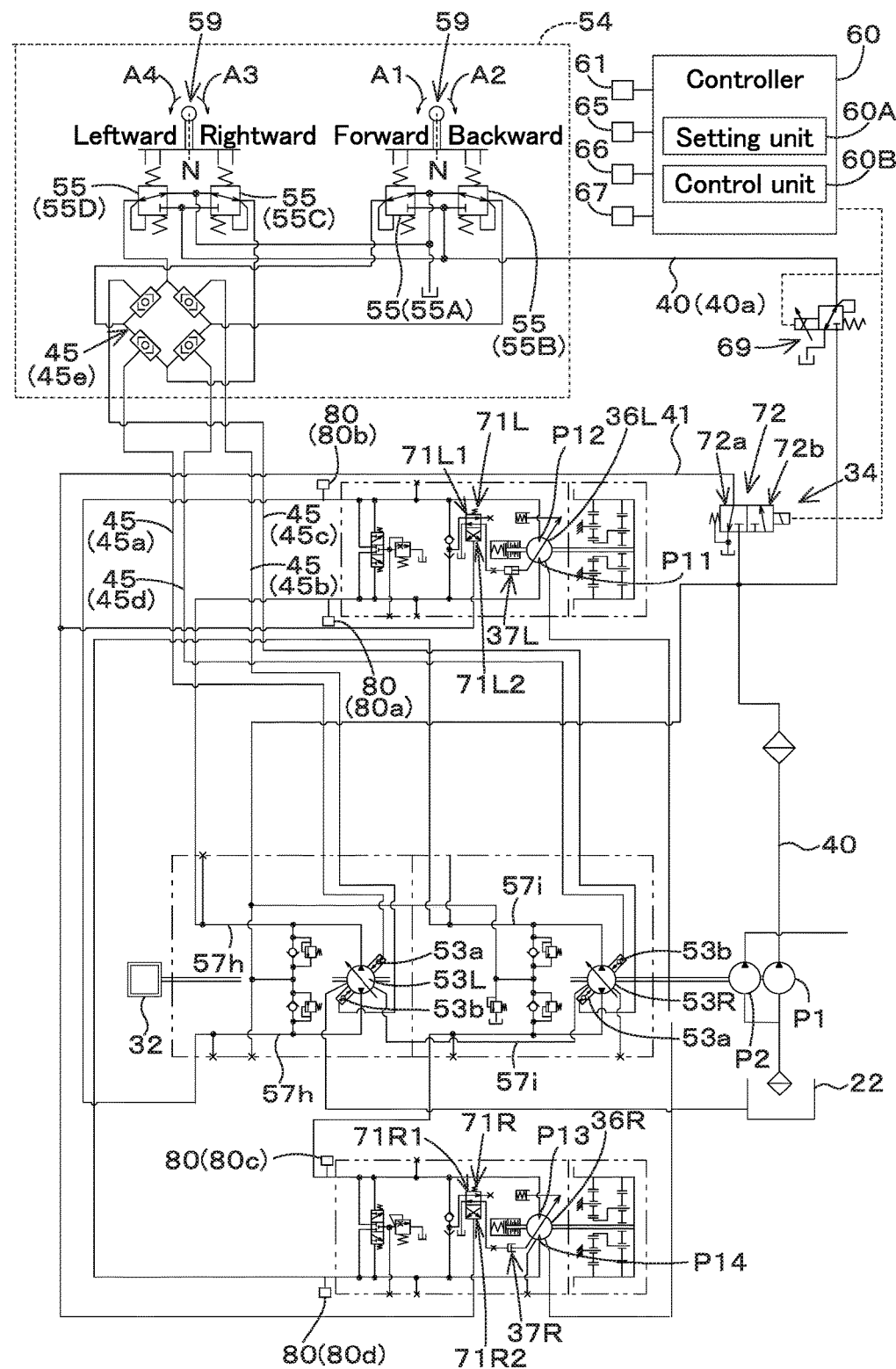
FIG. 1 is a view showing a hydraulic system for a working machine.

A preferred embodiment of a working machine according to the present invention will be described below with reference to drawings.

FIG. 13 is a side view of a working machine 1 according to an embodiment of the present invention. In the embodiment, a compact track loader shown in FIG. 13 is shown as an example of the working machine 1. Accordingly, the working machine according to the present invention is not limited to the compact track loader. The working machine may be another typed loader, such as a skid steer loader. The working machine may be any other than loaders.

The working machine 1 includes a machine body 2, a cabin 3, a working device 4, and traveling devices 5. In the embodiment of the present invention, a forward direction from an operator siting on an operator's seat 8 of the working machine 1 (a left side in FIG. 13) is referred to as the front, a rearward direction from the operator (a right side in FIG. 13) is referred to as the rear, a leftward direction from the operator (a front surface side of FIG. 13) is referred to as the left, and a rightward direction from the operator (a back surface side of FIG. 13) is referred to as the right.

In addition, a horizontal direction orthogonal to a fore-and-aft direction is referred to as a machine width direction. A direction from a center portion of the machine body 2 toward the right or left portion is described as a machine outward direction. In other words, the machine outward direction is the machine width direction and a direction separating away from the machine body 2. A direction opposite to the machine outward direction is described as a machine inward direction. In other words, the machine inward direction is the machine width direction and is a direction approaching the machine body 2.

The cabin 3 is mounted on the machine body 2. The cabin 3 incorporates the driver seat 8. The working device 4 is attached to the machine body 2. Traveling devices 5 are disposed on the right and left outsides of the machine body 2. A prime mover 32 is mounted inside a rear portion of the machine body 2.

The working device 4 includes booms 10, a working tool 11, lift links 12, control links 13, boom cylinders 14, and bucket cylinders 15.

The booms 10 are arranged on right and left sides of the cabin 3 swingably up and down. The working tool 11 is a bucket, for example. The bucket 11 is disposed at tip portions (front end portions) of the booms 10 movably up and down. The lift links 12 and the control links 13 support base portions (rear portions) of the booms 10 so that the booms 10 can be swung up and down. The boom cylinders 14 are extended and contracted to lift and lower the booms 10. The bucket cylinders 15 are extended and contracted to swing the bucket 11.

Front portions of the right and left booms 10 are connected to each other by a deformed connecting pipe. Base portions (rear portions) of the booms 10 are connected to each other by a circular connecting pipe.

The lift links 12, control links 13, and boom cylinders 14 are disposed on right and left sides of the machine body 2 to correspond to the right and left booms 10.

The lift links 12 are extended vertically from rear portions of the base portions of the booms 10. Upper portions (one ends) of the lift links 12 are pivotally supported on the rear portion of the base portions of the booms 10 via respective pivot shafts 16 (first pivot shafts) rotatably around their lateral axes. In addition, lower portions (the other ends) of the lift links 12 are pivotally supported on a rear portion of the machine body 2 via respective pivot shafts 17 (second pivot shafts) rotatably around their lateral axes. The second pivot shafts 17 are disposed below the first pivot shafts 16.

Upper portions of the boom cylinders 14 are pivotally supported via respective pivot shafts 18 (third pivot shafts) rotatably around their lateral axes. The third pivot shafts 18 are disposed at the base portions of the booms 10, especially, at front portions of the base portions. Lower portions of the boom cylinders 14 are pivotally supported respective pivot shafts 19 (fourth pivot shafts) rotatably around their lateral axes. The fourth pivot shafts 19 are disposed closer to a lower portion of the rear portion of the machine body 2 and below the third pivot shafts 18.

The control links 13 are disposed in front of the lift links 12. One ends of the control links 13 are pivotally supported via respective pivot shafts 20 (fifth pivot shafts) rotatably around their lateral axes. The fifth pivot shafts 20 are disposed on the machine body 2 forward of the lift links 12. The other ends of the control links 13 are pivotally supported via respective pivot shafts 21 (sixth pivot shafts) rotatably around their lateral axes. The sixth pivot shafts 21 are disposed on the booms 10 forwardly upward of the second pivot shafts 17.

By extending and contracting the boom cylinders 14, the booms 10 are swung up and down around the first pivot shafts 16 with the base portions of the booms 10 being supported by the lift links 12 and the control links 13, thereby lifting and lowering the tip end portions of the booms 10. The control links 13 are swung up and down around the fifth pivot shafts 20 by the vertical swinging of the booms 10. The lift links 12 are swung back and forth around the second pivot shafts 17 by the vertical swinging of the control links 13.

An alternative working tool instead of the bucket 11 can be attached to the front portions of the booms 10. The other working tool is, for example, an attachment (an auxiliary attachment) such as a hydraulic crusher, a hydraulic breaker, an angle broom, an earth auger, a pallet fork, a sweeper, a mower or a snow blower.

A connecting member 50 is disposed at the front portion of the left boom 10. The connecting member 50 is a device configured to connect a hydraulic equipment attached to the auxiliary attachment to a first piping member such as a pipe disposed on one of the booms 10. Specifically, the first piping member can be connected to one end of the connecting member 50, and a second piping member connected to the hydraulic equipment of the auxiliary attachment can be connected to the other end. In this manner, hydraulic fluid flowing in the first piping member flows through the second piping member and is supplied to the hydraulic equipment.

The bucket cylinders 15 are arranged respectively closer to the front portions of the booms 10. The bucket cylinders 15 are extended and contracted to swing the bucket 11. In this embodiment, each of the traveling devices 5 (first traveling device and second traveling device) disposed on the left and right portions is a crawler type (including semi-crawler type) traveling device. Wheel-type traveling device having front wheels and rear wheels may also be adopted. The traveling devices 5 supports travelably the machine body 2.

The prime mover 32 is an internal combustion engine such as a diesel engine or a gasoline engine, an electric motor, or the like. In the embodiment, the prime mover 32 is the diesel engine, but is not limited thereto.

FIG. 1 is a view showing a hydraulic system (hydraulic circuit) disposed in the working machine 1.

The hydraulic system for the working machine 1 shown in FIG. 1 is a hydraulic system configured to drive the traveling devices 5. The hydraulic system for the working machine 1 includes the first traveling pump 53L, the second traveling pump 53R, the first traveling motor 36L, and the second traveling motor 36R.

The first traveling pump 53L and the second traveling pump 53R are pumps to be driven by a power of prime mover 32. Specifically, each of the first traveling pump 53L and the second traveling pump 53R is a variable displacement axial pump with a swashplate and is driven by the power of prime mover 32. Each of the first traveling pump 53L and the second traveling pump 53R includes a pressure-receiving portion 53a and a pressure-receiving portion 53b to which pilot pressures are applied. Angles of the swashplates are changed by the pilot pressures applied to the pressure-receiving portions 53a and 53b. By changing the angle of the swashplate, outputs (delivery rates) of the first and second traveling pumps 53L and 53R and delivery directions of the hydraulic fluid can be changed.

The first traveling pump 53L and the first traveling motor 36L are fluidly connected by a circulation fluid passage 57h, and the hydraulic fluid delivered from the first traveling pump 53L is supplied to the first traveling motor 36L. The second traveling pump 53R and the second traveling motor 36R are fluidly connected by a circulation fluid passage 57i, and the hydraulic fluid delivered from the second traveling pump 53R is supplied to the second traveling motor 36R.

The first traveling motor 36L is a hydraulic motor configured to output a power to a drive shaft of the traveling device 5 disposed on the left portion of the machine body 2.

The first traveling motor 36L is capable of being rotated by the hydraulic fluid delivered from the first traveling pump 53L. A rotation speed (number of rotations) of the first traveling motor 36L can be changed by changing a flow rate of the hydraulic fluid. A swashplate switching cylinder 37L is connected to the first traveling motor 36L. By extending and contracting the swashplate switching cylinder 37L in one direction or the other direction, a rotation speed (number of rotations) of the first traveling motor 36L can be changed.

That is, when the swashplate switching cylinder 37L is contracted, the rotation speed of the first traveling motor 36L is set to a low-speed stage (first speed). When the swashplate switching cylinder 37L is extended, a rotation speed of the first traveling motor 36L is set to a high-speed stage (second speed). That is, a rotation speed of the first traveling motor 36L can be changed between the first speed that is a low speed range (a predetermined low speed range) and the second speed that is a high speed range (a predetermined high speed range).

The second traveling motor 36R is a hydraulic motor configured to output a power to a drive shaft of the traveling device 5 disposed on the right portion of the machine body 2. The second traveling motor 36R is capable of being rotated by the hydraulic fluid delivered from the second traveling pump 53R. The rotation speed (number of rotations) of the second traveling motor 36R can be changed due to a flow rate of hydraulic fluid. A swashplate switching cylinder 37R is connected to the second traveling motor 36R. By extending and contracting the swashplate switching cylinder 37R in one direction or the other direction, a rotation speed (number of rotations) of the second traveling motor 36R can be changed.

That is, when the swashplate switching cylinder 37R is contracted, the rotation speed of the second traveling motor 36R is set to a low-speed stage (first speed). When the swashplate switching cylinder 37R is extended, a rotation speed of the second traveling motor 36R is set to a high-speed stage (second speed). That is, a rotation speed of the second traveling motor 36R can be changed between the first speed that is a low speed stage and the second speed that is a high speed side.

As shown in FIG. 1, the hydraulic system for the working machine 1 includes a traveling change-over valve 34. The traveling change-over valve 34 is configured to take either a first state for shifting the rotation speed (number of rotations) of each of the traveling motors (traveling motor 36L and traveling motor 36R) to the first speed (low speed) or a second stage for shifting the rotation speed to the second speed (high speed). The traveling change-over valve 34 includes first change-over valves 71L and 71R and a second change-over valve 72.

The first change-over valve 71L is constituted of a two-position change-over valve fluidly connected via a fluid passage to the swashplate switching cylinder 37L of the first traveling motor 36L, and has two positions, a first position 71L1 and a second position 71L2, to be arbitrarily switched to take one of the two positions. The first change-over valve 71L contracts the swashplate switching cylinder 37L when taking the first position 71L1, and extends the swashplate switching cylinder 37L when taking the second position 71L2.

The first change-over valve 71R is constituted of a two-position change-over valve fluidly connected via a fluid passage to the swashplate switching cylinder 37R of the second traveling motor 36R, and has two positions, a first position 71R1 and a second position 71R2, to be arbitrarily switched to take one of the two positions. The first change-over valve 71R contracts the swashplate switching cylinder 37R when taking the first position 71R1, and extends the swashplate switching cylinder 37R when taking the second position 71R2.

The second change-over valve 72 is a solenoid valve that switches the first change-over valve 71L and the first change-over valve 71R, and is capable of being shifted to a first position 72a or a second position 72b. A delivery fluid passage 40 is fluidly connected to an input side of the second change-over valve 72, and a fluid passage 41 is fluidly connected to an output side of the second change-over valve 72. The fluid passage 41 is branched in two in an intermediate portion, one of which is fluidly connected to a spool of the first change-over valve 71L, and the other is fluidly connected to a spool of the first change-over valve 71R. That is, the second change-over valve 72 is fluidly connected to each of the first change-over valves 71L and 71R by the fluid passage 41.

The second change-over valve 72 switches the first change-over valve 71L and the first change-over valve 71R to the first position 71L1 or 71R1 when taking the first position 72a, and switches the first change-over valve 71L and the first change-over valve 71R to the second position 71L2 or 71R2 when taking the second position 72b.

That is, the traveling change-over valve 34 is shifted to the first state to shift a rotation speed of each of the traveling motors (first traveling motor 36L and second traveling motor 36R) to the first speed when the second change-over valve 72 is in the first position 72a, the first change-over valve 71L is in the first position 71L1, and the first change-over valve 71R is in the first position 71R1. The traveling change-over valve 34 is shifted to the second state to shift a rotation speed of each of the traveling motors (first traveling motor 36L and second traveling motor 36R) to the second speed when the second change-over valve 72 is in the second position 72b, the first change-over valve 71L is in the second position 71L2, and the first change-over valve 71R is in the second position 71R2.

Accordingly, the traveling change-over valve 34 allows the traveling motors (first traveling motor 36L and second traveling motor 36R) to be switched between the first speed that is a low speed range and the second speed that is a high speed range.

A switching unit is configured to shift the rotation speed stages of the traveling motors between the respective first speeds and the respective second speeds. The switching unit is, for example, a speed-shift switch 61 connected to the controller 60, which can be operated by an operator or the like. By switching the speed-shift switch 61, an acceleration command to accelerate rotation speeds of the traveling motors 36L and 36R from the first speed to the second speed and a deceleration command to decelerate the rotation speeds of the traveling motors 36L and 36R from the second speed to the first speed can be made, respectively.

The controller 60 is constituted of a semiconductor such as a CPU and an MPU, electrical and electronic circuits, or the like. The controller 60 switches the traveling change-over valve 34 to either the first state or the second state based on the switching operation of the shift switch 61. The speed-shift switch 61 is, for example, a push switch.

For example, when the traveling motors 36L and 36R are in the first speed, the acceleration command (an electric signal (voltage signal or current signal) corresponding to a command to shift the traveling change-over valve 34 to the second state) to accelerate the traveling motors 36L and 36R to the second speed is output from the speed-shift switch 61 to the controller 60 by pressing the speed-shift switch 61. In addition, when the traveling motors are in the second speed, the deceleration command (an electric signal corresponding to a command to shift the traveling change-over valve 34 to the first state) to decelerate the traveling motors 36L and 36R to the first speed is output from the speed-shift switch 61 to the controller 60 by pressing and operating the speed-shift switch 61.

The speed-shift switch 61 may be constituted of a push switch that can hold ON/OFF states. In this case, when the speed-shift switch 61 is in the OFF state, a command (an electric signal corresponding to the command) to hold the traveling motors 36L and 36R at the first speed is output from the speed-shift switch 61 to the controller 60. In addition, when the speed-shift switch 61 is in the ON state, a command to hold the traveling motors 36L and 36R at the second speed (an electric signal corresponding to the command) is output from the speed-shift switch 61 to the controller 60.

When the controller 60 obtains the deceleration command to shift the traveling change-over valve 34 from the second state to the first state, the controller 60 shifts the traveling change-over valve 34 to the first state (the second change-over valve 72 being in the first position 72a and the first change-over valves 71L and 71R being in the first positions 71L1 and 71R1) by demagnetizing the solenoid of the second change-over valve 72. In addition, when the controller 60 obtains the acceleration command to shift the traveling change-over valve 34 from the first state to the second state, the controller 60 shifts the traveling change-over valve 34 to the second state (the second change-over valve 72 being in the second position 72b and the first change-over valves 71L and 71R being in the second positions 71L2 and 71R2) by magnetizing the solenoid of the second change-over valve 72.

The hydraulic system for the working machine 1 includes a first hydraulic pump P1, a second hydraulic pump P2, and an operation device (traveling operation device) 54. The first hydraulic pump P1 is a hydraulic pump to be driven by power of the prime mover 32, and is constituted of a constant displacement gear pump. The first hydraulic pump P1 is capable of delivering the hydraulic fluid stored in the tank 22. Specifically, the first hydraulic pump P1 delivers the hydraulic fluid that is mainly used for control. For convenience of explanation, the tank 22 storing the hydraulic fluid may be referred to as a hydraulic fluid tank. In addition, of the hydraulic fluid delivered from the first hydraulic pump P1, the hydraulic fluid used for control is referred to as a pilot fluid, and a pressure of the pilot fluid is referred to as a pilot pressure.

The second hydraulic pump P2 is a hydraulic pump to be driven by power of the prime mover 32, and is constituted of a constant displacement gear pump. The second hydraulic pump P2 is capable of delivering the hydraulic fluid stored in the tank 22, and for example, delivers the hydraulic fluid to a fluid passage of the working system. The second hydraulic pump P2 delivers the hydraulic fluid, for example, to the boom cylinders 14 that operate the booms 10, the bucket cylinders 15 that operate the bucket, and the control valves (flow control valves) that control an auxiliary hydraulic actuator.

The traveling operation device 54 is a device configured to operate the traveling pumps (first traveling pump 53L and the second traveling pump 53R), and is capable of changing the angles of swashplates (swashplate angles) of the traveling pumps 53L and 53R. The traveling operation device 54 includes an operation member 59 such as an operation lever and a plurality of operation valves 55 (55A to 55D).

The operation member 59 is supported by the operation valves 55 and swings in a lateral direction (the machine width direction) or the fore-and-aft direction. That is, relative to a neutral position N, the operation member 59 is operable rightward and leftward from the neutral position N, and operable forward and backward from the neutral position N. In other words, the operation member 59 is swingable from the neutral position N in at least four directions, forward, backward, leftward and rightward. For convenience of explanation, two directions of the forward and backward directions, that is, the fore-and-aft direction, may be referred to as a first direction. In addition, two directions of the rightward and leftward directions, that is, the lateral direction (the machine width direction) may be referred to as a second direction.

In addition, the plurality of operation valves 55 are operated by a common (that is, single) operation member 59. The plurality of operation valves 55 are actuated according to swing of the operation member 59. The delivery fluid passage 40 is fluidly connected to the plurality of operation valves 55, and the hydraulic fluid (pilot fluid) from the first hydraulic pump P1 can be delivered through the delivery fluid passage 40. The plurality of operation valves 55 include an operation valve 55A, operation valve 55B, operation valve 55C, and operation valve 55D.

When the operation member 59 is swung forward (forward operation), the operation valve 55A changes a pressure (pilot fluid) of hydraulic fluid (pilot fluid) to be output according to an operation amount (operation) of the operation member 59. When the operation member 59 is swung backward (backward operation), the operation valve 55B changes a pressure of the hydraulic fluid to be output according to the operation amount of the operation member 59. When the operation member 59 is swung rightward (rightward operation), the operation valve 55C changes a pressure of the hydraulic fluid to be output according to the operation amount of the operation member 59. When the operation member 59 is swung leftward (leftward operation), the operation valve 55D changes a pressure of the hydraulic fluid to be output according to the operation amount of the operation member 59.

The plurality of operation valves 55 and the traveling pumps (first traveling pump 53L and second traveling pump 53R) are fluidly connected by the traveling fluid passage 45. In other words, the traveling pumps 53L and 53R are hydraulic equipment that are configured to be operated by hydraulic fluid output from the operation valves 55 (operation valve 55A, operation valve 55B, operation valve 55C, and operation valve 55D).

The traveling fluid passage 45 includes a first traveling fluid passage 45*a*, a second traveling fluid passage 45*b*, a third traveling fluid passage 45*c*, a fourth traveling fluid passage 45*d*, and a fifth traveling fluid passage 45*e*. The first traveling fluid passage 45*a* is a fluid passage fluidly connected to the pressure-receiving portion 53*a* of the first traveling pump 53L. The second traveling fluid passage 45*b* is a fluid passage fluidly connected to the pressure-receiving portion 53*b* of the first traveling pump 53L. The third traveling fluid passage 45*c* is a fluid passage fluidly connected to the pressure-receiving portion 53*a* of the second traveling pump 53R. The fourth traveling fluid passage 45*d* is a fluid passage fluidly connected to the pressure-receiving portion 53*b* of the second traveling pump 53R. The fifth traveling fluid passage 45*e* is a fluid passage that connects the operation valves 55 to each of the first traveling fluid passage 45*a*, the second traveling fluid passage 45*b*, the third traveling fluid passage 45*c*, and the fourth traveling fluid passage 45*d*.

When the operation member 59 is swung forward (in a direction indicated by an arrowed line A1 in FIG. 1), the operation valve 55A is operated, and then a pilot pressure is output from the operation valve 55A. This pilot pressure is applied to the pressure-receiving portion 53*a* of the first traveling pump 53L the first traveling fluid passage 45*a*, and is applied to the pressure-receiving portion 53*a* of the second traveling pump 53R via the third traveling fluid passage 45*c*. In this manner, the swashplate angles of the first traveling pump 53L and the second traveling pump 53R are changed, and the first traveling motor 36L and the second traveling motor 36R rotate normally (forward rotation), and the working device 1 travels straight forward.

In addition, when the operation member 59 is swung backward (in a direction indicated by an arrowed line A2 in FIG. 1), the operation valve 55B is operated, and a pilot pressure is output from the operation valve 55B. This pilot pressure is applied to the pressure-receiving portion 53*b* of the first traveling pump 53L via the second traveling fluid passage 45*b*, and is applied to the pressure-receiving portion 53*b* of the second traveling pump 53R via the fourth traveling fluid passage 45*d*. In this manner, the swashplate angles of the first traveling pump 53L and the second traveling pump 53R are changed, and the first traveling motor 36L and the second traveling motor 36R rotate reversely (backward rotation), and the working device 1 travels straight backward.

In addition, when the operation member 59 is swung rightward (in a direction indicated by an arrowed line A3 in FIG. 1), the operation valve 55C is operated, and a pilot pressure is output from the operation valve 55C. This pilot pressure is applied to the pressure-receiving portion 53*a* of the first traveling pump 53L via the first traveling fluid passage 45*a*, and is applied to the pressure-receiving portion 53*b* of the second traveling pump 53R via the fourth traveling fluid passage 45*d*. In this manner, the swashplate angles of the first traveling pump 53L and the second traveling pump 53R are changed, and the first traveling motor 36L rotates normally and the second traveling motor 36R rotates reversely, and the working device 1 turns to the right.

In addition, when the operation member 59 is swung leftward (in a direction indicated by an arrowed line A4 in FIG. 1), the operation valve 55D is operated, and a pilot pressure is output from the operation valve 55D. This pilot pressure is applied to the pressure-receiving portion 53*a* of the second traveling pump 53R via the third traveling fluid passage 45*c*, and is applied to the pressure-receiving portion 53*b* of the first traveling pump 53L via the second traveling fluid passage 45*b*. In this manner, the swashplate angles of the first traveling pump 53L and the second traveling pump 53R are changed, and the first traveling motor 36L rotates reversely and the second traveling motor 36R rotates normally, and the working device 1 turns to the left.

The operation member 59 is capable of being operated diagonally forward to the right, diagonally backward to the right, diagonally forward to the left, and diagonally backward to the left. When the operation member 59 is swung in a diagonal direction, rotational directions and rotation speeds of the first traveling motor 36L and the second traveling motor 36R are determined by a differential pressure between the pilot pressures applied to the pressure-receiving portion 53*a* and the pressure-receiving portion 53*b*, and the working machine 1 turns to the right or the left while traveling forward or backward.

That is, when the operation member 59 is swung diagonally forward to the left, the working machine 1 turns left while traveling forward at a speed corresponding to a swing angle of the operation member 59. In addition, when the operation member 59 is swung diagonally forward to the right, the working machine 1 turns right while traveling forward at a speed corresponding to a swing angle of the operation member 59. In addition, when the operation member 59 is swung diagonally backward to the left, the working machine 1 turns left while traveling backward at a speed corresponding to a swing angle of the operation member 59. Moreover, when the operation member 59 is swung diagonally backward to the right, the working machine 1 turns right while traveling backward at a speed corresponding to a swing angle of the operation member 59.

An accelerator 65 for setting a target rotation speed of the prime mover 32 is connected to the controller 60. The accelerator 65 is disposed in the vicinity of the driver seat 8. The accelerator 65 is an acceleration lever supported swingably, an acceleration pedal supported swingably, as acceleration volume supported rotatably, an acceleration slider supported slidably, or the like. The accelerator 65 is not limited to the examples described above.

In addition, a rotation speed detection device (detection device, first detection device) 67 that detects the actual rotation speed of the prime mover 32 is connected to the controller 60. The controller 60 is capable of knowing an actual rotation speed of the prime mover 32 based on a detection result of the rotation speed detection device 67. The controller 60 sets the target rotation speed of the prime mover 32 based on an operation amount of the accelerator 65, and controls the actual rotation speed of the prime mover 32 so as to reach the target rotation speed.

When a predetermined deceleration condition is satisfied without operation of the speed-shift switch 61, the controller 60 shifts the traveling change-over valve 34 from the second state to the first state, and then executes the automatic deceleration to automatically decelerate (speed-shift) rotation speeds of the traveling motors 36L and 36R from the second speed to the first speed.

In contrast, when the deceleration command (speed-shift command for decelerate) is output by the speed-shift switch 61 as described above, the controller 60 executes the manual deceleration to decelerate (speed-shift) the rotation speeds of the traveling motors 36L and 36R from the second speed to the first speed.

The controller 60 executes the automatic deceleration based on a pressure (pilot pressure) of the hydraulic fluid acting on the circulation fluid passages 57*h* and 57*i*. A plurality of pressure detection devices (second detection devices) 80 are connected to the circulation fluid passages 57*h* and 57*i*. The plurality of pressure detection devices 80 includes a first pressure detection device 80*a*, a second pressure detection device 80*b*, a third pressure detection device 80*c*, and a fourth pressure detection device 80*d*. The first pressure detection device 80*a* is disposed on a first port P11 side of the first traveling motor 36L in the circulating fluid passage 57*h*, and detects a pressure on the first port P11 side as a first traveling pressure V1. The second pressure detection device 80*b* is disposed on a second port P12 side of the first traveling motor 36L in the circulating fluid passage 57*h*, and detects a pressure on the second port P12 side as a second traveling pressure V2. The third pressure detection device 80*c* is disposed on a third port P13 side of the second traveling motor 36R in the circulating fluid passage 57*i*, and detects a pressure on the third port P13 side as a third traveling pressure V3. The fourth pressure detecting device 80*d* is disposed on a fourth port P14 side of the second traveling motor 36R in the circulating fluid passage 57*i*, and detects a pressure on the fourth port P14 side as a fourth traveling pressure V4.

The controller 60 is connected to a mode switch 66 that switches the automatic deceleration to be enabled or disabled. For example, the mode switch 66 is capable of being shifted to an ON state or OFF state. When the mode switch 66 is shifted to the ON state, the controller 60 turns on an automatic deceleration flag stored in an internal memory to enable the automatic deceleration. When the mode switch 66 is switched to the OFF state, the controller 60 turns off the stored automatic deceleration flag to disable the automatic deceleration.

When the automatic deceleration is enabled, the controller 60 compares the first traveling pressure V1, the second traveling pressure V2, the third traveling pressure V3, and the fourth traveling pressure V4 with a predetermined deceleration threshold or restoration threshold.

When rotation speeds of the traveling motors 36L and 36R is in the second speed and at least one of the first traveling pressure V1, the second traveling pressure V2, the third traveling pressure V3, and the fourth traveling pressure V4 becomes equal to or greater than the deceleration threshold, the controller 60 executes the automatic deceleration to decelerate (speed-shift) the rotation speeds of the traveling motors 36L and 36R to the first speed. In addition, when the rotation speeds of the traveling motors 36L and 36R are in the first speed and the first traveling pressure V1, the second traveling pressure V2, the third traveling pressure V3, and the fourth traveling pressure V4 become equal to or less than the restoration threshold, the controller 60 restores (accelerates, decelerates) the rotation speeds of the traveling motors 36L and 36R from the first speed to the second speed.

When the automatic deceleration is disabled, the controller 60 executes the above-described manual deceleration based on an operation state of the speed-shift switch 61 and rotation speeds of the traveling motors 36L and 36R, or executes the manual acceleration to accelerate (speed-shift) the rotation speeds of the traveling motors 36L and 36R from the first speed to the second speed.

In the above-described embodiment, as a predetermined deceleration condition, the controller 60 executes the automatic deceleration when the rotation speeds of the traveling motors 36L and 36R is in the second speed and the traveling pressures (first traveling pressure V1, second traveling pressure V2, third traveling pressure V3, and fourth traveling pressure V4) are equal to or greater than the deceleration threshold; however, the conditions for executing the automatic deceleration are not limited to this.

For example, as a predetermined deceleration condition, the controller 60 may execute the automatic deceleration when the rotation speeds of the traveling motors 36L and 36R are in the second speed and at least one of a first differential pressure AV1 that is obtained by subtracting the second traveling pressure V2 from the first traveling pressure V1, a second differential pressure AV2 that is obtained by subtracting the first traveling pressure V1 from the second traveling pressure V2, a third differential pressure AV3 that is obtained by subtracting the fourth traveling pressure V4 from the third traveling pressure V3, and a fourth traveling pressure V4 that is obtained by subtracting the third traveling pressure V3 from the fourth traveling pressure V3 is equal to or greater than the deceleration threshold.

As shown in FIG. 1, the delivery fluid passage 40, through which the hydraulic fluid is delivered from the first hydraulic pump P1, is branched into a plurality of passages in an intermediate portion thereof. Of these passages, the traveling change-over valve (second change-over valve 72) is fluidly connected to the fluid passage 41, one of them, and the actuation valve 69 is fluidly connected to the fluid passages 40a, the other. In other words, the actuation valve 69 is fluidly connected to a section 40a of the branched delivery fluid passage 40, the section 40a extending to the traveling operation device 54, that is, fluidly connected upstream of the operation valve 55. The actuation valve 69 may be fluidly connected to the traveling fluid passage 45 disposed downstream of the operation valve 55.

The actuation valve 69 is a solenoid proportional valve (proportional valve), and an opening degree thereof can be changed by a control signal input from the controller 60. The control signal input to the actuation valve 69 from the controller 60 is, for example, a voltage signal or a current signal. As an electrical level of the control signal input to the actuation valve 69 from the controller 60 becomes higher, an opening degree of the actuation valve 69 is increased. In addition, as the electrical level of the control signal input to the actuation valve 69 from the controller 60 becomes lower, an opening degree of the actuation valve 69 is reduced.

In shifting the traveling change-over valve 34 from the first state (first speed) to the second state (second speed), that is, in accelerating rotation speeds of the traveling motors 36L and 36R from the first speed to the second speed, the actuation valve 69 changes a pressure of the hydraulic fluid to be supplied to the traveling operation device 54 (pressure of the hydraulic fluid on the primary side in the operation valves 55). In addition, in shifting the traveling change-over valve 34 from the second state (second speed) to the first state (first speed), that is, in decelerating rotation speeds of the traveling motors 36L and 36R from the second speed to the first speed, the actuation valve 69 changes a pressure of the hydraulic fluid to be supplied to the traveling operation device 54 (pressure of the hydraulic fluid on the primary side in the operation valves 55).

The controller 60 reduces the control signal, such as the current or voltage output to the actuation valve 69, to a mitigation value (second set value) lower than the set value (first set value) and then restores the control signal to the set value in both cases of the acceleration and the deceleration.

Figure 2A:
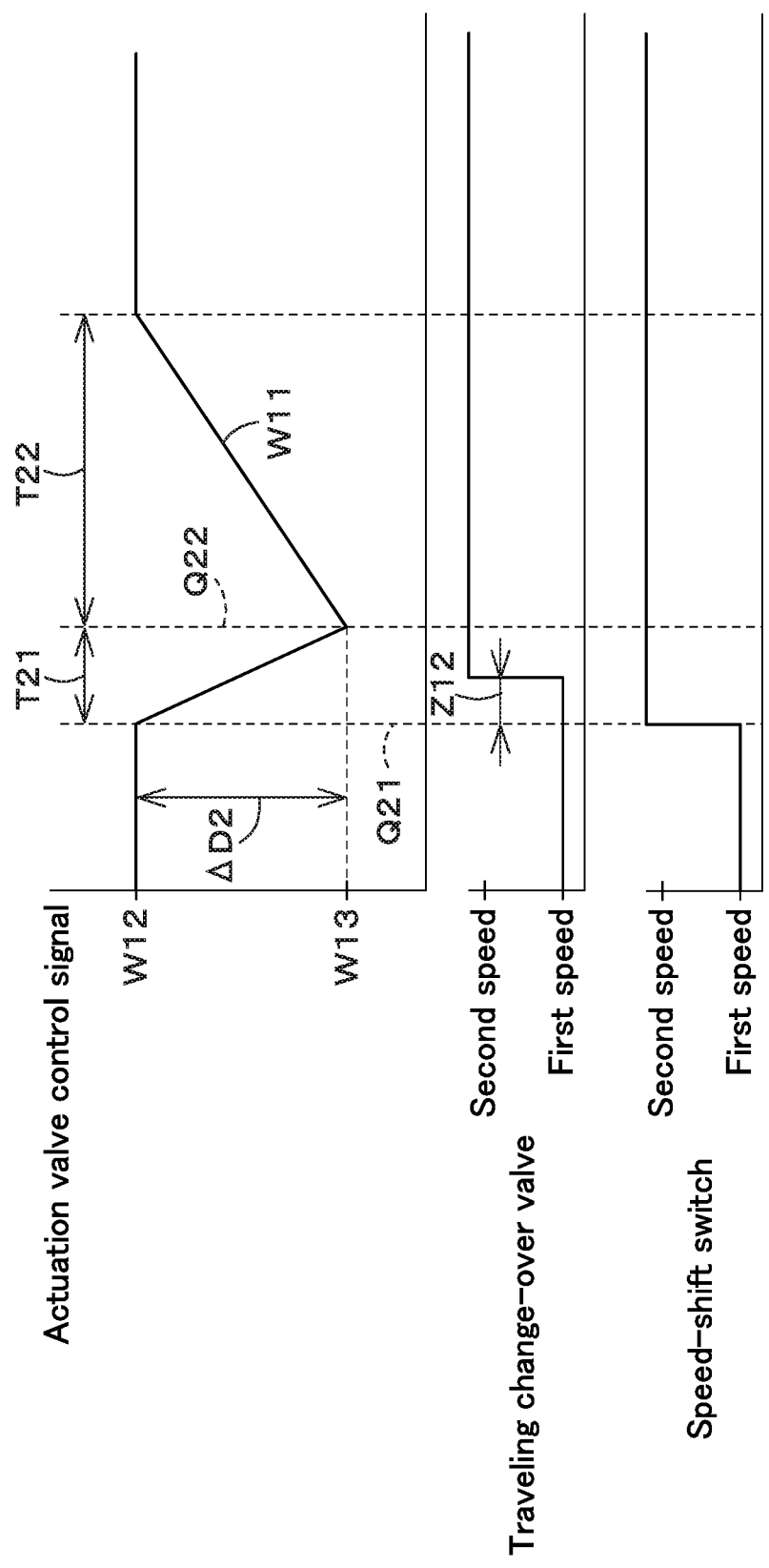
FIG. 2A is a view showing a relationship among a control signal to an actuation value, a traveling change-over valve, and a speed-shift switch in a manual acceleration.

FIG. 2A shows a relationship among the control signal input to the actuation valve 69, the operation state of the traveling change-over valve 34, and the speed-shift switch 61 in manually accelerating the traveling motors 36L and 36R from the first speed to the second speed. On the vertical axis of FIG. 2A, which shows the control signal input to the actuation valve 69, the control value (current value or the like) becomes lower as approaching the origin (intersection with the horizontal axis), and the control value becomes higher as separating away from the origin.

As shown in FIG. 2A, when the speed-shift switch 61 is operated at a time point Q21, the controller 60 determines that a command (second-speed command) to shift from the first state (first speed) to the second state (second speed) has been obtained. When the controller 60 obtains the second-speed command, the controller 60 reduces an output value W11 of the control signal output to the actuation valve 69 to a predetermined value (mitigation value) W13 that is lower than the set value W12. The predetermined value (mitigation value) W13 is a value that mitigates the speed-shift shock when shifting from the first speed to the second speed, and is a value obtained by subtracting the reduction amount ΔD2 from the set value W12. For example, the set value W12 of the control signal of the actuation valve 69 is set based on a vehicle speed of the working machine and the actual rotation speed of the prime mover rotation speed. In more detail, when the controller 60 does not obtain a second-speed command (when no shifting is performed), the controller 60 sets a control signal (current value) that causes the actuation valve 69 to be fully opened. On the other hand, when the second-speed command is obtained, the controller 60 changes the set value W12 of the control signal according to a vehicle speed of the working machine or the actual rotation speed of the prime mover.

When the output value W11 reaches the predetermined value (mitigation value) W13 at a time point Q22, the controller 60 restores the output value W11 to the set value W12 by increasing the control value of the control signal input to the actuation valve 69. Instead of this, the controller 60 increases the control value of the control signal input to the actuation valve 69 during a reduction time T21 when the output value W11 is reduced to the predetermined value (mitigation value) W13, thereby restoring the output value W11 to the set value W12 in an intermediate point. Here, the controller 60 makes a restoration time T22 be longer than the reduction time T21, the restoration time T22 being defined for restoring the output value W11 from the predetermined value (mitigation value) W13 to the set value W12. That is, the controller 60 makes a reduction rate at which the output value W11 is reduced to the predetermined value (mitigation value) W13 be higher than a restoration rate for restoring the output value W11 from the predetermined value (mitigation value) W13 to the set value W12.

In addition, the controller 60 outputs a signal to magnetize the solenoid of the traveling change-over valve 34 at least during the reduction time T21, that is, before starting the control to restore the output value W11 from the predetermined value (mitigation value) W13 to the set value W12, to shift the traveling change-over valve (change-over valve) 34 from the first state (first speed) to the second state (second speed). In other words, the controller 60 restores the output value W11 to the set value W12 after shifting the traveling change-over valve 34 to the second state.

FIG. 2B is a view showing a relationship among the control signal input to the actuation valve 69, the traveling change-over valve 34, and the speed-shift switch 61 in decelerating the traveling motors 36L and 36R from the second speed to the first speed. In the vertical axis of FIG. 2B, which represents the control signal input to the actuation valve 69, the control value (current value or the like) becomes lower as approaching the origin (intersection with the horizontal axis), and the control value becomes higher as separating away from the origin.

As shown in FIG. 2B, when the speed shift switch (change-over SW) 61 is operated at a time point Q31, the controller 60 determines that a command (first-speed command) to shift from the second state (second speed) to the first state (first speed) has been obtained. When the first-speed command is obtained, the controller 60 reduces the output value W11 of the control signal input to the actuation valve 69 to a predetermined value (mitigation value) W14 that is lower than the set value W12.

Specifically, as shown in FIG. 2B, in the mitigation period T31 from the set value W12 to the predetermined value (mitigation value) W14, the controller 60 adjusts the control signal input to the actuation valve 69 to make a first reduction rate larger than a second reduction rate, the first reduction rate being a reduction rare of the output value W11 in a period (first period) T31a from a start point (time point Q31) of the mitigation period T31 to an intermediate point of the mitigation period T31, the second reduction rate being a reduction rate of the output value W11 in a period (second period) T31b from the intermediate point of the mitigation period T31 to an end point (time point Q32) of the mitigation period T31. That is, in decelerating the rotation speeds of the traveling motors 36L and 36R, the controller 60 reduces the output value W11 steeply toward the mitigation value W14 and then slowly toward the mitigation value W14.

Reduction of the output value W11 by the controller 60 will be described in detail more.

As shown in FIG. 1, the controller 60 includes a setting unit 60A and a control unit 60B. The setting unit 60A and the control unit 60B are constituted of electrical/electronic circuits disposed in the controller 60, a computer program stored in the controller 60, or the like.

When the setting unit 60A obtains the second-speed command, the setting unit 60A sets the set value W12 according to a traveling speed (vehicle speed) of the working machine 1 and the corresponding actual rotation speed (actual rotation speed) of the prime mover 32.

In addition, when the setting unit 60A obtains the first-speed command after obtaining the second-speed command, the setting unit 60A calls the first line L1 representing the first reduction rate of the output value W11 and the second line L2 representing the second reduction rate of the output value W11. That is, when the speed command is switched from the second-speed command to the first-speed command, the setting unit 60A proceeds to a process for reducing the output value W11. In the process, the setting unit 60A performs the control so that a bending point P25 is formed in the line (reduction line) L10 including the first line L1 and the second line L2 in reducing the output value W11 in the mitigation period T31.

In addition, the setting unit 60A sets a slope of the first line L1 so that the first reduction rate is constant, that is, a reduction amount per unit time (first reduction amount) becomes constant. In addition, the setting unit 60A sets a slope of the second line L2 so that the second reduction rate becomes constant, that is, a reduction amount per unit time (second reduction amount) becomes constant. That is, the setting unit 60A makes the slope of the first line L1 (the first reduction amount) larger than the slope of the second line L2 (the second reduction amount). In other words, the setting unit 60A makes the slope of the second line L2 (the second reduction amount) smaller than the slope of the first line L1 (the first reduction amount).

The control unit 60B controls the first reduction rate and the second reduction rate of the control signal (output value W11) based on the first line L1 and the second line L2 set by the setting unit 60A. That is, when the control unit 60B obtains the first-speed command, the control unit 60B outputs a control signal to the actuation valve 69 so that the output value W11 is reduced corresponding to the first line L1. In addition, the control unit 60B outputs a control signal to the actuation valve 69 so that the output value W11 is reduced corresponding to the second line L2.

The setting unit 60A may change either the first reduction amount or the second reduction amount based on a traveling load generated when the traveling change-over valve 34 is shifted from the second state to the first state.

The traveling load can be obtained based on the traveling pressures (also referred to as the "traveling pump pressure") V1 to V4 detected by the pressure detection devices 80 disposed in the circulation fluid passages 57h and 57i of FIG. 1, for example. Specifically, the setting unit 60A adopts, as the traveling load, the highest traveling pressure among the traveling pressures V1 to V4 detected by the pressure detection devices 80a to 80d, that is, the pressures of the hydraulic fluid delivered from the traveling pumps 53L and 53R.

As shown in FIG. 2B The setting unit 60A shifts the control value (bending value) W25 at the bending point P25 of the control signal of the actuation valve 69 toward the set value W12 to increase the height of the bending point P25 compared to a predetermined reference value as the traveling load increases. In addition, as the traveling load becomes smaller, the setting unit 60A shifts the control value W25 at the bending point P25 of the control signal of the actuation valve 69 toward the mitigation value W14 to lower the height of the bending point P25.

In other words, the setting unit 60A reduces a difference (deviation) between the set value W12 and the bending value W25 without changing the slopes of the first line L1 and the second line L2 when the traveling load is large. In addition, when the traveling load is small, the setting unit 60A increases the difference between the set value W12 and the bending value W25 without changing the slopes of the first line L1 and the second line L2.

For example, when the traveling load is greater than a reference, the setting unit 60A increases an amount of shifting the bending value W25 toward the set value W12 (reduces the deviation) as the traveling load becomes greater than the standard. In addition, when the traveling load is smaller than the reference, the setting unit 60A reduces the amount of shifting the bending value W25 toward the mitigation value W14 (increases the deviation) when the traveling load becomes smaller than the reference.

When the bending value W25 of the bending point P25 is changed by the setting unit 60A, the control unit 60B outputs a control signal to the proportional valve 69 corresponding to the changed bending value W25.

In the above-described embodiment, the output value (control value) W11 of the control signal output by the controller 60 to the actuation valve 69 is reduced based on the first line L1 and the second line L2. However, in performing the control to reduce the output value W11 (shock mitigation control), referring to a traveling load, the control unit 60B may control the first reduction rate and a second reduction rate based on the first line L1 and the second line L2. That is, when the speed-shift is performed to decelerate the rotation speeds of the traveling motors 36L and 36R from the second speed to the first speed, the controller 60 refers to the traveling load. Then, when the traveling load is greater than a threshold value, the traveling load is large, so the setting unit 60A sets (changes) the first and second reduction rates as described above, and then controls an operation state (the opening degree or the like) of the actuation valve 69 based on the result of setting.

In the above-described embodiment, the setting unit 60A changes the bending value W25 of the bending point P25 based on the traveling load, but the bending value W25 may be changed based on a load of the prime mover 32 and a rotation speed of the prime mover 32.

As shown in FIG. 2B, when the output value W11 of the control signal output to the actuation valve 69 reaches the predetermined value (mitigation value) W14 at the time point Q32, the controller 60 (control unit 60B) restores the output value W11 to the set value W12. In restoring the output value W11 to the set value W12, the controller 60 (control unit 60B) makes a restoration amount per unit time in the restoration larger than the second reduction amount per unit time of the second reduction rate. In other words, the slope of a restoration line L3 of a restoration period T32 in which the output value W11 is restored to the set value W12 is made slower than the slope of the second line L2 indicating the second reduction rate.

Figure 2C:
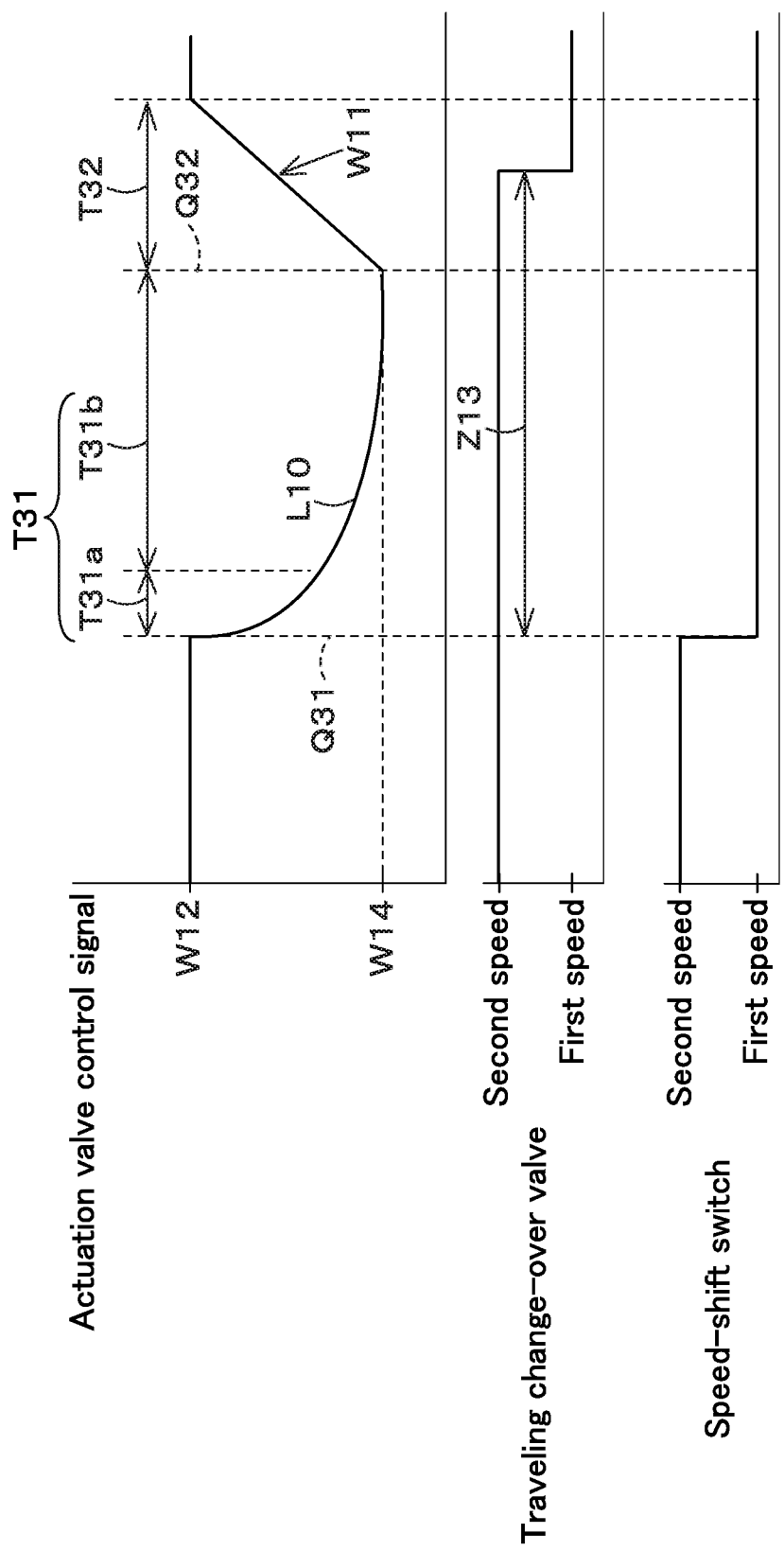
FIG. 2C is a view showing the relationship among the control signal to the actuation value, the traveling change-over valve, and the speed-shift switch in the manual acceleration.

In the above-described embodiment, the bending point P25 is formed by the first line L1 and the second line L2 in reducing the output value W11; however, the bending point P25 may be omitted by curving the line L10 of the mitigation period T31 as shown in FIG. 2C. In the vertical axis representing the control signal in FIG. 2C, the control value becomes lower as approaching the origin, and the control value becomes higher as separating away from the origin.

The working machine 1 includes the prime mover 34, the traveling pumps 53L and 53R and configured to deliver hydraulic fluid and change a flow rate of the hydraulic fluid delivered therefrom in correspondence to an angle of the swashplate, the traveling motors (first traveling motor 36L and second traveling motor 36R) configured to be rotated by the hydraulic fluid delivered from the traveling pumps 53L and 53R so as to have a rotation speed shiftable between the first speed and the second speed higher than the first speed, the traveling change-over valve 34 shiftable between the first state to set the rotation speeds of the traveling motors (first traveling motor 36L and second traveling motor 36R) to the first speed and the second state to set the rotation speeds of the traveling motors (first traveling motor 36L and second traveling motor 36R) to the second speed, the operation device 54, the operation valves 55 configured to change the angles of the swashplates of the traveling pumps 53L and 53R according to operation of the operation device 54, the actuation valve 69 provided upstream or downstream of the operation valves 55 and fluidly connected to the operation valves 55, and the controller 60 configured or programmed to output the control signal to control the actuation valve 69 in such a way that, when the traveling change-over valve 34 is shifted from the second state to the first state, a value of the control signal is reduced from a set value W12 to the mitigation value W14 less than the set value W12 and then restores to the set value W12. In the mitigation period T31 in which the control signal reaches the mitigation value W14 from the set value W12, the controller 60 is configured or programmed to reduce the value of the control signal from the set value to the mitigation value for a mitigation period in such a way that the first reduction rate that is a rate of reducing the value of the control signal for a first part of the mitigation period T31 between a start point thereof and an intermediate point thereof larger than the second reduction rate that is a rate of reducing the value of the control signal for a second part of the mitigation period T31 between the intermediate point thereof and an end point thereof. According to this configuration, in shifting from the second state to the first state (in deceleration), the speed-shift shock can be reduced while ensuring responsiveness in operations of the traveling pumps 53L and 53R.

The controller 60 includes the setting unit 60A configured or programmed to set the first line L1 representing the first reduction rate that is the first reduction amount per unit time kept constant for the period between the start point thereof and the intermediate point thereof, and to set the second line L2 representing the second reduction rate that is a second reduction amount per unit time kept constant for the period between the intermediate point thereof and the end point thereof, the second reduction amount being less than the first reduction amount, and the control unit 60B configured or programmed to control the first reduction rate and the second reduction rate based on the first line L1 and the second line L2 set by the setting unit 60A. According to this configuration, the first reduction rate and the second reduction rate can be easily controlled based on the first line L1 and the second line L2, and a portion where the first line L1 and the second line L2 are continuously connected serves as the bending point, thereby smoothly mitigating the speed-shift shock.

The control unit 60B is configured or programmed to control the first reduction rate and the second reduction rate based on the first line L1 and the second line L2 when the traveling load is not less than the predetermined threshold value. According to this configuration, the speed-shift shock generated when the deceleration is performed with a high traveling load can be further mitigated.

The setting unit 60A is configured or programmed to change the value of the control signal at the bending point P25 defined as a boundary point between the first line L1 and the second line L2 based on the traveling load when the traveling change-over valve 34 is shifted from the second state to the first state. According to this configuration, by changing the value W25 of the control signal according to the traveling load, it is possible to mitigate the speed-shift shock without deteriorating the responsiveness in the speed shift (deceleration).

The setting unit 60A is configured or programmed to adopt, as the traveling load, the highest pressure of the hydraulic pressures delivered from the traveling pumps 53L and 53R. According to this configuration, the traveling load can be easily detected.

The setting unit 60A is configured or programmed to shift the value of the control signal at the bending point P25 toward the set value W12 as the traveling load becomes larger, and to shift the value of the control signal at the bending point P25 toward the mitigation value W14 as the traveling load becomes smaller. According to this configuration, in the speed shift (deceleration), the speed-shift shock can be mitigated while ensuring responsiveness in operations of the traveling pumps 53L and 53R.

The controller 60 is configured or programmed to restore, after the output value W11 reaches the mitigation value W14, the output value W11 by increasing the value of the mitigation value W14 at the restoration amount per unit time, the restoration amount per unit time being larger than the second reduction amount per unit time that is the second reduction rate. According to this configuration, the deceleration can be performed quickly while mitigating the speed-shift shock.

In the above-described embodiment, the actuation valve 69 is disposed upstream of the operation valves 55 (delivery fluid passage 40); instead, the actuation valve 69 may be disposed downstream of the operation valves 55 (traveling fluid passage 45). For example, the actuation valve 69 may be disposed in an intermediate portion of the fifth traveling fluid passage 45e, or as shown in FIG. 3, a fluid passage 51 may be branched from each of the first traveling fluid passage 45a, the second traveling fluid passage 45b, the third traveling fluid passage 45c, and the fourth traveling fluid passage 45d, and the actuation valve 69 such as a variable relief valve or an electromagnetic proportional valve may be disposed in each of the fluid passages 51.

In the above-described embodiment, the actuation valve 69 is a solenoid proportional valve whose opening degree is increased as the control value of the input control signal is increased, and is reduced as the control value is reduced. However, instead of this, a solenoid proportional valve may be used in which the opening degree is reduced as the control value of the input control signal is increased and the opening degree is increased as the control value is reduced. In this case, in the vertical axis showing the control signal in FIGS. 2A to 2C, the control value is increased as approaching the origin. That is, in the case of the above modified example, the high and the low in the control signals are reversed in the above-described embodiment, so the modified example can be explained by reading the contents regarding the high and the low in reverse. In more detail, in the above-described embodiment, if "reduction" is read as "increase", "low" is read as "high", "mitigation period" is read as "increase period", "reduction rate" is read as "increase rate", "reduction amount" is read as "increase amount", "mitigation value" is read as "increase value", and "mitigation" is read as "increase", they give an explanation of the modified example.

In summary, in shifting from the second state to the first state, the controller 60 increases the control signal that controls the actuation valve 69 to the increase value W14 that is higher than the set value W12, and then restores the control signal. In the increase period T31 from the set value W12 to the increase value, the controller 60 makes the first increase rate of the control signal from a start point of the increase period T31 to an intermediate point of the increase period T31 larger than the second increase rate of the control signal from the intermediate point of the increase period to an end point of the increase period.

The controller 60 includes the setting unit 60A configured or programmed to set the first line L1 representing the first increase rate that is the first increase amount per unit time kept constant for the period between the start point thereof and the intermediate point thereof, and to set the second line L2 representing the second increase rate that is a second increase amount per unit time kept constant for the period between the intermediate point thereof and the end point thereof, the second increase amount being less than the first increase amount, and the control unit 60B configured or programmed to control the first increase rate and the second increase rate based on the first line L1 and the second line L2 set by the setting unit 60A.

The control unit 60B is configured or programmed to control the first increase rate and the second increase rate based on the first line L1 and the second line L2 when the traveling load is not less than the predetermined threshold value.

The setting unit 60A is configured or programmed to change the value of the control signal at the bending point P25 being a boundary line between the first line L1 and the second line L2 based on the traveling load when the traveling change-over valve 34 is shifted from the second state to the first state.

The setting unit 60A is configured or programmed to shift the value of the control signal at the bending point P25 toward the set value W12 as the traveling load becomes larger, and to shift the value of the control signal at the bending point P25 toward the increase value W14 as the traveling load becomes smaller.

The controller 60 is configured or programmed to restore, after the control signal reaches the increase value, the control signal by increasing the value of the increase value at the restoration amount per unit time, the restoration amount being larger than the second reduction amount at the second reduction rate per unit time.

In the above-described embodiment, the change-over unit is constituted of the speed-shift switch 61 configured to be manually operated by an operator or the like; instead, for example, the change-over unit may be incorporated in the controller 60. In this case, the change-over unit is constituted of a computer program stored in the controller 60 or electrical/electronic components (electronic circuit). The change-over unit incorporated in the controller 60 determines whether to shift the traveling change-over valve 34 to the first state (first speed) or to the second state (second speed) based on the detection information from various detection devices installed in the working machine 1, for example, sensors. Then, the change-over unit outputs a control signal corresponding to the first state or the second state to the traveling change-over valve 34 based on the result of the determination. When the traveling change-over valve 34 obtains the control signal corresponding to the first state from the change-over unit, the traveling change-over valve 34 is shifted to the first state, and when traveling change-over valve 34 obtains the control signal corresponding to the second state from the change-over unit, the change-over valve 34 is shifted to the second state.

The controller 60 executes the shock mitigation control to mitigate the speed-shift shock (shock or discomfort) caused in the working machine 1 when performing the speed-shift in either the automatic deceleration or the manual deceleration described above. The shock mitigation control includes a first shock mitigation control and a second shock mitigation control.

In the first shock mitigation control, in automatically decelerating rotation speeds of the traveling motors 36L and 36R from the second speed to the first speed, the controller 60 temporarily reduces the control signal for controlling the opening degree as the operation state of the actuation valve 69 to a mitigation value lower than the set value and then increases the control signal to the set value. Then, during the increasing of the control signal, the traveling change-over valve 34 is shifted from the second state to the first state, thereby mitigating the speed-shift shock.

That is, in the first shock mitigation control, the controller 60 temporarily narrows the opening of the actuation valve 69 (narrows an opening area to reduce the opening degree) to reduce the pilot pressure, which is a pressure of the pilot fluid acting on the pressure receiving portions 53a and 53b of the traveling pumps 53L and 53R from the actuation valve 69 through the operation valves 55, thereby changing angles of the swashplates of the traveling pumps 53L and 53R to reduce delivery rates of hydraulic fluid from the traveling pumps 53L and 53R.

In addition, in the first shock mitigation control, the controller 60 restores the opening of the actuation valve 69, which has temporarily been narrowed, to the size before the narrowing (to expand the opening area) to increase the pilot pressure acting on the pressure receiving portions 53a and 53b of the traveling pumps 53L and 53R from the actuation valve 69 via the operation valves 55, thereby changing the angles of the swashplates of the traveling pumps 53L and 53R to increase the delivery rates of hydraulic fluid from the traveling pumps 53L and 53R (to restore the delivery rates before the opening of the actuation valve 69 is narrowed).

In the second shock mitigation control, in automatically decelerating rotation speeds of the traveling motors 36L and 36R from the second speed to the first speed, the controller 60 controls the driving of the prime mover 32 to reduce the actual rotation speed of the prime mover 32, thereby mitigating the speed-shift shock.

Figure 3A:
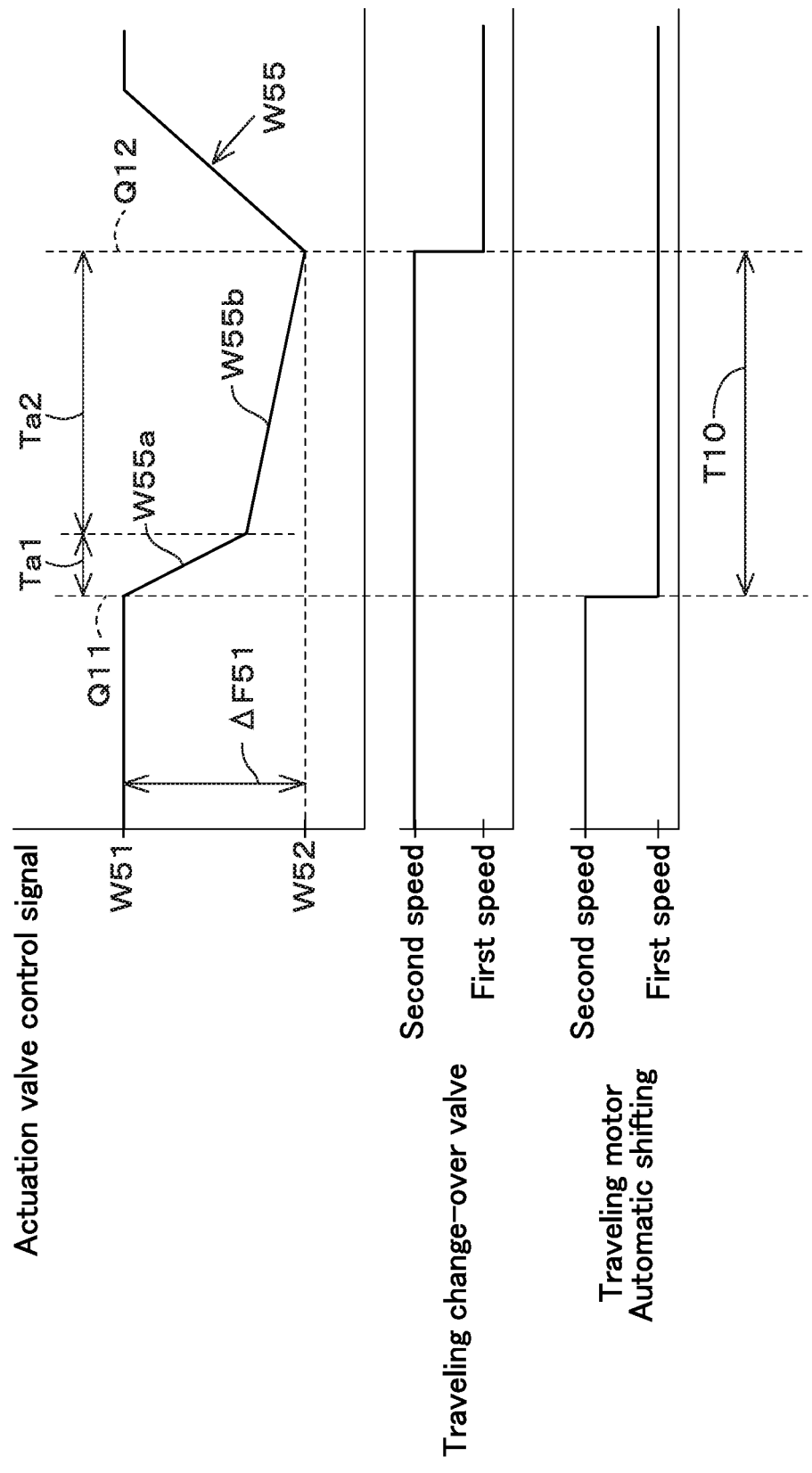
FIG. 3A is a view showing a relationship between the control signal to the actuation valve and a shifting state of a traveling motor in a first shock mitigation control in an automatic deceleration.

FIG. 3A is a view showing a relationship between the control value of the control signal input to the actuation valve 69 and the shifting states of the traveling motors 36L and 36R in the first shock mitigation control in the automatic deceleration.

As shown in FIG. 3A, when a command for the automatic deceleration, i.e., a condition for the automatic deceleration, is established at a time point Q11, the controller 60 sets a reduction amount ΔF51 of the control value of the control signal input to the actuation valve 69 based on a traveling state of the working machine 1. For example, the controller 60 sets the reduction amount ΔF51 to be a larger value when the working machine 1 is traveling straight and sets the reduction amount ΔF51 to be a smaller value when the working machine 1 is pivotally turning. The method of setting the reduction amount ΔF51 is not limited to that of the above-described embodiment, and the reduction amount ΔF51 may be set according to a load of the prime mover 32, that is, a dropping amount which is a difference between the actual rotation speed of the prime mover 32 and the target rotation speed. In this case, the controller 60 reduces the reduction amount ΔF51 when the dropping amount is large and the load of the prime mover 32 is also large relative to predetermined reference values, and increases the reduction amount ΔF51 when the dropping amount is small and the load of the prime mover 32 is also small.

When the reduction amount ΔF51 is set, the controller 60 sets a value obtained by subtracting the reduction amount ΔF51 from a control value (current control value) W51 of the control signal immediately before the mitigation to a first mitigation value W52 in the shock mitigation control.

When the first mitigation value W52 is set, the controller 60 reduces the control value of the control signal output to the actuation valve 69 toward the first mitigation value W52 after the time point Q11. When the control value reaches the first mitigation value W52 at the time point Q12 as shown on a line W55 indicating the control value, the controller 60 outputs a signal to magnetize the solenoid of the traveling change-over valve 34 to shift the traveling change-over valve (change-over valve) 34 from the second state (first speed) to the first state (second speed), thereby performing the automatic deceleration. In addition, after the time point Q12, the control value is restored toward the control value W51 before the reduction, as shown by the line W55.

In more detail, focusing on the first mitigation period Ta from the time point Q11, which is a start point at which the control value of the control signal starts to be reduced, to the time point Q12, which is the end point at which the control value of the control signal stops being reduced (the first mitigation period Ta until the control value reaches the first mitigation value W52), the controller 60 differs the reduction rate of the control value of the control signal in a period (first period) Ta1 from a start point of the first mitigation point Ta to the intermediate point from the reduction rate in a period (second period) Ta2 from the intermediate point to an end point.

On the line W55 indicating the control value in the first mitigation period Ta, the controller 60 sets the first reduction rate in the first period Ta1 based on a slope of the line W55a, sets the second reduction rate in the second period Ta2 based on a slope of the line W55b, and sets the first reduction rate (slope of the line W55a) to be larger than the second reduction rate (slope of the line W55b). That is, the controller 60 sets at least two reduction rates of the control signal (control value) in the first mitigation period Ta.

Figure 3B:
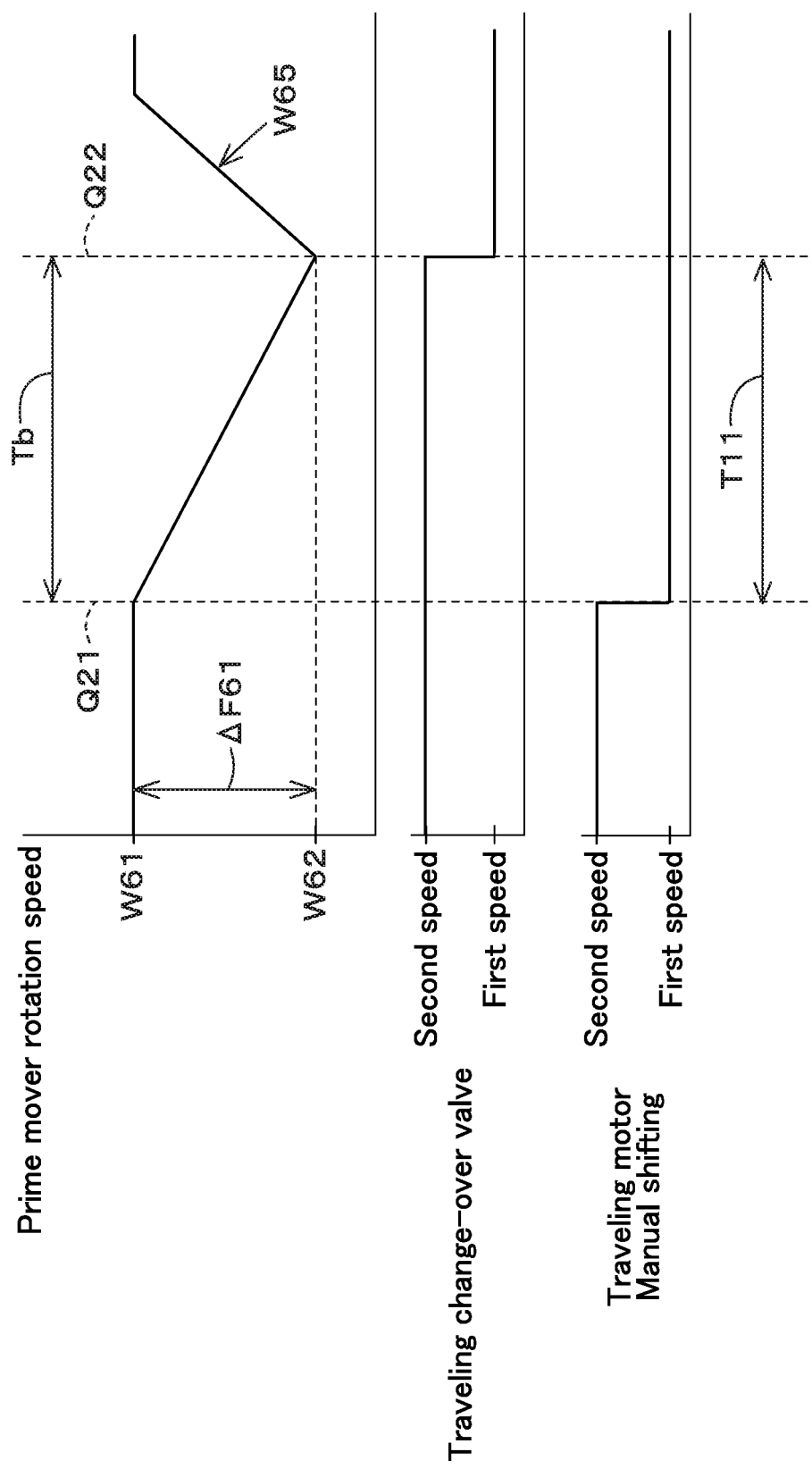
FIG. 3B is a view showing a relationship between an actual rotation speed of a prime mover and the shifting state of the traveling motor in a second shock mitigation control in the manual deceleration.

FIG. 3B is a view showing a relationship between the actual rotation speed of the prime mover 32 and the shifting states of the traveling motors 36L and 36R in the second shock mitigation control in the manual deceleration.

As shown in FIG. 3B, when the manual deceleration command, i.e., the first-speed command due to the operation of the speed-shift switch 61, is obtained at the time point Q21, the controller 60 sets a reduction amount ΔF61 of the actual rotation speed of the prime mover 32. At this time, the controller 60 sets the reduction amount ΔF61 based on the rotation speed of the prime mover 32. For example, the controller 60 sets the reduction amount ΔF61 according to a load of the prime mover 32, i.e., a dropping amount that is a difference between the actual rotation speed of the prime mover 32 and the target rotation speed. When the dropping amount is large and the load of the prime mover 32 is also large, the controller 60 reduces the reduction amount ΔF61, and when the dropping amount is small and the load of the prime mover 32 is also small, the controller 60 increase the reduction amount ΔF61. The method of setting the reduction amount ΔF61 is not limited to the above example. For example, the controller 60 may set the reduction amount ΔF61 to be a larger value when the working machine 1 is traveling straight, and may set the reduction amount ΔF61 to be a smaller value when the working machine 1 is pivotally turning.

When the reduction amount ΔF61 is set, the controller 60 sets a value obtained by subtracting the reduction amount ΔF61 from the target rotation speed W61 of the prime mover 32 to the second mitigation value W62 in the shock mitigation control.

When the second mitigation value W62 is set, the controller 60 reduces the actual rotation speed of the prime mover 32 to the second mitigation value W62 after the time point Q21. As shown on a line W65 indicating the actual rotation speed, when the actual rotation speed of the prime mover 32 reaches the second mitigation value W62 at the time point Q22, the controller 60 outputs a signal to magnetize the solenoid of the traveling change-over valve 34 to shift the traveling change-over valve (change-over valve) 34 from the second state (first speed) to the first state (second speed), thereby performing the manual deceleration to shift rotation speeds of the traveling motors 36L and 36R from the second speed to the first speed. In addition, after the time point Q22, the controller 60 increases (restores) the actual rotation speed of the prime mover 32 toward the target rotation speed W61 before the reduction, as shown by the line W65.

In more detail, focusing on the second mitigation period Tb from the time point Q21, which is a start point at which the actual rotation speed of the prime mover 32 starts to be reduced, to the time point Q22, which is the end point at which the control value of the control signal stops being reduced (the second mitigation period Tb until the actual rotation speed reaches the second mitigation value W62), the controller 60 fixes, as a constant value, a third reduction rate at which the actual rotation speed of the prime mover 32 is reduced.

In the second mitigation period Tb, the controller 60 sets the third reduction rate at which the actual rotation speed of the prime mover 32 is reduced based on a slope of a line W65. The third reduction rate is constant from a start point of the second mitigation period Tb to the end point (reduction rate per unit time is constant). That is, the controller 60 fixes the third reduction rate at which the actual rotation speed of the prime mover 32 is reduced in the second mitigation period Tb.

As shown in FIGS. 3A and 3B, the controller 60 shifts an operation state of the traveling change-over valve (change-over valve) 34 so that an elapsed time T10 from receiving of a command for the automatic deceleration (time point Q11) to shifting of the traveling line change-over valve (change-over valve) 34 to the first state (second speed) (time point Q12) in the first shock mitigation control in the automatic deceleration differs from an elapsed time T11 from receiving of a command for the manual deceleration (time point Q21) to shifting of the traveling change-over valve (change-over valve) 34 to the first state (second speed) (time point Q22) in the second shock mitigation control in the manual deceleration. The elapsed times T10 and T11 may be changed.

The controller 60 may execute the first shock mitigation control in addition to the second shock mitigation control shown in FIG. 3B in performing the manual deceleration.

Figure 3C:
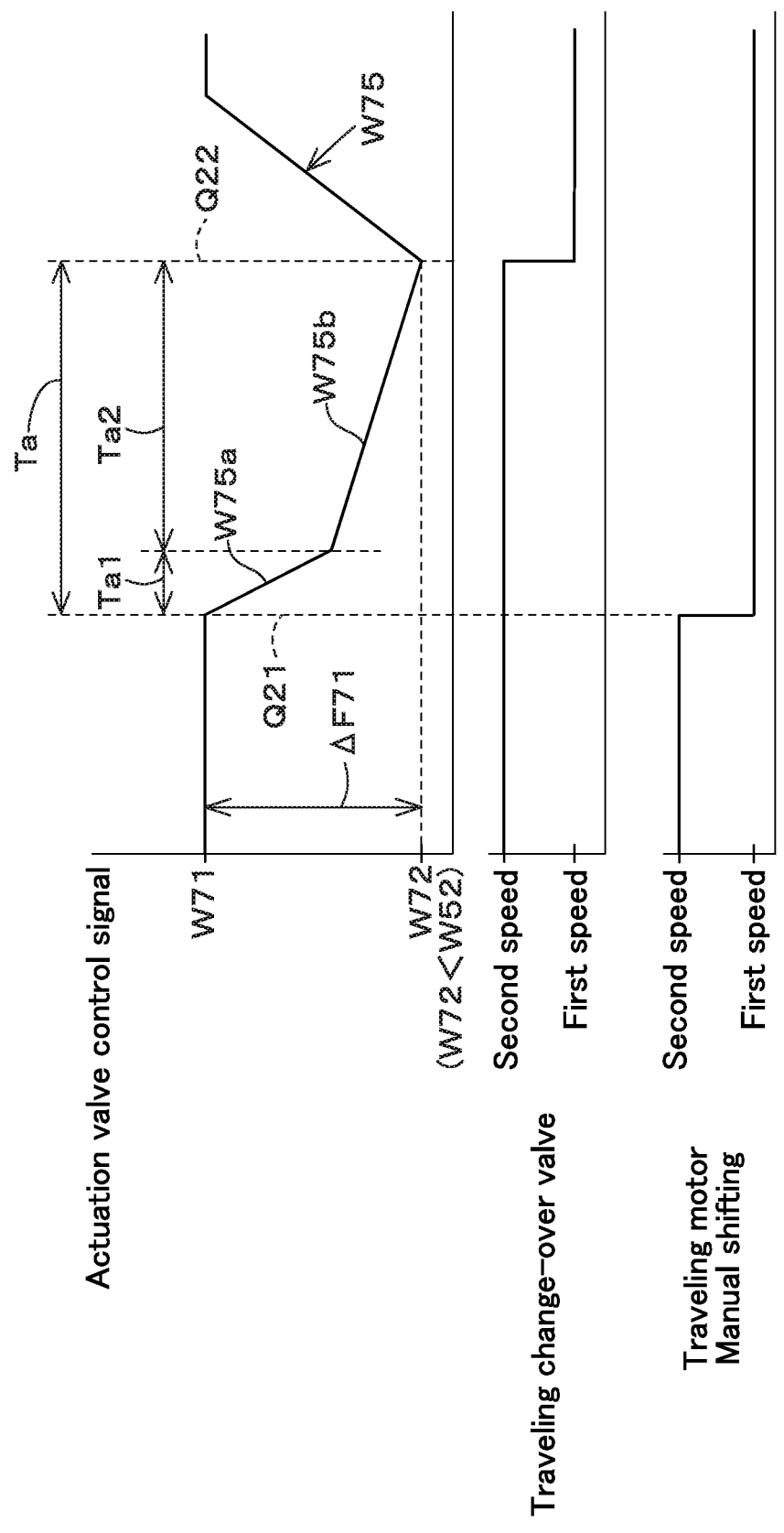
FIG. 3C is a view showing a relationship between the control signal to the actuation valve and the shifting state of the traveling motor in the second shock mitigation control in the manual deceleration.

FIG. 3C is a view showing a relationship between a control value of the control signal output to the actuation valve 69 and the shifting of the traveling motors in the first shock mitigation control in the manual deceleration. In the following explanation, the first shock mitigation control shown in FIG. 3B is also performed in the manual deceleration.

In the first shock mitigation control shown in FIG. 3C, the time point Q21, which is the start point of the second mitigation period Tb, and the time point Q22, which is the end point of the second mitigation period Tb, are the same as those in FIG. 2B, and the timing to start the shock mitigation is the same in the following explanation. In a case where both the second shock mitigation control and the first shock mitigation control are performed in the manual deceleration, the timing of reducing the actual rotation speed of the prime mover 32 and the timing of reducing a control value of the control signal input to the actuation valve 69, and the like are not limited to the examples shown in FIG. 3C when the timing of shifting the traveling change-over valve (change-over valve) 34 from the second state (first speed) to the first state (second speed) is the same.

As shown in FIG. 3C, the controller 60 sets a reduction amount ΔF71 of the control signal input to the actuation valve 69 in the first shock mitigation control, and then sets a value obtained by subtracting the reduction amount ΔF71 from the control value (current control value) W71 of the control signal immediately before the reduction to the first mitigation value W72 in the shock mitigation control. Here, in the first shock mitigation control in the manual deceleration, the controller 60 sets the reduction amount ΔF71 to be larger than the reduction amount ΔF51 in the first shock mitigation control in the automatic deceleration. That is, the controller 60 sets the first mitigation value W72 to be smaller than the first mitigation value W52 in the first shock mitigation control in the manual deceleration. That is, by setting the first mitigation value W72 to be smaller than the first mitigation value W52, the controller 60 makes an opening degree of the actuation valve 69 set in the first shock mitigation control in the manual deceleration to be smaller than an opening degree of the actuation valve 69 set in the first shock mitigation control in the automatic deceleration.

When the first mitigation value W72 is set, the controller 60 reduces a control value of the control signal input to the actuation valve 69 toward the first mitigation value W72 from the time point Q21. As shown by a line W75 indicating the control value, when reaching the first mitigation value W72 the time point Q22, the controller 60 outputs a signal to magnetize the solenoid of the traveling change-over valve 34 to shift the traveling change-over valve (change-over valve) 34 from the second state (first speed) to the first state (second speed), thereby performing the manual deceleration. In addition, after the time point Q22, the control value is increased (restored) toward the control value W71 before the reduction, as shown by the line W75.

In more detail, focusing on the second mitigation period Tb, the controller 60 differs the reduction rate of a control value of the control signal in the period (first period) Ta1 from the start point of the second mitigation period Tb to the intermediate point from that in the period (second period) Ta2 from the intermediate point to the end point.

On the line W75 indicating a control value in the second mitigation period Tb, the controller 60 sets the first reduction rate in the first period Ta1 based on a slope of a line W75a, and sets the second reduction rate in the second period Ta2 based on a slope of a line W75b, and sets the first reduction rate (slope of the line W75a) to be larger than the second reduction rate (slope of the line W75b). That is, the controller 60 sets at least two reduction rates of the control signal (control value) in the second mitigation period Tb.

The working machine 1 includes the prime mover 32, the traveling pumps 53L and 53R driven by power of the prime mover 32 so as to deliver hydraulic fluid, the traveling motors 36L and 36R configured to be rotated by the hydraulic fluid delivered from the traveling pumps 53L and 53R so as to have a rotation speed shiftable between the first speed and the second speed higher than the first speed, the machine body 2 provided thereon with the prime mover 32, the traveling pumps 53L and 53R and the traveling motors 36L and 36R, the traveling change-over valve 34 shiftable between the first state to set the rotation speeds of the traveling motors 36L and 36R to the first speed and the second state to set the rotation speeds of the traveling motors 36L and 36R to the second speed, the speed-shift switch 61 operable to issue the speed-shift command that is either one of the acceleration command to shift the rotation speed of each of the traveling motors 36L and 36R from the first speed stage and the deceleration command to shift the rotation speed of each of the traveling motors from the second speed stage to the first speed stage, the actuation valve 69 configured to control hydraulic fluid flowing to the traveling pumps 53L and 53R, and the controller configured or programmed to selectively perform either the automatic deceleration to shift the traveling change-over valve 34 from the second state to the first state or the manual deceleration to shift the traveling change-over valve 34 from the second state to the first state according to the speed-shift command issued by the speed-shift switch 61. The controller 60 is configured or programed to be capable of performing the first shock mitigation control to reduce an opening degree of the actuation valve 69 and the second shock mitigation control to reduce the rotation speed of the prime mover 32. According to this configuration, the manual deceleration and the automatic deceleration can be performed respectively according to the speed-shift command by the speed-shift switch 61, and the speed-shift shock can be easily mitigated, in performing either manual deceleration or automatic deceleration, by reducing an opening degree of the actuation valve 69 and/or by reducing a rotation speed of the prime mover 32. That is, the speed-shift shock can be easily mitigated, in performing each of the manual deceleration and automatic deceleration, by reducing an opening degree of the actuation valve 69 and/or by reducing a rotation speed of the prime mover 32.

The controller 60 is configured or programmed to perform the first shock mitigation control when performing the automatic deceleration, and to perform the first shock mitigation control or the second shock mitigation control when performing the manual deceleration. According to this configuration, an opening degree of the actuation valve 69 is reduced in the automatic deceleration, and a rotation speed of the prime mover 32 is reduced in the manual deceleration, thereby mitigating the speed-shift shock without deteriorating workability or the like with the working machine 1. In particular, since a rotation speed of the prime mover 32 is reduced in the manual deceleration, a driver (operator) of the working machine 1 can recognize that a rotation number of the prime mover 32 is reduced in the manual deceleration, thereby allowing the working machine 1 to be operated according to an intension of the driver.

The controller 60 is configured or programmed to perform the first shock mitigation control in addition to the second shock mitigation control when performing the manual deceleration. According to this configuration, an opening degree of the actuation valve 69 also can be reduced in performing the manual deceleration, thereby further mitigating the speed-shift shock.

The controller 60 is configured or programmed to set the opening degree of the actuation valve 69 in the first shock mitigation control when performing the manual deceleration as smaller than the opening degree of the actuation valve 69 in the first shock mitigation control when performing the automatic deceleration. According to this configuration, an opening degree of the actuation valve 69 also can be reduced in performing the manual deceleration, thereby further mitigating the speed-shift shock. In other words, when the shock mitigation in the automatic deceleration is performed, an opening degree of the actuation valve 69 can be larger than that in performing the shock mitigation in the manual deceleration, thereby mitigating the speed-shift shock without deteriorating workability in the automatic deceleration.

The actuation valve 69 is configured to change the opening degree thereof in correspondence to the control signal output from the controller 60. The controller 60 is configured or programmed to perform the first shock mitigation control by reducing a value of the control signal to the first mitigation value, and to perform the second shock mitigation control by reducing the rotation speed of the prime mover 32 to the second mitigation value less than the target rotation speed of the prime mover 32. According to this configuration, the first and second mitigation values for mitigation of the speed-shift shock can be set in a simple manner, and thus the actuation valve 69 and the prime mover 32 can be easily controlled.

In the mitigation period in which the control signal output to the actuation valve 69 reaches the mitigation value from the set value, the controller 60, when performing the first shock mitigation control, is configured or programmed to reduce the value of the control signal from the set value to the mitigation value for a mitigation period in such a way that the first reduction rate that is a rate of reducing the value of the control signal for a first part of the mitigation period between a start point thereof and an intermediate point thereof larger than the second reduction rate that is a rate of reducing the value of the control signal for a second part of the mitigation period between the intermediate point thereof and an end point thereof. According to this configuration, responsiveness of the actuation valve 69 can be improved.

The controller 60, when performing the second shock mitigation control, is configured or programmed to make the third reduction rate of the actual rotation speed of the prime mover 32 be kept constant for the second mitigation period until the actual rotation speed reaches the mitigation value. According to this configuration, in performing mitigation of the speed-shift shock, the actual rotation speed of the prime mover 32 is reduced while stabilizing a power output from the prime mover 32, thereby mitigating the speed-shift shock while maintaining workability as much as possible.

The working machine 1 includes the first traveling device 5 disposed on the left portion of the machine body 2, and the second traveling device 5 disposed on the right portion of the machine body 2. The traveling motors 36L and 36R include the first traveling motor configured to transmit a traveling power to the first traveling device 5, and the second traveling motor configured to transmit a traveling power to the second traveling device 5. The traveling pumps 53L and 53R are configured to activate the first traveling motor and the second traveling motor. The traveling change-over valve 34 is configured to shift the first traveling motor and the second traveling motor between the first speed and the second speed. According to this configuration, in the working machine 1 including the first traveling device 5 disposed on the left portion of the machine body 2 and the second traveling device 5 disposed on the right portion of the machine body 2, the speed-shift shock can be mitigated more smoothly.

The controller 60 is capable of setting (changing) control parameters used to execute the first shock mitigation control according to a traveling speed of the working machine 1 (the machine body 2 and the traveling devices 5). The operation of the controller 60 will be described below.

Figure 4A:
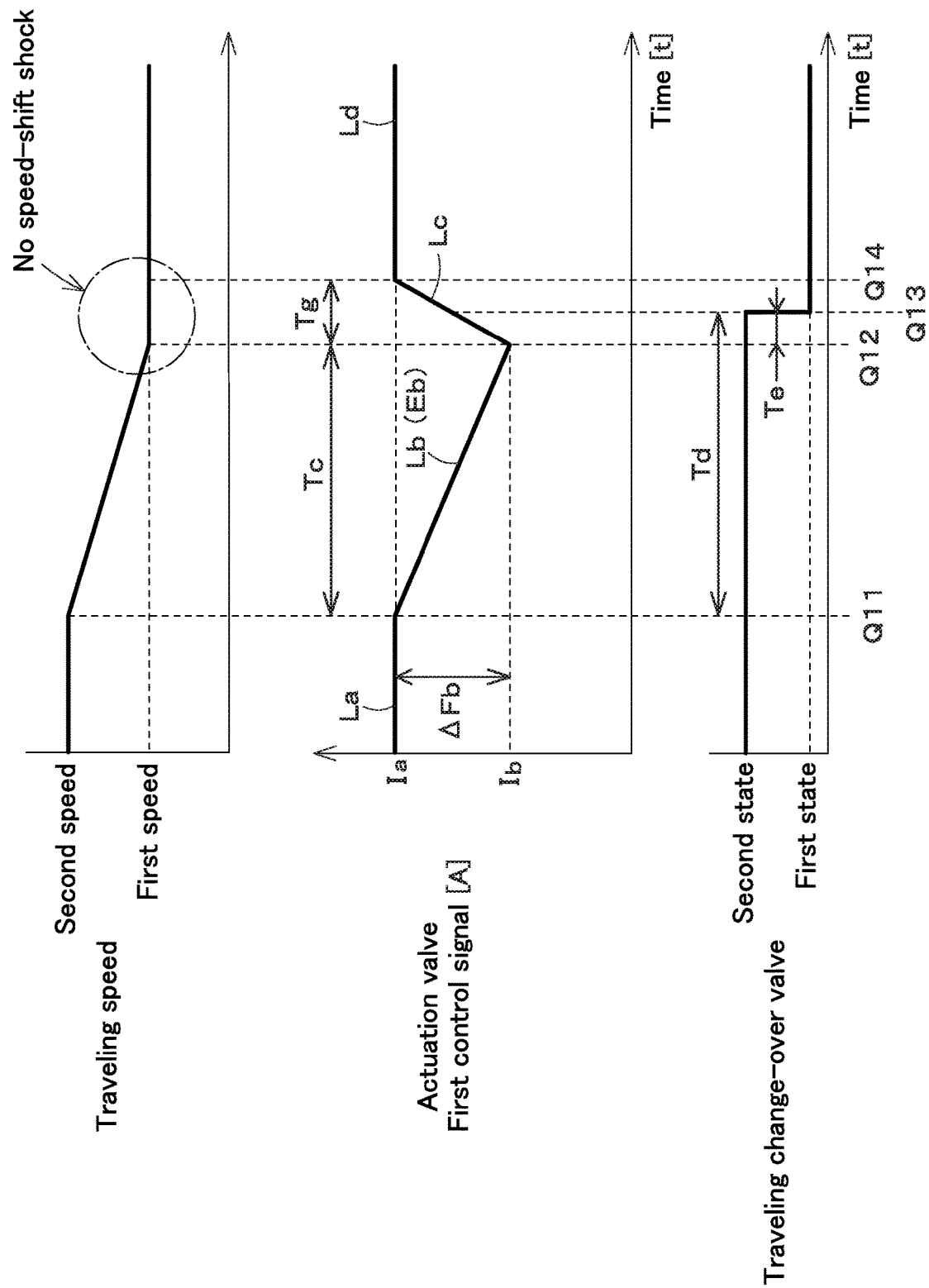
FIG. 4A is a view showing an example of a relationship among a traveling speed of the working machine, a first control signal, and a state of the traveling change-over valve in the first shock mitigation control in the automatic deceleration.

FIG. 4A is a view showing an example of a relationship among a traveling speed of the working machine 1, the first control signal input to the actuation valve 69, and a state of the traveling change-over valve 34 in the first shock mitigation control in the automatic deceleration.

The controller 60 shifts the traveling change-over valve 34 from the second state to the first state in response to the deceleration condition being satisfied at the time point Q11, for example, shown in FIG. 4A, and thus automatically decelerates rotation speeds of the traveling motors 36L and 36R from the second speed to the first speed. In executing the automatic deceleration, the controller 60 executes the first shock mitigation control.

That is, in the first shock mitigation control, the controller 60 temporarily reduces the first control signal for controlling an opening degree of the actuation valve 69 to a mitigation value Ib that is lower than a set value Ia as shown in FIG. 4A (line Lb from the time point Q11 to the time point Q12), and then increases the first control signal to the set value Ia (line Lc from the time point Q12 to the time point Q13). In addition, during increase of the first control signal from the mitigation value Ib to a set value Ia, the controller 60 shifts the traveling change-over valve 34 from the second state to the first state to reduce rotation speeds of the traveling motors 36L and 36R from the second speed to the first speed, thereby mitigating the speed-shift shock.

In addition, the controller 60 sets (changes) the control parameters used to execute the first shock mitigation control according to a traveling speed of the working machine 1 (the machine body 2 and the traveling devices 5). In detail, the controller 60 sets (changes), as the control parameters, a reduction rate (changing rate) Eb at which the first control signal input to the actuation valve 69 is reduced to the mitigation value Ib, a reduction amount (changing amount) ΔFb of the first control signal, a delay time Td for which the traveling change-over valve 34 is shifted from the second state to the first state, and the like according to the actual rotation speed of the prime mover 32.

The actual rotation number of the prime mover 32 is a physical quantity that varies according to a traveling speed of the working machine 1 (the machine body 2 and the traveling devices 5). The controller 60 uses the actual rotation speed of the prime mover 32 detected by the rotation speed detection device 67 as a traveling speed of the working machine 1, and sets (changes) the control parameters such as the reduction rate Eb, the reduction amount ΔFb, the delay time Td, and the like of the first control signal based on the actual rotation speed of the prime mover 32.

The reduction amount ΔFb of the first control signal is a difference between the set value Ia and the mitigation value Ib (ΔFb is equal to a value obtained by subtracting Ib from Ia). The set value Ia is a control value of the first control signal that is input to the actuation valve 69 by the controller 60 when, for example, the deceleration condition has been satisfied (time point Q11) (value on the line La prior in time to time point Q11).

As another example, the set value Ia may be, for example, the target control value of the first control signal (value on the line Ld later in time than the time point Q11) corresponding to the actual rotation speed of the prime mover 32 given when the deceleration condition is satisfied. In this case, the target control value of the first control signal may be determined preliminarily for each rotation speed of the prime mover 32 trough experiment, setting, or simulation, and may be stored in an internal memory of the controller 60 as control data.

The mitigation value Ib is a temporal control value of the first control signal corresponding to the actual rotation speed of the prime mover 32 given when the deceleration condition is satisfied, and is a value for reducing an opening degree of the actuation valve 69 to be lower than the set value Ia to change angles of the swashplates of the traveling pumps 53L and 53R, thereby reducing delivery rates of hydraulic fluid delivered from the traveling pumps 53L and 53R. For example, the mitigation value Ib is determined for each rotation speed of the prime mover 32 through experiment, simulation, or designing preliminarily so that the speed-shift shock can be reduced, and is stored in the internal memory of the controller 60 as control data.

The controller 60 sets the set value Ia and the mitigation value Ib of the first control signal based on the control data in the internal memory and the actual rotation speed of the prime mover 32. Then, the controller 60 subtracts the mitigation value Ib from the set value Ia to obtain the reduction amount ΔFb. In this example, the control value of the first control signal, the target control value, the set value Ia, and the mitigation value Ib are current values of current signals.

Figure 5:
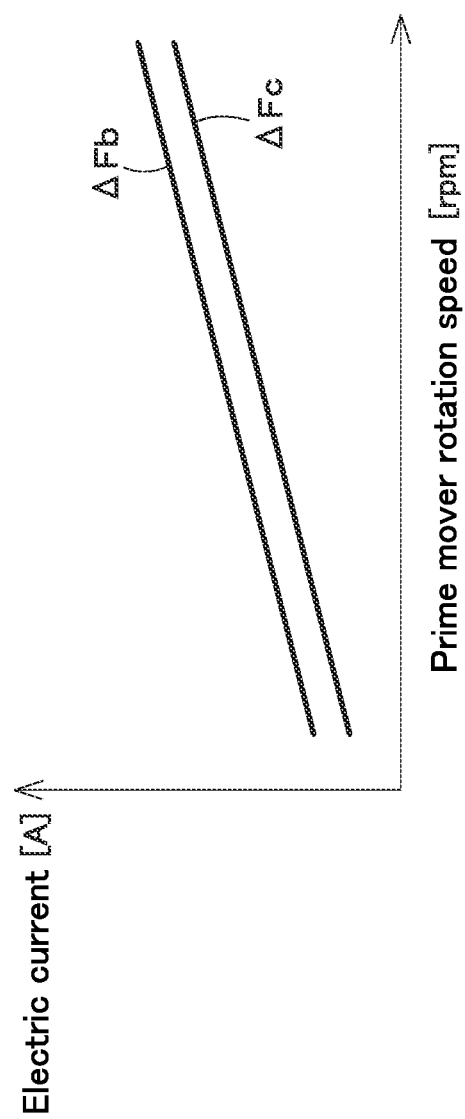
FIG. 5 is a view showing an example of a relationship between the actual rotation speed of the prime mover and a reduction amount of a first control signal.

FIG. 5 is a view showing an example of a relationship between the actual rotation speed of the prime mover 32 and the reduction amount of the control value (current value) of the first control signal of the actuation valve 69. As shown by a thick solid line in FIG. 5, the controller 60 sets the reduction amount ΔFa of the first control signal to be larger as the actual rotation speed of the prime mover 32 (i.e., a traveling speed of the machine body 2) becomes faster.

In FIG. 4A, the reduction rate Eb of the first control signal is a rate (slope of the line Lb) at which the first control signal is reduced, to the mitigation value Ib, from a control value of the first control signal given when the deceleration condition is satisfied. That is, the reduction rate Eb is a value obtained by dividing the reduction amount ΔFb by the reduction time Tc for which the first control signal given when the deceleration condition is satisfied to the mitigation value Ib (Eb is equal to a value obtained by dividing ΔFb by Tc).

For example, the reduction time Tc of the first control signal is determined for each rotation speed of the prime mover 32 preliminarily through experiment, simulation, or designing so that the speed-shift shock can be mitigated, and is stored in the internal memory of the controller 60 as control data. The controller 60 sets the reduction time Tc based on the control data in the internal memory and the actual rotation speed of the prime mover 32, and obtains the reduction rate Eb by dividing the reduction amount ΔFb by the reduction time Tc.

As another example, the reduction rate Eb of the first control signal may be determined for each rotation speed of the prime mover 32 preliminarily through experiment, simulation, or designing, and stored in the internal memory of the controller 60 as control data. In this case, the controller 60 sets the reduction rate Eb of the first control signal based on the control data in the internal memory and the actual rotation speed of the prime mover 32.

Figure 6:
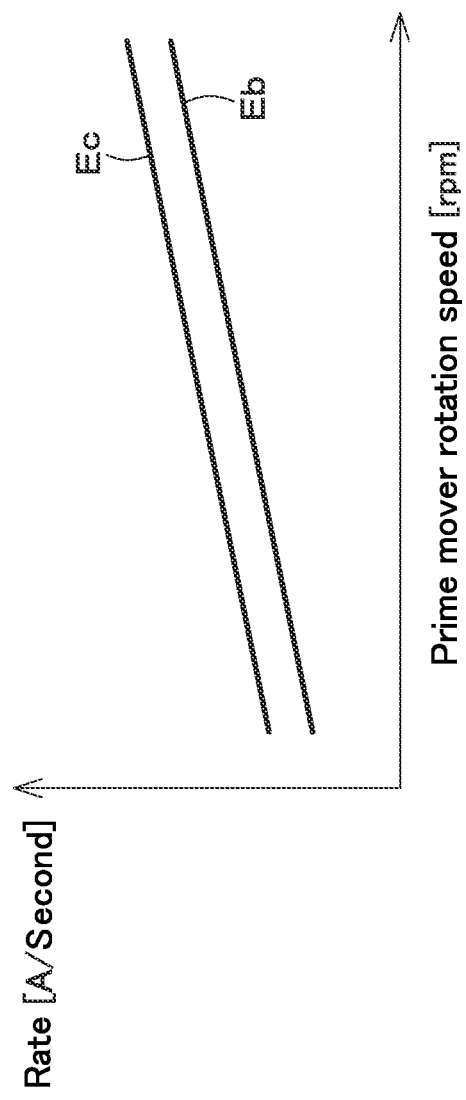
FIG. 6 is a view showing an example of a relationship between the actual rotation speed of the prime mover and a reduction rate of the first control signal.

FIG. 6 is a view showing an example of a relationship between the actual rotation speed of the prime mover 32 and the reduction rate of the first control signal of the actuation valve 69. As shown by a thick solid line in FIG. 6, the controller 60 sets the reduction rate Eb of the first control signal to be high as the actual rotation speed of the prime mover 32 (i.e., a traveling speed of the machine body 2) is increased.

In FIG. 4A, the delay time Td is a time from the starting of reducing the first control signal to the shifting of the traveling change-over valve 34 from the second state to the first state (time from the time point Q11 to the time point Q13). In more detail, the delay time Td is a time obtained by adding the reduction time Tc of the first control signal to an increasing intermediate time Te. The increasing intermediate time Te is a time shorter than an increasing time Tg for which the first control signal is increased from the mitigation value Ib to the set value Ia (from the time point Q12 to the time point Q13).

For example, the increasing intermediate time Te is determined for each speed of the prime mover 32 preliminarily through experiment, simulation, or designing so that the speed-shift shock can be mitigated, and is stored in the internal memory of the controller 60 as control data. Based on the control data in the internal memory and the actual rotation speed of the prime mover 32, the controller 60 sets the increasing intermediate time Te, and obtains the delay time Td by adding the reduction time Tc of the first control signal to the increasing intermediate time Te.

As another example, the delay time Td may be determined for each rotation speed of the prime mover 32 preliminarily through experiment, simulation, or designing so that the speed-shift shock can be mitigated, and stored in the internal memory of the controller 60 as control data. In this case, the controller 60 sets the delay time Td based on the control data in the internal memory and the actual rotation speed of the prime mover 32.

Figure 7:
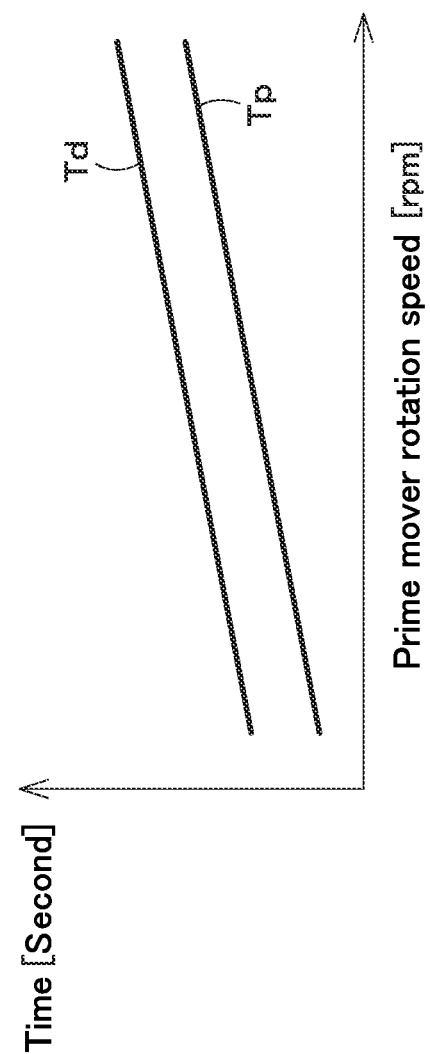
FIG. 7 is a view showing an example of a relationship between the actual rotation speed of the prime mover and a delay time.

FIG. 7 is a view showing an example of a relationship between the actual rotation speed of the prime mover 32 and the delay time. As shown by the thick solid line in FIG. 7, the controller 60 sets the delay time Td longer as the actual rotation speed of the prime mover 32 (i.e., the traveling speed of the machine body 2) becomes faster.

As another example, the rise time Tg (FIG. 4A) may be set for each rotation speed of the prime mover 32 preliminarily through experiment, simulation, or designing so that the speed-shift shock can be mitigated, and stored in the internal memory of the controller 60 as control data. In this case, the controller 60 sets the increasing time Tg based on the control data in the internal memory and the actual rotation speed of the prime mover 32. Then, the controller 60 obtains the increasing intermediate time Te and the delay time Td based on the increasing time Tg and the reduction amount (increasing amount) AIb. In addition, the controller 60 obtains an increase rate (slope of the line Lc) of the first control signal based on the increasing time Tg and the reduction amount ΔFb, and increases (restores) the first control signal from the mitigation value Ib to the set value Ia at the increase rate.

Or, the increasing speed of the first control signal may be determined for each rotation speed of the prime mover 32 preliminarily through experiment, simulation, or designing so that the speed-shift shock can be mitigated, and stored in the internal memory of the controller 60 as control data. In this case, the controller 60 sets the increasing speed of the first control signal based on the control data in the internal memory and the actual rotation speed of the prime mover 32, and obtains the increasing intermediate time Te and the delay time Td based on the increase rate and the reduction amount ΔFb. Then, the controller 60 increases the first control signal from the mitigation value Ib to the set value Ia at the increase rate of the first control signal.

The above-described method of setting (changing) the control parameters is an example, and the method is not limited thereto. In addition, the relationship between the actual rotation speed of the prime mover 32 and each of the reduction amount ΔFb, reduction rate Eb, and delay time Td of the first control signal shown in FIGS. 5 to 7 is an example, and the relationship is not limited thereto.

When the control parameters such as the reduction amount ΔFb, the reduction rate Eb, and the delay time Td of the first control signal are set, the controller 60 reduces the first control signal to the mitigation value Ib temporarily and then increases (restores) to the set value Ia based on the control parameters. In addition, during the increase of the first control signal from the mitigation value Ib to the set value Ia, the controller 60 shifts the traveling change-over valve 34 from the second state to the first state to reduce rotation speeds of the traveling motors 36L and 36R from the second speed to the first speed, thereby mitigating the speed-shift shock.

In detail, in the first shock mitigation control executed in the automatic deceleration in the working machine 1, the first control signal input by the controller 60 to the actuation valve 69 is reduced to the mitigation value Ib, thereby reducing an opening degree of the actuation valve 69. In addition, accordingly, at least one of the traveling pressures V1 to V4 acting on the traveling fluid passages 45 is reduced, delivery rates of the hydraulic fluid from the traveling pumps 53L and 53R are reduced, rotation speeds of the traveling motors 36L and 36R are slowed down, and traveling speeds of the working machine 1 (the machine body 2 and the traveling devices 5) is also slowed down.

In addition, after the controller 60 reduces a control value of the first control signal to the mitigation value Ib, the controller 60 increases (restores) the control value to the set value Ia, thereby increasing an opening degree of the actuation valve 69. In response to this, at least one of the traveling pressures V1 to V4 acting on the traveling fluid passages 45 is increased, the delivery rates of the hydraulic fluid from the traveling pumps 53L and 53R are increased, the rotation speeds of the traveling motors 36L and 36R are increased, and the traveling speed of the working machine 1 is increased.

When the controller 60 shifts the traveling change-over valve 34 from the second state to the first state during the increasing of the first control signal, rotation speeds of the traveling motors 36L and 36R are shifted from the second speed (high speed) to the first speed (low speed), and then a traveling speed of the working machine 1 (machine body 2 and traveling devices 5) is also shifted from the second speed (high speed) to the first speed (low speed).

The change in an opening degree of the actuation valve 69 shows the same behavior as the change in a control value of the first control signal, for example, as shown in FIG. 4A. In addition, the traveling pressures V1 to V4 acting on the traveling fluid passages 45, delivery rates of hydraulic fluid from the traveling pumps 53L and 53R, and rotation speeds of the traveling motors 36L and 36R show the same behavior as the change in a traveling speed of the working machine 1, for example, as shown in FIG. 4A.

Figure 8:
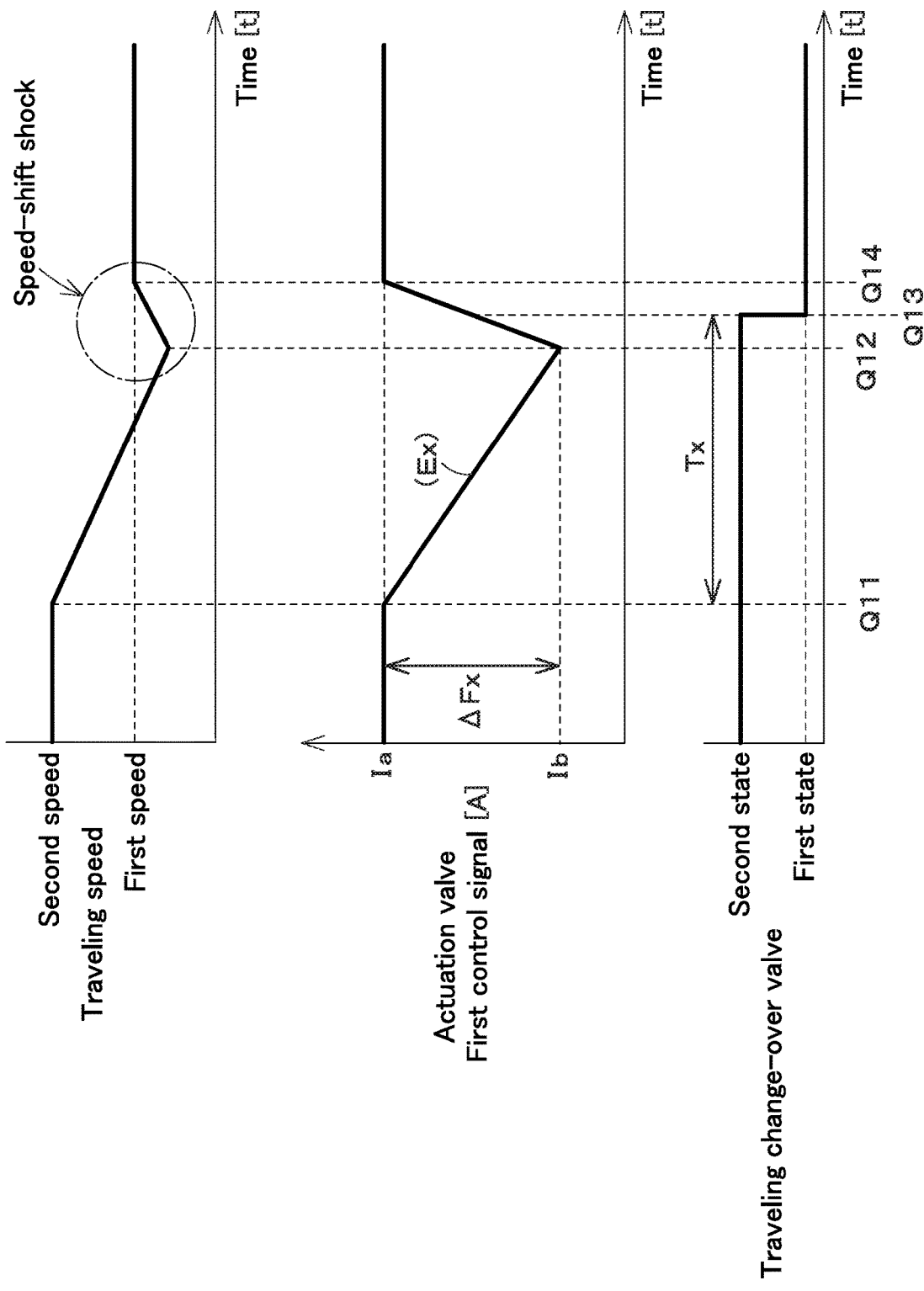
FIG. 8 is a view showing an example of a relationship among the traveling speed of the working machine in the first shock mitigation control, the first control signal, the state of the traveling change-over valve in a conventional automatic deceleration.

FIG. 8 is a view showing an example of a relationship between a traveling speed of the working machine 1, the first control signal input to the actuation valve 69, and a state of the traveling change-over valve 34 in the conventional first shock mitigation control in the automatic deceleration.

In the conventional manner, each of control parameters such as the reduction amount ΔFx, the reduction rate Ex, and the delay time Tx of the first control signal that controls an opening degree of the actuation valve 69 is a constant value. Accordingly, when the controller 60 executes the first shock mitigation control based on the reduction amount ΔFx, reduction rate Ex, and delay time Tx of the first control signal in the automatic deceleration, delivery rates of the hydraulic fluid from the traveling pumps 53L and 53R and rotation speeds of the traveling motors 36L and 36R may be suddenly changed, depending on a rotation speed of the prime mover 32 at this time, immediately after the speed shift in which a state of the traveling change-over valve 34 is shifted. Then, as shown in FIG. 8, a traveling speed of the working machine 1 is changed rapidly up and down immediately after the speed shift, and the speed-shift shock may fail to be effectively mitigated.

In contrast, in the present embodiment, the control parameters such as the reduction amount ΔFb, the reduction rate Eb, and the delay time Td of the first control signal for the controller 60 to execute the first shock mitigation control are changed as described above according to a rotation speed of the prime mover 32 (equivalent to a traveling speed of the machine body 2). Then, the controller 60 executes the first shock mitigation control based on the reduction amount ΔFb, the reduction rate Eb, and the delay time Td of the first control signal in the automatic deceleration. Accordingly, as shown in FIG. 4A, a traveling speed of the working machine 1 (machine body 2) is suppressed from being changed rapidly up and down immediately after the speed shift in which a state of the traveling change-over valve 34 is shifted. Then, a traveling speed of the working machine 1 and rotation speeds of the traveling motors 36L and 36R are smoothly changed from the second speed, which is the high speed stage before the speed shift (deceleration), to the first speed, which is the low speed stage after the speed shift (deceleration), thereby mitigating the speed-shift shock effectively.

In the above-described embodiment, in the automatic deceleration in the working machine 1, the controller 60 executes the first shock mitigation control and changes the control parameters such as the reduction amount ΔFb, the reduction rate Eb, and the delay time Td of the first control signal input to the actuation valve 69, according to a rotation speed of the prime mover 32; however, the changing manner is not limited thereto. The controller 60 may execute the first shock mitigation control in the speed shift for acceleration of the working machine 1, and the control parameters for executing the first shock mitigation control may be changed according to the actual rotation speed of the prime mover 32.

Figure 4B:
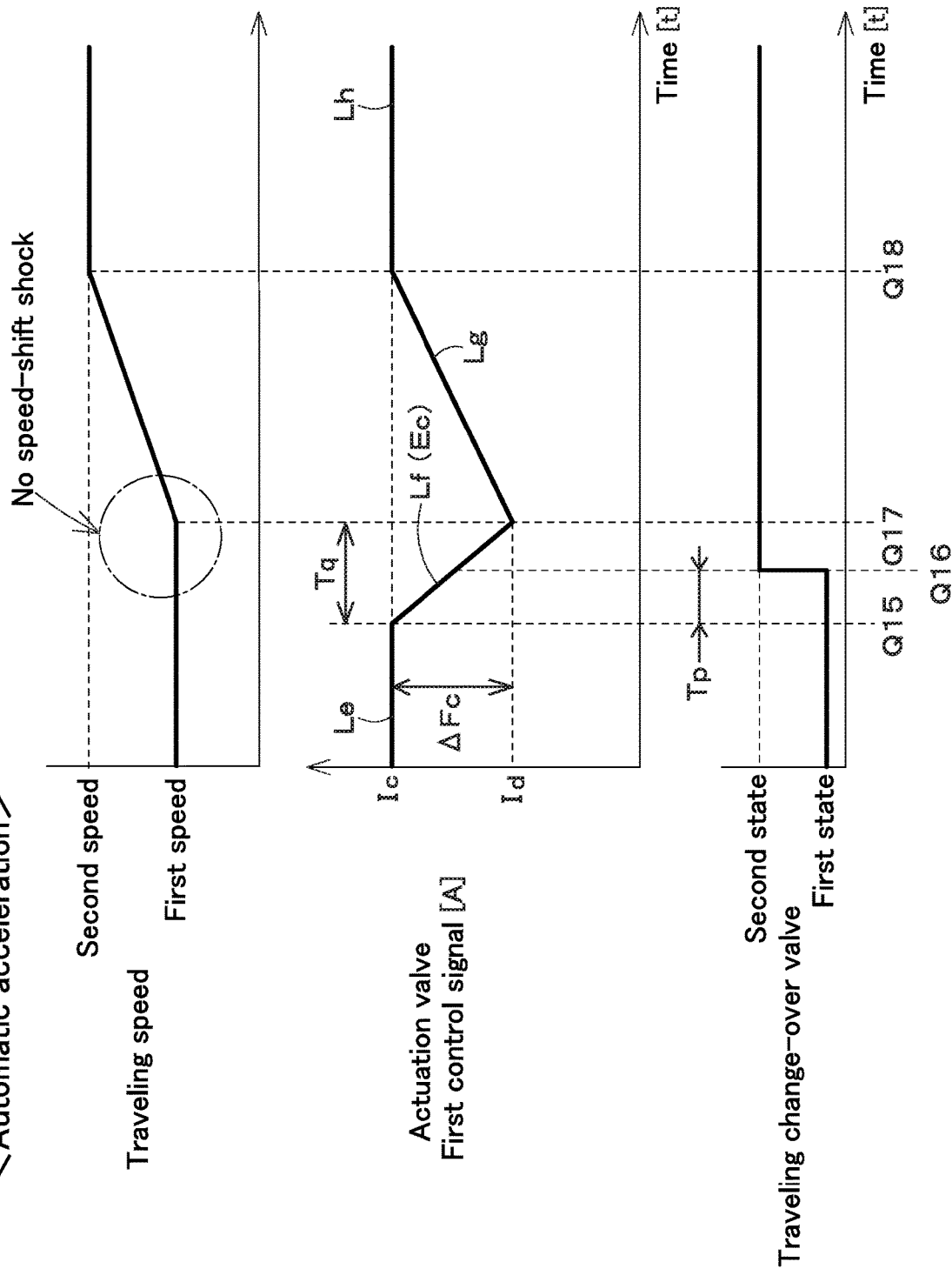
FIG. 4B is a view showing an example of a relationship among the traveling speed of the working machine, the first control signal, and the state of the traveling change-over valve in the first shock mitigation control in an automatic acceleration.

FIG. 4B is a view showing an example of a relationship among a traveling speed of the working machine 1, the first control signal of the actuation valve 69, and a state of the traveling change-over valve 34 in the first shock mitigation control in the automatic acceleration.

The controller 60 determines that a predetermined acceleration condition has been satisfied when, for example, one of the traveling pressures V1 to V4 becomes equal to or less than the acceleration threshold as traveling loads applied to the traveling motors 36L and 36R (at time point Q15 in FIG. 4B), and performs the automatic acceleration to automatically accelerate rotation speeds of the traveling motors 36L and 36R (traveling speed of the working machine 1) from the first speed to the second speed via a neutral state. In performing this automatic acceleration, the controller 60 executes the first shock mitigation control.

That is, as shown in FIG. 4B, in the first shock mitigation control, the controller 60 temporarily reduces a control value of the first control signal (current value of a current signal) input to the actuation valve 69 to a mitigation value Id at which an opening degree of the actuation valve 69 is lower than that at the set value Ic (line Lf from the time point Q15 to a time point Q17), and then increases the control value to the set value Ic (line Lg from the time point Q17 to a time point Q18). In addition, during the reduction of the first control signal to the mitigation value Id, the controller 60 shifts the traveling change-over valve 34 from the first state to the second state to increase rotation speeds of the traveling motors 36L and 36R from the first speed to the second speed, thereby mitigating the speed-shift shock.

In addition, the controller 60 sets (changes) the control parameters used to execute the first shock mitigation control according to a traveling speed of the working machine 1 (the machine body 2 and the traveling devices 5). In detail, the controller 60 sets (changes), as the control parameters, a reduction rate (change rate) Ec at which the first control signal input to the actuation valve 69 is reduced to the mitigation value Id, a reduction amount (changing amount) ΔFc of the first control signal, a delay time Tp for which the traveling change-over valve 34 is shifted from the first state to the second state, and the like, according to the actual rotation speed of the prime mover 32.

The reduction amount ΔFc of the first control signal is a difference between the set value Ic and the mitigation value Id (ΔFc is equal to a value obtained by subtracting Id from Ic). The set value Id is a control value of the first control signal given when, for example, the acceleration condition is satisfied (time point Q15) (value on the line Le prior in time to the point Q15). The mitigation value Id is a temporal control value of the first control signal corresponding to the actual rotation speed of the prime mover 32 given when the acceleration condition is satisfied, and is a value for reducing an opening degree of the actuation valve 69 to be lower than the set value Id to change angles of the swashplates of the traveling pumps 53L and 53R, thereby reducing delivery rates of hydraulic fluid delivered from the traveling pumps 53L and 53R. The set value Ic and the mitigation value Id are current values and are set in the same manner as those for the set value Ia and the mitigation value Ib in the above-described automatic deceleration. The mitigation value ΔFc is a changing rate of an electric current and is set according to the actual rotation speed of the prime mover 32 in the same manner as that for the mitigation value ΔFb in the above-described automatic deceleration. As the actual rotation speed of the prime mover 32 becomes faster, the reduction amount ΔFc of the first control signal becomes larger (see FIG. 5).

The reduction rate Ec of the first control signal is a rate at which the first control signal is reduced from the control value of the first control signal given when the acceleration condition is satisfied to the mitigation value Id (slope of the line Lf in FIG. 4B). For example, the reduction rate Ec of the first control signal is obtained by dividing the reduction amount ΔFc by the reduction time Tq for which the first control signal given when the increasing speed condition is satisfied to the mitigation value Id (Vc is equal to a value obtained by dividing ΔFc by Tq). That is, the reduction rate Ec is set according to the actual rotation speed of the prime mover 32 in the same manner as that for the reduction rate Eb in the above-described automatic deceleration. In addition, the reduction time Tq is set in the same manner as that for the reduction time Tc in the above-described automatic deceleration. As the actual rotation speed of the prime mover 32 becomes faster, the reduction time Tq of the first control signal becomes faster (see FIG. 6).

The delay time Tp is a time from the starting of reducing the first control signal to the shifting of the traveling change-over valve 34 from the first state to the second state (time from the time point Q15 to the time point Q16). The delay time Tp is set according to the actual rotation speed of the prime mover 32 in the same manner as that for the delay time Td in the above-described automatic deceleration. As the actual rotation speed of the prime mover 32 becomes faster, the delay time Tp becomes long (see FIG. 7).

When the controller 60 sets the control parameters such as the reduction amount ΔFc of the first control signal, the reduction rate Ec, and the delay time Tp, the controller 60 temporarily reduces the first control signal to the mitigation value Id based on the control parameters, and then increases (restores) the set value Ic. In addition, during the reduction of the first control signal to the mitigation value Id, the controller 60 shifts the traveling change-over valve 34 from the first state to the second state to increase rotation speeds of the traveling motors 36L and 36R from the first speed to the second speed, thereby mitigating the speed-shift shock.

In the above-described embodiment, the control parameters such as the reduction amounts ΔFb and ΔFc, the reduction rates Eb and Ec, and the delay times Td and Tp of the first control signal for the controller 60 to execute the first shock mitigation control are changed according to the actual rotation speed of the prime mover 32; however, the changing manner is not limited thereto. The controller 60 may change (set) the control parameters for executing the first shock mitigation control according to the physical quantities that change correspondingly with a traveling speed of the working machine 1 (machine body 2), for example, rotation speeds of the traveling motors 36L and 36R, a traveling speed of the traveling device 5, a pilot pressure acting on the actuation valve 69, traveling pressures acting on the traveling fluid passages 45, angles of the swashplates of the traveling pumps 53L and 53R, traveling loads (traveling pressure V1 to V4), or the like.

Or, a traveling speed of the working machine 1 (machine body 2) may be detected by a detection device such as a sensor or the like, and the controller 60 may change (set) the control parameters for executing the first shock mitigation control according to the detection result. In addition, the controller 60 may change at least one of the reduction amounts ΔFa and ΔFc, the reduction rates Eb and Ec, and the delay times Td and Tp of the first control signal according to a traveling speed (or a physical quantity corresponding to the traveling speed) of the working machine 1 (the machine body 2).

FIGS. 4A and 4B show the traveling change-over valve 34 capable of being shifted at once from one state to the other between the first and second states; however, a control value of the control signal input by the controller 60 to the second change-over valve 72 of the traveling change-over valve 34 is in fact varied over some length of time to change states of the second change-over valve 72 and the first change-over valves 71L and 72R of the traveling change-over valve 34. The control signal to be input by the controller 60 to the traveling change-over valve 34 (second change-over valve 72) is hereinafter referred to as a "second control signal."

FIG. 9A is a view showing an example of change in the second control signal input by the controller 60 to the traveling change-over valve 34 in the automatic speed-shift (automatic acceleration and automatic deceleration).

As described above, the controller 60 executes the first shock mitigation control in performing the automatic acceleration when a predetermined acceleration condition is satisfied, and as shown in the left part from a time point Q41 of FIG. 9A, in the first shock mitigation control, a control value (in this example, current value of a current signal) of the second control signal input to the traveling change-over valve 34 (second change-over valve 72) to shift the traveling change-over valve 34 from the first state to the second state.

In detail, for example, when the controller 60 starts to reduce the first control signal of the actuation valve 69 toward the mitigation value as described above, the controller 60 increases at once a control value of the second control signal input to the traveling change-over valve 34 from a control value I1 (line L4a in FIG. 9A) defined corresponding to the first state (first speed) to a control value I2 defined corresponding to the neutral state (line L4b). In this manner, the traveling change-over valve 34 (second change-over valve 72 and first change-over valves 71L and 71R) is shifted from the first state to the neutral state.

When the second control signal reaches the control value I2, the controller 60 increases the second control signal at an increase rate (changing rate) Ed until the second control signal reaches a control value I3 defined corresponding to the second state (second speed) (line L4c). During the increase of the second control signal, the traveling change-over valve 34 is shifted to the second state. In detail, in FIG. 9A, an intersection X1 of a boundary line between the neutral state and the second state and the line L4c of the second control signal of the traveling change-over valve 34 corresponds to the shifting timing Q16 of the traveling change-over valve 34 in FIG. 4B. The increase rate Ed is set by the controller 60 based on, for example, a rotation speed of the prime mover 32 given when the first control signal of the actuation valve 69 starts to be reduced (time point Q15 in FIG. 4B).

When the second control signal reaches the control value I3, the controller 60 increases at once the second control signal until the second control signal reaches a control value I4 set corresponding to the second state (second speed) (line L4d in FIG. 9A). In this manner, rotation speeds of the traveling motors 36L and 36R and a traveling speed of the working machine 1 (machine body 2) are shifted to the second speed.

In performing the automatic acceleration of rotation speeds or the like of the traveling motors 36L and 36R from the first speed to the second speed as described above, the controller 60 increases the second control signal input to the traveling change-over valve 34 in three steps.

After that, in response to the predetermined deceleration condition being satisfied at the time point Q41, the controller 60 executes the first shock mitigation control in performing the automatic deceleration as described above, and in the first shock mitigation control, the controller 60 changes a control value of the second control signal input to the traveling change-over valve 34 is changed as shown in the right part from the time point Q41 of FIG. 9A to shift the traveling control valve 34 from the second state to the first state.

In detail, for example, when the controller 60 starts to increase the first control signal of the actuation valve 69 from the mitigation value Ib toward the set value Ia (FIG. 4A) as described above, a control value of the second control signal input to the traveling change-over valve 34 is reduced at once from the control value I4 (line L4e in FIG. 9A) defined corresponding to the second state (second speed) to a control value I5, which is defined corresponding to the neutral state (line L4f). In this manner, the traveling change-over valve 34 is shifted from the first state to the neutral state.

When the second control signal reaches the control value I5, the controller 60 reduces the second control signal at a reduction rate (changing rate) Eg until the second control signal reaches a control value I6 defined corresponding to the first state (first speed) (line L4g). During the reduction of the second control signal, the traveling change-over valve 34 is shifted to the first state. In detail, in FIG. 9A, an intersection X2 of a boundary line between the neutral state and the first state and the line L4g of the second control signal of the traveling change-over valve 34 corresponds to a shifting timing Q13 of the traveling change-over valve 34 in FIG. 4A. The reduction rate Eg is set by the controller 60 based on, for example, a rotation speed of the prime mover 32 given when the first control signal of the actuation valve 69 starts to be reduced (time point Q11 in FIG. 4A).

When the second control signal reaches the control value I6, the controller 60 reduces at once the second control signal until the second control signal reaches the control value I1 set corresponding to the first speed (line L4h in FIG. 9A). In this manner, rotation speeds of the traveling motors 36L and 36R and a traveling speed of the working machine 1 (machine body 2) are shifted to the first speed.

In performing the automatic deceleration of rotation speeds or the like of the traveling motors 36L and 36R from the second speed to the first speed as described above, the controller 60 reduces the second control signal input to the traveling change-over valve 34 in three steps.

The relationships among the above-described control values I1 to I6 of the second control signal, a state of the traveling change-over valve 34, and the speed shift of the traveling motors 36L and 36R or the like (working machine 1) is stored preliminarily in the internal memory of the controller 60. In addition, the control data used to set the increase rate Ed and the reduction rate Eg of the control signal are also stored in the internal memory of the controller 60 preliminarily.

As described above, in increasing or reducing a control value of the second control signal input to the traveling change-over valve 34 in three steps during the automatic speed-shift of the traveling motors 36L and 36R or the like, the controller 60 is capable of changing the control parameters such as the control values I1 to I6 of the second control signal, an increase amount (changing amount) from the control value I2 to the control value I3, a reduction amount (changing amount) from the control value I5 to the control value I6, the change rates Ed and Eg, and the like according to a rotation speed of the prime mover 32 and a traveling speed of the working machine 1 (machine body 2). For example, as a rotation speed of the prime mover 32 is increased, the change rates Ed and Eg become high.

In addition, the controller 60 is capable of changing the control parameters such as a shifting period Tj from the starting of increasing the second control signal from the control value I1 to the shifting of the traveling change-over valve 34 to the second state and a shifting period Tk from the starting of reducing the second control signal from the control value I4 to the shifting of the traveling change-over valve 34 from the second state, according to a rotation speed of the prime mover 32 and a traveling speed of the working machine 1. The shifting period Tj is included in the delay time Tp shown in FIG. 4B. The shifting period Tk in FIG. 9A is included in the delay time Td shown in FIG. 4A. For example, as a rotation speed of the prime mover 32 is increased, the shifting periods Tj and Tk become long.

In addition, the controller 60 is capable of changing the control parameters such as a period Tj1 in which the second control signal is being increased after the traveling change-over valve 34 has been shifted to the second state and a period Tk1 in which the second control signal is being reduced after the traveling change-over valve 34 has been shifted to the first state, according to a rotation speed of the prime mover 32 and a traveling speed of the working machine 1. For example, as a rotation speed of the prime mover 32 becomes higher, the periods Tj1 and Tk1 become long. A period obtained by adding the periods Tj and Tj1 may be included in the delay time Tp shown in FIG. 4B as the shifting period in which the traveling change-over valve 34 is shifted from the first state to the second state. In addition, a period obtained by adding the period Tk to the period Tk1 may be included in the delay time Td shown in FIG. 4A as the shifting period in which the traveling change-over valve 34 is shifted from the second state to the first state.

During or immediately after the operation of the above-described automatic deceleration, when the traveling loads (traveling pressures V1 to V4), for example, are reduced and the traveling pressures V1 to V4 become equal to or less than a restoration threshold, the controller 60 automatically restores (accelerates) rotation speeds or the like of the traveling motors 36L and 36R from the first speed to the second speed.

That is, the controller 60 performs the automatic acceleration to restore rotation speeds or the like of the traveling motors 36L and 36R from the first speed to the second speed in response to the above-described return condition being satisfied. In this automatic acceleration, the controller 60 increases the second control signal input to the traveling change-over valve 34 from the control value I1 defined corresponding to the first speed to the control value I2 defined corresponding to the neutral state and then to the control values I3 and I4 defined corresponding to the second speed, as shown in the left part from the time point Q41 of FIG. 9A. In this manner, the traveling change-over valve 34 is shifted from the first state to the second state, and rotation speeds of the traveling motors 36L and 36R and a traveling speed of the working machine 1 are accelerated (restored) from the first speed to the second speed.

In addition, since the traveling loads (traveling pressures V1 to V4) are higher than a traveling load in normal traveling (non speed-shift) of the working machine 1 in the automatic acceleration to restore to the second speed as described above, the controller 60 sets the restoration threshold to a value higher than the traveling pressures V1 to V4 in the normal traveling so that the automatic acceleration is started at a timing when the traveling load is high. For example, when the traveling pressure V1 to V4 in the normal traveling is about 10 MPa, the controller 60 sets the restoration threshold to 15 MPa.

On the other hand, when the acceleration command is given by the speed-shift switch 61, the controller 60 performs the manual acceleration to accelerate (speed-shift) rotation speeds of the traveling motors 80A and 80B from the first speed to the second speed. In addition, when the deceleration command is given by the speed-shift switch 61, the controller 60 performs the manual deceleration to decelerate (speed-shift) rotation speeds of the traveling motors 80A and 80B from the second speed to the first speed. In this manner, in performing the manual speed-shift (manual deceleration and manual acceleration) in response to a speed-shift command by the speed-shift switch 61, the controller 60 may execute the first shock mitigation control and change the control parameters according to the actual rotation speed of the prime mover 32.

Figure 9B:
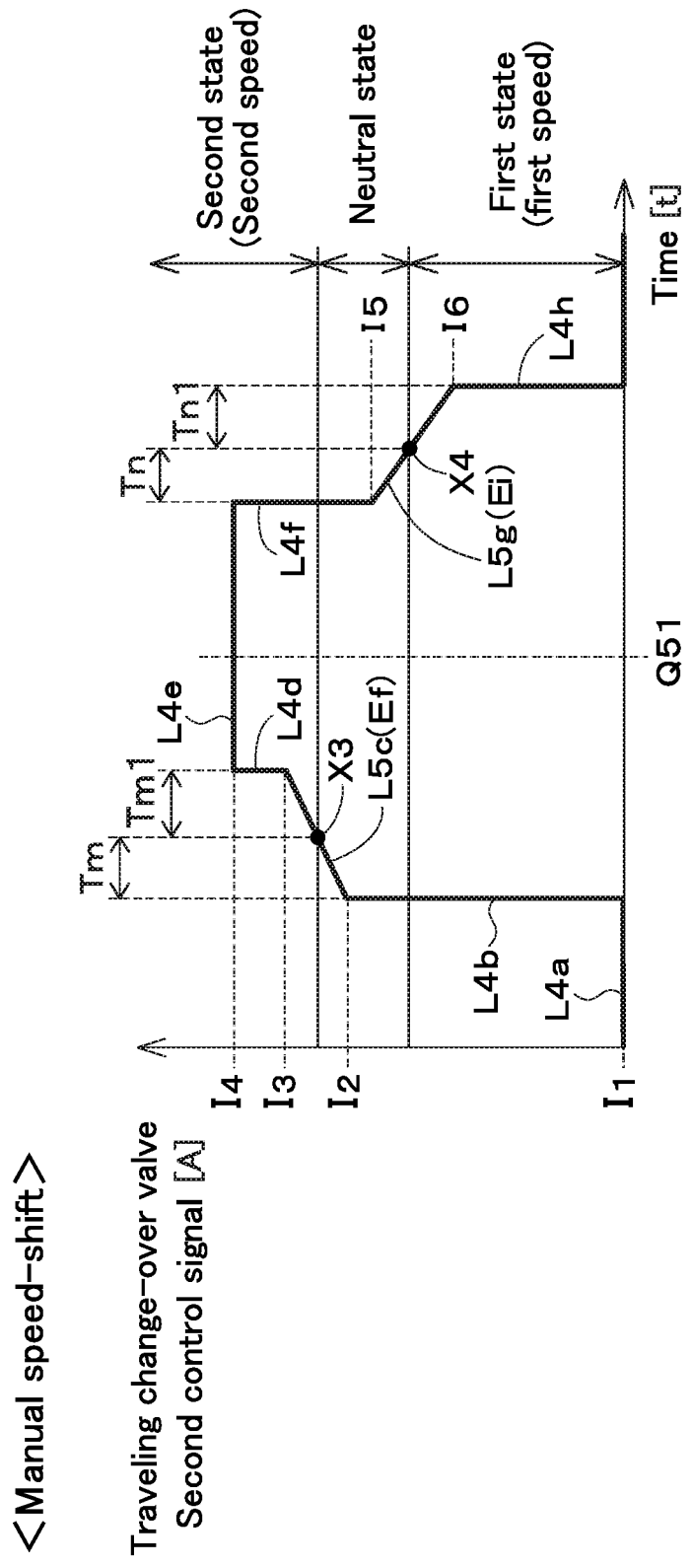
FIG. 9B is a view showing an example of change of the second control signal in a manual speed-shift.

FIG. 9B is a view showing an example of change in the second control signal input by the controller 60 to the traveling change-over valve 34 in the manual speed-shift (manual acceleration and manual deceleration).

The controller 60 executes the first shock mitigation control as shown in FIG. 4B when rotation speeds of the traveling motors 36L and 36R (traveling speed of the working machine 1) is manually accelerated from the first speed to the second speed in response to the acceleration command by the speed-shift switch 61. In addition, in the first shock mitigation control, the controller 60 changes the control value of the second control signal input to the traveling change-over valve 34 to switch the traveling change-over valve 34 from the first state to the second state, as shown in the left part from the point Q41 of FIG. 9B.

In detail, when the controller 60 for example starts to reduce the first control signal of the actuation valve 69 toward the mitigation value in response to the acceleration command by the speed-shift switch 61, the controller 60 increases at once a control value of the second control signal input to the traveling change-over valve 34 from the control value I1 defined corresponding to the first state (first speed) (line L4a in FIG. 9B) until the control value reaches the control value I2 defined corresponding to the neutral state (line L4b). In this manner, the traveling change-over valve 34 is shifted from the first state to the neutral state.

When the second control signal reaches the control value I2, the controller 60 increases the second control signal at an increase rate (change rate) Ef until the second control signal reaches the control value I3 defined corresponding to the second state (second speed) (line L5c). During the increasing of the second control signal, the traveling change-over valve 34 is shifted to the second state. In detail, in FIG. 9B, an intersection X3 of a boundary line between the neutral state and the second state and the line L5c of the second control signal of the traveling change-over valve 34 corresponds to the shifting timing Q16 of the traveling change-over valve 34 in FIG. 4B.

The increase rate Ef is set by the controller 60 based on, for example, a rotation speed of the prime mover 32 given when the acceleration command is output by the speed-shift switch 61. Even when the rotation speed of the prime mover 32 is the same as the rotation speed of the prime mover 32 used to set the increase rate Ed (FIG. 9A) in the above-described automatic acceleration, the controller 60 sets the increase rate Ef (FIG. 9B) in the manual acceleration to be lower than the increase rate Ed (FIG. 9A) in the automatic acceleration.

As described above, a shifting period Tm from the starting of increasing the second control signal in the manual acceleration shown in FIG. 9B to the shifting of the traveling change-over valve 34 to the second state becomes longer than the shifting period Tj from the starting of increasing the second control signal in the automatic acceleration shown in FIG. 9A to the shifting of the traveling change-over valve 34 to the second state.

In FIG. 9B, when the second control signal reaches the control value I3, the controller 60 increases at once the second control signal (line L4d) until the second control signal reaches the control value I4 defined corresponding to the second state (second speed). In this manner, rotation speeds of the traveling motors 36L and 36R and a traveling speed of the working machine 1 (machine body 2) are shifted to the second speed.

As described above, in manually accelerating rotation speeds or the like of the traveling motors 36L and 36R from the first speed to the second speed, the controller 60 increases the second control signal input to the traveling change-over valve 34 in three steps.

After that, the controller 60 executes the first shock mitigation control as shown in FIG. 4A in manually decelerating rotation speeds of the traveling motors 36L and 36R (traveling speed of the working machine 1) from the second speed to the first speed in response to the deceleration command by the speed-shift switch 61 at the time point Q51. In addition, in the first shock mitigation control, the controller 60 changes a control value of the second control signal input to the traveling change-over valve 34 to shift the traveling change-over valve 34 from the second state to the first state, as shown in the right part from the time point Q51 of FIG. 9B.

In detail, when the controller 60 for example starts to reduce the first control signal of the actuation valve 69 toward the mitigation value in response to the deceleration command by the speed-shift switch 61, the controller 60 reduces at once a control value of the second control signal input to the traveling change-over valve 34 from the control value I4 defined corresponding to the second state (second speed) (line L4e in FIG. 9B) until the control value reaches the control value I5 defined corresponding to the neutral state (line L4f). In this manner, the traveling change-over valve 34 is shifted from the second state to the neutral state.

When the second control signal reaches the control value I5, the controller 60 reduces the second control signal at a reduction rate (change rate) Ei until the second control signal reaches the control value I6 defined corresponding to the first state (first speed) (line L5g). During this reduction of the second control signal, the traveling change-over valve 34 is shifted to the first state. In detail, in FIG. 9B, an intersection X4 of a boundary line between the neutral state and the first state and the line L5g of the second control signal of the traveling change-over valve 34 corresponds to the shifting timing Q13 of the traveling change-over valve 34 in FIG. 4A.

The reduction rate Ei is set by the controller 60 based on, for example, a speed of the prime mover 32 given when the deceleration command is output by the speed-shift switch 61. Even when the speed of the prime mover 32 is the same as the speed of the prime mover 32 used to set the reduction rate Eg (FIG. 9A) in the above-described automatic deceleration, the controller 60 sets the reduction rate Ei (FIG. 9B) in the manual deceleration to be lower than the reduction rate Eg (FIG. 9A) in the automatic deceleration.

As described above, a shifting period Tn from the starting of reducing the second control signal in the manual deceleration shown in FIG. 9B to the shifting of the traveling change-over valve 34 to the first state becomes longer than the shifting period Tk from the starting of reducing the second control signal in the automatic deceleration shown in FIG. 9A to the shifting of the traveling change-over valve 34 to the first state.

In FIG. 9B, when the second control signal reaches the control value I6, the controller 60 increases at once the second control signal (line L4h) until the second control signal reaches the control value I1 defined corresponding to the first state (first speed). In this manner, rotation speeds of the traveling motors 36L and 36R and a traveling speed of the working machine 1 (machine body 2) are shifted to the first speed.

As described above, in manually decelerating the rotation speeds or the like of the traveling motors 36L and 36R from the second speed to the first speed, the controller 60 reduces the second control signal input to the traveling change-over valve 34 in three steps. The control data used to set the increase rate Ef and the reduction rate Ei of the second control signal are stored preliminarily in the internal memory of the controller 60.

As described above, in increasing or reducing a control value of the second control signal input to the traveling change-over valve 34 in three steps in the manual speed-shifts of the traveling motors 36L and 36R or the like, the controller 60 is capable of changing the control parameters such as the control values I1 to I6 of the second control signal, the increase amount from the control value I2 to the control value I3, the reduction amount from the control value I5 to the control value I6, the change rates Ef and Ei, and the like, according to rotation speeds of the prime mover 32 and a traveling speed of the working machine 1. For example, as the rotation speed of the prime mover 32 is increased, the change rates Ef and Ei become high.

In addition, the controller 60 is capable of changing the control parameters such as the shifting period Tm from the starting of increasing the second control signal from the control value L1 to the shifting of the traveling change-over valve 34 from the first state to the second state and the shifting period Tn from the starting of reducing the second control signal from the control value L4 to the shifting of the traveling change-over valve 34 from the second state to the first state, according to a speed of the prime mover 32 and a traveling speed of the working machine 1.

The shifting period Tm is included in the delay time from the starting of reducing, toward the mitigation value, the first control signal of the actuation valve 69 in the manual acceleration to the shifting of the traveling change-over valve 34 to the second state. The shifting period Tn is included in the delay time from the starting of reducing, toward the mitigation value, the first control signal of the actuation valve 69 in the manual deceleration to the shifting of the traveling change-over valve 34 to the first state. For example, as the speed of the prime mover 32 is increased, the shifting periods Tm and Tn become long.

In addition, the controller 60 is capable of changing the control parameters such as a period Tm1 in which the second control signal is kept being increased after the shifting of the traveling change-over valve 34 to the second state and a period Tn1 in which the second control signal is kept being reduced after the shifting of the traveling change-over valve 34 to the first state, according to a rotation speed of the prime mover 32 and a traveling speed of the working machine 1. For example, as the rotation speed of the prime mover 32 is increased, the periods Tm1 and Tn1 become long. A period obtained by adding the period Tm to the period Tm1 may be included in the delay time Tp shown in FIG. 4B as the shifting period in which the traveling change-over valve 34 is shifted from the first state to the second state. In addition, a period obtained by adding the period Tn to the period Tn1 may be included in the delay time Td shown in FIG. 4A as the shifting period in which the traveling change-over valve 34 is shifted from the second state to the first state.

In addition, the controller 60 sets the change rates Ef and Ei (FIG. 9B) of the second control signal in the manual speed-shift (in the manual acceleration and in the manual deceleration) to be lower than the change rates Ed and Eg (FIG. 9A) of the second control signal in the automatic speed-shift, and the delay times Tm and Tn (FIG. 9B) of the second control signal in the manual speed-shift are set longer than the delay times Tj and Tk (FIG. 9A) of the second control signal in the automatic speed-shift. Accordingly, in the manual speed-shift, the second control signal is changed slowly, a waveform of the second control signal becomes moderate, and a time required for the manual speed-shift becomes long. In addition, in the automatic speed-shift, the second control signal is changed more quickly than in the manual speed-shift, a waveform of the second control signal becomes rectangular, and a time required for automatic speed-shift becomes shorter than in the manual speed-shift.

In the above-described embodiment, the controller 60 sets, to the same values, the control values I1 to I6 of the second control signal that are changed by the controller 60 in a stepwise manner in the automatic speed-shift and the manual speed-shift; however, a control value of the second control signal may be set to be different in the automatic speed-shift or the manual speed-shift. In addition, a change amount of the control value of the second control signal (for example, a difference between the control value I4 and each of the control values I3 to I1 or a difference between the control value I4 and each of the control values I5 and T6) may be different in the automatic speed-shift or manual speed-shift.

In the above-described embodiment, as shown in FIG. 1, the actuation valve 69 is disposed in the delivery fluid passage 40 fluidly connected upstream of the operation valves 55; instead, the actuation valve 69 may be disposed in the traveling fluid passages 45 fluidly connected downstream of the operation valves 55. That is, the actuator valve 69 may be disposed in an intermediate portion of the fifth traveling fluid passage 45e, for example.

Figure 10:
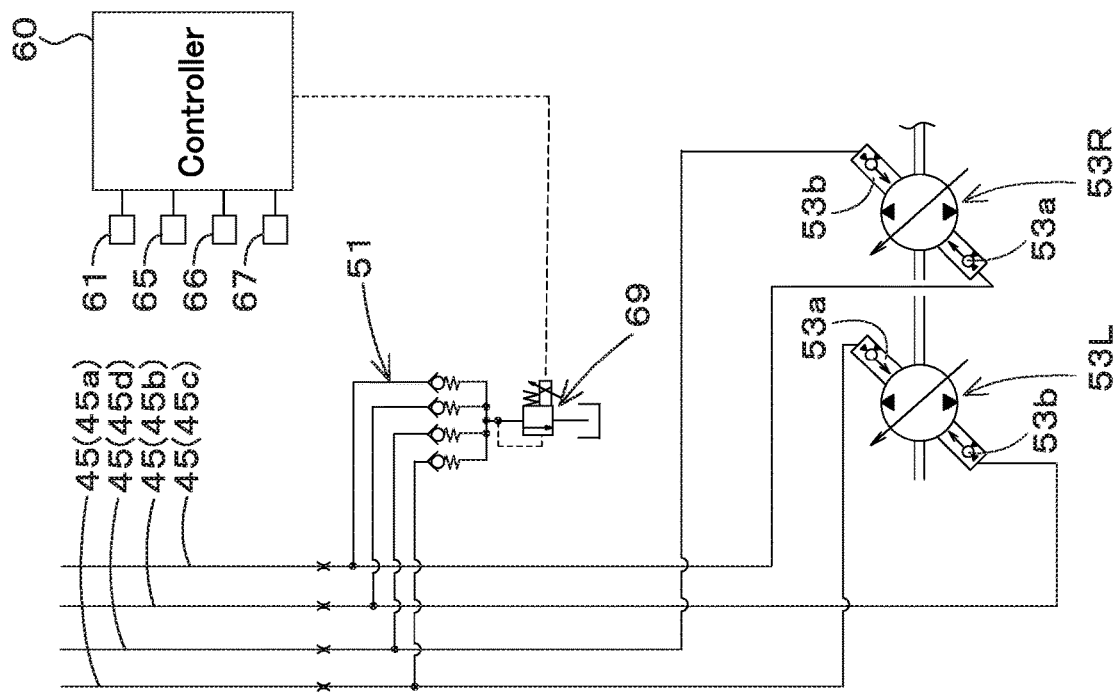
FIG. 10 is a view showing a modified example of the hydraulic system for the working machine.

As shown in FIG. 10, the fluid passage 51 may be branched from each of the first traveling fluid passage 45a, the second traveling fluid passage 45b, the third traveling fluid passage 45c, and the fourth traveling fluid passage 45d, and the actuation valve 69 constituted of a variable relief valve or a solenoid proportional valve may be fluidly connected to the fluid passages 51. In this case, the controller 60 may control an opening degree of the actuation valve 69 by changing a control value of the first control signal input to the actuation valve 69.

Figure 11:
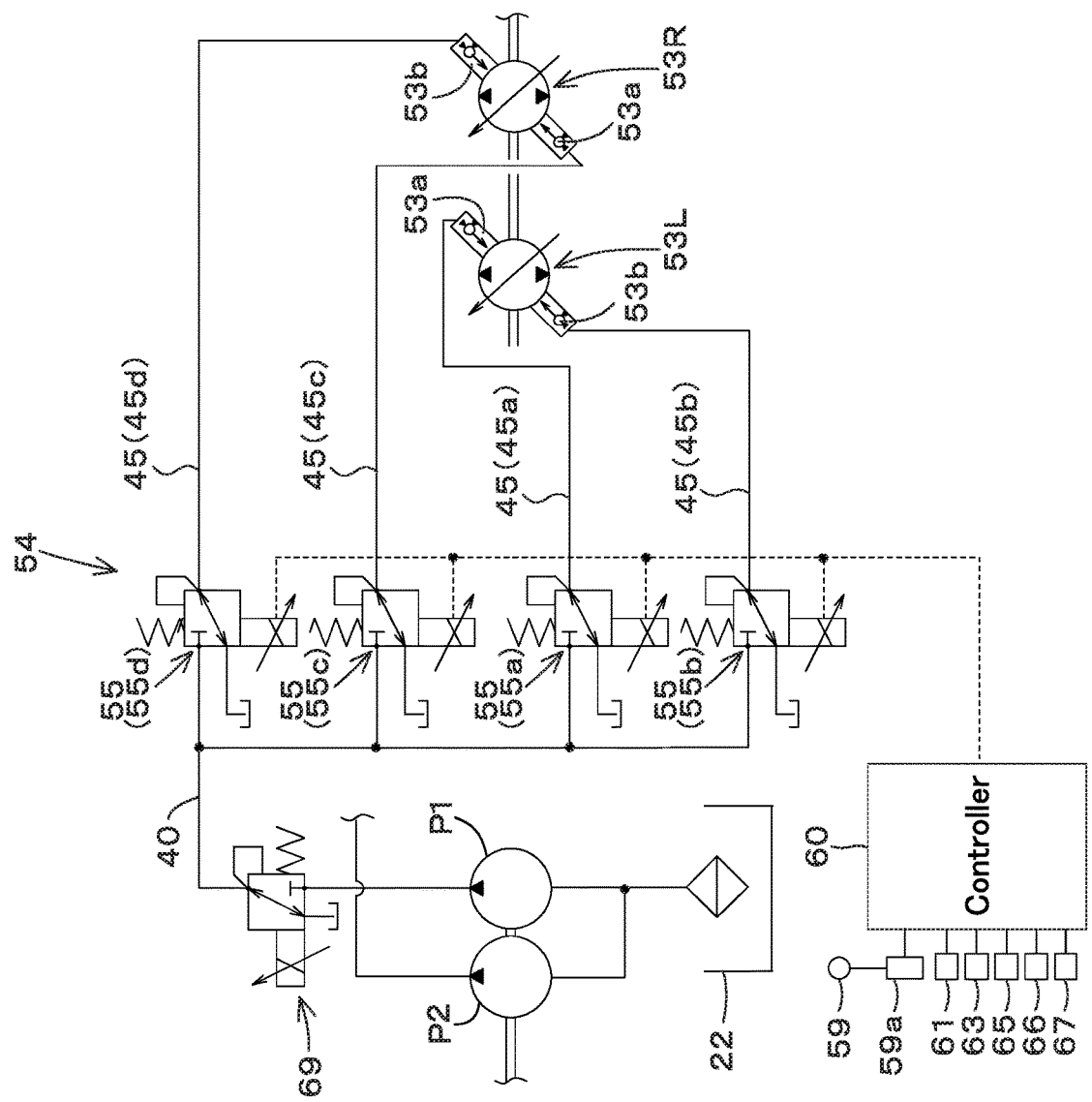
FIG. 11 is a view showing a modified example of the hydraulic system for the working machine.

In the above-described embodiment, the hydraulic traveling operation device 54 that changes pilot pressures acting on the traveling pumps 53L and 53R with the operation valves 55 is used; instead, an electrically-operated traveling operation device 54, for example, may be used as shown in FIG. 11.

FIG. 11 is a view showing a modified example of a hydraulic circuit included in a part of the hydraulic system for the working machine 1.

In detail, the hydraulic circuit shown in FIG. 11 can be used in place of the circuit shown in FIG. 1 for controlling the angles of the swashplates of the traveling pumps 53L and 53R (hydraulic circuit for delivering pilot fluid from the first hydraulic pump P1 to the traveling pumps 53L and 53R via the actuation valve 69 and the operation valves 55). That is, the hydraulic circuit shown in FIG. 11 is used in combination with the hydraulic circuit for the speed shift of the travel motors 36L and 36R shown in FIG. 1.

The traveling operation device 54 shown in FIG. 11 includes the operation member 59 capable of being swung in the lateral direction (machine width direction) or the fore-and-aft direction, and the operation valves 55 (operation valves 55a, 55b, 55c, and 55d) constituted of electromagnetic proportional valves. The operation member 59 is constituted of a joystick, for example. An operation detection sensor 59a configured to detect an operation amount and operational direction of the operation member 59 is connected to the controller 60. Based on the operation amount and operational direction of the operation member 59 detected by the operation detection sensor 59a, the controller 60 controls opening degrees of the operation valves 55 (55a, 55b, 55c, and 55d) to change the angles of the swashplates of the traveling pumps 53L and 53R.

In the example of FIG. 11, the operation valves 55 (55a, 55b, 55c, and 55d) function equivalently to the operation valves 55 (55A, 55B, 55C, and 55D) and the actuation valve 69 shown in FIG. 1. That is, the operation valves 55 (55a, 55b, 55c, and 55d) in FIG. 11 are actuation valves that change the angles of the swashplates of the traveling pumps 53L and 53R when opening degrees of the actuation valves are changed as the operation state, thereby changing delivery rates of hydraulic fluid delivered from the traveling pumps 53L and 53R.

In FIG. 11, when the operation member 59 is operated in the forward direction (in A1 direction, see FIG. 1), the controller 60 inputs a control signal (first control signal) to the operation valve 55a and the operation valve 55c to swing the swashplates of the traveling pumps 53L and 53R in a direction corresponding to the normal rotations of the traveling motors 36L and 36R (forward traveling direction of the working machine 1).

When the operation member 59 is operated in the backward direction (in A2 direction, see FIG. 1), the controller 60 inputs a control signal (first control signal) to the operation valve 55b and the operation valve 55d to swing the swashplates of the traveling pumps 53L and 53R in a direction corresponding to the reverse rotations of the traveling motors 36L and 36R (backward traveling direction of the working machine 1).

When the operation member 59 is operated in the rightward direction (in A3 direction, see FIG. 1), the controller 60 inputs a control signal (first control signal) to the operation valve 55a and the operation valve 55d to swing the swashplate of the first traveling pump 53L in the direction corresponding to the normal rotation of the first traveling motor 36L and to swing the swashplate of the second traveling pump 53R in the direction corresponding to the reverse rotation of the second traveling motor 36R.

When the operation member 59 is operated to the leftward direction (in direction A4, see FIG. 1), the controller 60 inputs a control signal (first control signal) to the operation valve 55b and the operation valve 55c to swing the swashplate of the first traveling pump 53L in the direction corresponding to the reverse rotation of the first traveling motor 36L and to swing the swashplate of the second traveling pump 53R in the direction corresponding to the normal rotation of the second traveling motor 36R.

The controller 60 controls, as the operation state, the opening degrees of the operation valves 55 (55a and 55b) by changing an electrical level (current value of a current signal or voltage value of a voltage signal) of the control signal (first control signal) input to the operation valves (actuation valves) 55 (55a and 55b) to change the angles of the swashplates of the traveling pumps 53L and 53R and the delivery rate of hydraulic fluid. In addition, the controller 60 changes a control value of the control signal (first control signal) input to the operation valves (actuation valves) 55 (55a and 55b) in the same manner as manner by the actuation valve 69 shown in FIG. 1 in executing the first shock mitigation control described above.

Figure 12:
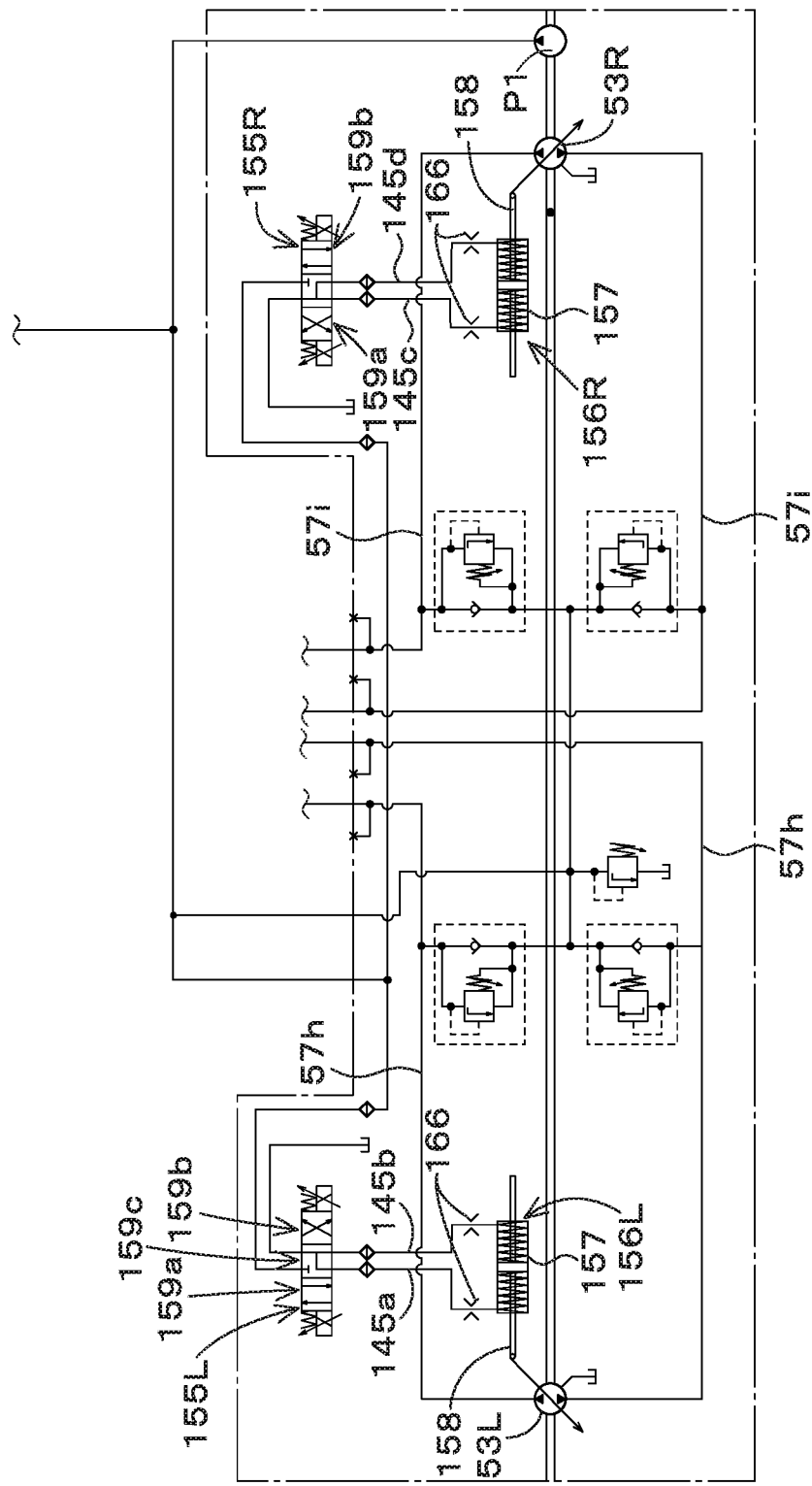
FIG. 12 is a view showing a modified example of the hydraulic system for the working machine.

As another example, a part of a hydraulic system 100 for the working machine 1 may be modified to a hydraulic circuit as shown in FIG. 12.

FIG. 12 is a view showing a modified example of a hydraulic circuit of a part of the hydraulic system for working machine 1.

The hydraulic circuit shown in FIG. 12 can be used in place of the circuit shown in FIG. 1 for controlling the angles of the swashplates of the traveling pumps 53L and 53R. That is, the hydraulic circuit shown in FIG. 12 can be used in combination with the hydraulic circuit for the speed shift of the traveling motors 36L and 36R shown in FIG. 1.

In the hydraulic circuit shown in FIG. 12, the angles of the swashplates of traveling pump 53L and 53R are respectively changed by the operation valves 155L and 155R and the hydraulic regulators 156L and 156R.

The operation valves 155L and 155R are solenoid proportional valves configured to be switched to three positions. The operation valves 155L and 155R function equivalently to the operation valves 55 (55A, 55B, 55C, and 55D) and the actuation valve 69 shown in FIG. 1. That is, the operation valves 155L and 155R are actuation valves that actuate the hydraulic regulators 156L and 156R to change the angles of the swashplates of the traveling pumps 53L and 53R when the positions of the operation valves 155L and 155R are shifted as the operation state, thereby changing delivery rates of hydraulic fluid delivered from the traveling pumps 53L and 53R.

In detail, each of the hydraulic regulators 156L and 156R includes a supply chamber 157 to which the hydraulic fluid can be supplied and a piston rod 158 disposed in the supply chamber 157. The piston rod 158 of the hydraulic regulator 156L is fluidly connected to the swashplate of the first traveling pump 53L. The piston rod 158 of the hydraulic regulator 156R is fluidly connected to the swashplate of the second traveling pump 53R. The angles of the swashplates of the traveling pump 53L and 53R are respectively changed by the actuation (straight-line movement) of the piston rods 158 of the hydraulic regulator 156L and 156R.

The operation valve 155L is shiftable to any one of a first position 159a, a second position 159b, and a neutral position 159c, and the hydraulic regulator 156L is operated through the shifting to any one of the positions 159a to 159c. The position of the operation valve 155L is changed by moving a spool of the operation valve 155L based on the control signal (first control signal) input from the controller 60. A first port of the operation valve 155L and the supply chamber 157 of the hydraulic regulator 156L are fluidly connected to each other by the first traveling fluid passage 145a. A second port of the operation valve 155L and the supply chamber 157 of the hydraulic regulator 156L are fluidly connected to each other by the second traveling fluid passage 145b.

The operation valve 155R is shiftable to any one of a first position 159a, a second position 159b, and a neutral position 159c, and the hydraulic regulator 156R is operated through the shifting to any one of the positions 159a to 159c. The position of the operation valve 155R is changed by moving a spool of the operation valve 155R based on the control signal (first control signal) input from the controller 60. A first port of the operation valve 155R and the supply chamber 157 of the hydraulic regulator 156R are fluidly connected to each other by the third traveling fluid passage 145c. A second port of the operation valve 155R and the supply chamber 157 of the hydraulic regulator 156R are fluidly connected to each other by the fourth traveling fluid passage 145d.

The controller 60 inputs the control signal (first control signal) to the operation valve 155L and the operation valve 155R to shift the operation valve 155L and the operation valve 155R to the first position 159a. In this manner, the swashplates of the first traveling pump 53L and the second traveling pump 53R are swung in the direction for normal rotation of the traveling motors 36L and 36R, and the first traveling motor 36L and the second traveling motor 36R become capable of normally rotating.

In addition, the controller 60 inputs the control signal (first control signal) to the operation valve 155L and the operation valve 155R to shift the operation valve 155L and the operation valve 155R to the second position 159b. In this manner, the swashplates of the first traveling pump 53L and the second traveling pump 53R are swung in the direction for reverse rotation of the traveling motors 36L and 36R, and the first traveling motor 36L and the second traveling pump 53R motor 36R become capable of reversely rotating.

In addition, the controller 60 inputs the control signal (first control signal) to the operation valve 155L and the operation valve 155R to shift the operation valve 155L to the first position 159a and the operation valve 155R to the second position 159b. In this manner, the swashplate of the first traveling pump 53L is swung in the direction for normal rotation of the first traveling motor 36L, thereby enabling the first traveling motor 36L to normally rotate, and the swashplate of the second traveling pump 53R is swung in the direction for reverse rotation of the second traveling motor 36R, thereby enabling the second traveling motor 36R to reversely rotate.

Further, the controller 60 inputs the control signal (first control signal) to the operation valve 155L and the operation valve 155R to shift the operation valve 155L to the second position 159b and the operation valve 155R to the first position 159a. In this manner, the swashplate of the first traveling pump 53L is swung in the direction for reverse rotation of the first traveling motor 36L, thereby enabling the first traveling motor 36L to reversely rotate, and the swashplate of the second traveling pump 53R is swung in the direction for normal rotation of the second traveling motor 36R, thereby enabling the second traveling motor 36R to normally rotate.

The controller 60 controls, as the operation state, the positions of the operation valves 155L and 155R by changing an electrical level (current value of a current signal or voltage value of a voltage signal) of the control signal (first control signal) input to the operation valves (actuation valves) 155L and 155R to change the angles of the swashplates of the traveling pumps 53L and 53R and the delivery rate of hydraulic fluid. In addition, the controller 60 changes a control value of the control signal (first control signal) input to the operation valves (actuation valves) 155L and 155R in the same manner as manner by the actuation valve 69 shown in FIG. 1 in executing the first shock mitigation control described above.

In the above-described embodiment, the actuation valves 69, 55a to 55d, 155L and 155R are solenoid proportional valves whose opening degrees are increased as a control value of the first control signal input from the controller 60 is increased; instead, a solenoid proportional valve whose opening degree is reduced as the control value of the first control signal is increased may be used as the actuation valve. In the case of using the actuation valve of the above-described modified example, the control value on the vertical axis showing the first control signal in FIGS. 4A and 4B becomes higher as approaching the origin. That is, in the case of the above modified example, the high and the low in the control signals are reversed in the above-described embodiment, so the modified example can be explained by reading the contents regarding the high and the low in reverse. In more detail, in the above-described embodiment, if "reduction" is read as "rise" or "increase". In addition, to include the above-described embodiments and the above modified example, for example, "reduction", "rise" and "increase" can be replaced by "change".

In the above-mentioned embodiments, examples are shown in which rotation speeds of the traveling motors 36L and 36R can be shifted to two speed stages, the first speed and the second speed; however, rotation speeds of the traveling motors 36L and 36R may be shifted to three or more speed stages.

In the above-described embodiment, the traveling change-over valve 34 includes the two-position change-over valve 72, 71L, and 71R configured to shift the traveling motors 36L and 36R to the first state in which the traveling motors 36L and 36R are shifted to the first speed and the second state in which the traveling motors 36L and 36R are shifted to the second speed; instead, the traveling change-over valve, for example, may be constituted of one or more proportional valves. That is, the traveling change-over valve may be a valve capable of shifting the traveling motors 36L and 36R to at least the first state in which the traveling motors 36L and 36R are shifted to the first speed or to the second state in which the traveling motors 36L and 36R are shifted to the second speed. In addition, in place of the traveling change-over valve 34 (first change-over valve 71L and 71R or second change-over valve 72), a change-over valve shiftable to a plurality of positions including at least the first position, the second position, and the neutral position may be used.

In the embodiment shown in FIG. 1, the actuation valve 69 changes a pressure of hydraulic fluid (pilot pressure of pilot fluid) acting on the operation valves 55 (55A to 55D); however, the actuation valve 69 may be a valve configured to adjust a pressure of hydraulic fluid supplied to the traveling pumps 53L and 53R, i.e., a pressure of hydraulic fluid acting on the pressure receiving portions of the traveling pumps 53L and 53R. In addition, the actuation valve 69 and the traveling pumps 53L and 53R may be connected to each other by the traveling fluid passages 45, and the actuation valve 69 may change pilot pressures acting on the traveling pumps 53L and 53R in response to an operation of the operation member 59.

The working machine 1 includes the traveling devices 5 travelably supporting the machine body 2, the traveling pumps 53L and 53R to deliver hydraulic fluid, the traveling motors 36L and 36R configured to be rotated by the hydraulic fluid delivered from the traveling pumps 53L and 53R so as to output power to the traveling devices 5, the traveling change-over valve 34 configured to shift the operation state thereof so as to shift rotation speeds of the traveling motors 36L and 36R, the actuation valves 69, 55 (55a to 55d), 155L and 155R configured to change the operation state thereof so as to change the delivery rates of hydraulic fluid delivered from the traveling pumps 53L and 53R, and the controller 60 to control the traveling change-over valve 34 and the actuation valves 69, 55 (55a to 55d), 155L and 155R. The controller 60, when shifting the rotation speeds of the traveling motors 36L and 36R, is configured or programmed to output the first control signal to control the operation state of the actuation valve 69 and change the control value of the first control signal output therefrom in such a way that the control value of the first control signal is changed to the mitigation value Ib such as to reduce the delivery rates of hydraulic fluid delivered from the traveling pumps 53L and 53R to a value less than that corresponding to the set value Ia of the control value, and then is set to the set value Ia, and during the changing of the control value of the first control signal, the controller 60 is configured or programmed to perform the shock mitigation control (first shock mitigation control) for mitigating a speed-shift shock by shifting the operation state of the traveling change-over valve 34, and to change a value of the control parameter for performing the shock mitigation control in correspondence to a traveling speed of the machine body 2.

According to the above configuration, in shifting rotation speeds of the traveling motors 36L and 36R and a traveling speed of the working machine 1, the operation states of the actuation valves 69 and 55 (55a to 55d), 155L and 155R can be controlled according to the traveling speed of the working machine 1 (the machine body 2). Accordingly, delivery rates of hydraulic fluid delivered from the traveling pumps 53L and 53R, rotation speeds of the traveling motors 36L and 36R, and a traveling speed of the working machine 1 can be suppressed at any traveling speed from suddenly changing immediately after the speed shift, so that the speed-shift shock can be mitigated efficiently.

The controller 60 is configured or programmed to change, in correspondence to the traveling speed of the machine body 2, the first change rates Eb and Ec at which the control value of the first control signal is changed to the mitigation value Ib, the first change rate being defined as the control parameter. According to this configuration, in the speed shift in the working machine 1, change rates of the operation states of the actuation valves 69, 55 (55a to 55d), 155L and 155R are regulated according to a traveling speed of the working machine 1 to suppress sudden changes in rotation speeds of the traveling motors 36L and 36R and a traveling speed of the working machine 1 immediately after the speed shift, thereby mitigating the speed-shift shock efficiently.

The controller 60 increases the first change rates Eb and Ec as a traveling speed of the machine body 2 is increased. According to this configuration, in the speed shift in the working machine 1, change rates of the operation states of the actuation valves 69, 55 (55a to 55d), 155L and 155R become higher as a traveling speed of the working machine 1 becomes faster so that rotation speeds of the traveling motors 36L and 36R and a traveling speed of the working machine 1 can be suppressed from suddenly changing immediately after the speed shift, thereby efficiently mitigating the speed-shift shock.

The controller 60 is configured or programmed to change, in correspondence to the traveling speed of the machine body 2, the delay times Td and Tp for which the operation state of the traveling change-over valve 34 is shifted, the delay times Td and Tp being defined as the control parameter. According to this configuration, the delay times Td and Tp until a state of the traveling change-over valve 34 has been shifted is regulated according to a traveling speed of the working machine 1 in the speed shift in the working machine 1 so that rotation speeds of the traveling motors 36L and 36R and a traveling speed of the working machine 1 can be suppressed from suddenly changing immediately after the speed shift, thereby efficiently mitigating the speed-shift shock.

The controller 60 is configured or programmed to elongate the delay times Td and Tp according to increase of the traveling speed of the machine body 2. According to this configuration, in the speed shift in the working machine 1, the delay times Td and Tp until a state of the traveling change-over valve 34 has been shifted are extended as a traveling speed of the working machine 1 is increased so that rotation speeds of the traveling motors 36L and 36R and a traveling speed of the working machine 1 can be suppressed from suddenly changing immediately after the speed shift, thereby efficiently mitigating the speed-shift shock.

The controller 60 is configured or programmed to change, in correspondence to the traveling speed of the machine body 2, the first change amounts ΔFb and ΔFc in which the control value of the first control signal is changed to the mitigation value Ib, the first change amounts being defined as the control parameter. According to this configuration, in the speed shift in the working machine 1, change amounts in the operation states of the actuation valves 69, 55 (55a to 55d), 155L and 155R are regulated according to a traveling speed of the working machine 1 so that rotation speeds of the traveling motors 36L and 36R and a traveling speed of the working machine 1 can be suppressed from suddenly changing immediately after the speed shift, thereby efficiently mitigating the speed-shift shock.

The controller 60 is configured or programmed to increase the first change amounts ΔFb and ΔFc according to increase of the traveling speed of the machine body 2. According to this configuration, in the speed shift in the working machine 1, change amounts of the operation states of the actuation valves 69, 55 (55a to 55d), 155L and 155R are increased as a traveling speed of the working machine 1 is increased so that rotation speeds of the traveling motors 36L and 36R and a traveling speed of the working machine 1 can be suppressed from suddenly changing immediately after the speed shift, thereby efficiently mitigating the speed-shift shock.

The working machine 1 includes the prime mover 32 serving as a power source for the traveling pumps 53L and 53R, and the first detection device (rotation speed detection device) 67 configured to detect a rotation speed of the prime mover 32. When a value of either the first change rates Eb and Ec or the first change amounts ΔFb and ΔFc of changing the control value of the first control signal to the mitigation value Ib or lengths of the delay times Td and Tp of shifting the operation state of the traveling change-over valve 34 after start of changing the control value of the first control signal toward the mitigation value Ib is defined as the control parameter, the controller 60 is configured or programmed to change the first change rates Eb and Ec, first change amounts ΔFb and ΔFc or delay times Td and Tp defined as the control parameter in correspondence to the rotation speed of the prime mover 32 detected by the first detection device 67. According to this configuration, in the speed shift in the working machine 1, change rates and change amounts of the operation states of the actuation valves 69, 55 (55a to 55d), 155L and 155R and the delay time Td are regulated according to a rotation speed of the prime mover 32 corresponding to a traveling speed of the working machine so that rotation speeds of the traveling motors 36L and 36R and a traveling speed of the working machine 1 can be suppressed from suddenly changing immediately after the speed shift, thereby efficiently mitigating the speed-shift shock.

The controller 60 is configured or programmed to increase the first change rates Eb and Ec or the first change amounts ΔFb and ΔFc or elongate the delay times Td and Tp according to increase of the rotation speed of the prime mover 32. According to this configuration, in the speed shift in the working machine 1, a change rate of an opening degree of the actuation valve 69 can be high, change amounts of the operation states of the actuation valves 69, 55 (55a to 55d), 155L and 155R can be large, and the delay times Td and Tp until a state of the traveling change-over valve 34 has been shifted can be long as a rotation speed of the prime mover 32 corresponding to a traveling speed of the working machine 1 is increased. In this manner, rotation speeds of the traveling motors 36L and 36R and a traveling speed of the working machine 1 can be further suppressed from suddenly changing immediately after the speed shift, thereby further efficiently mitigating the speed-shift shock.

The controller 60 sets the first change amounts ΔFb and ΔFc of the first control signal and the change time Tc for changing the first control signal to the mitigation values Ib and Id based on a rotation speed of the prime mover 32, sets the change rates Eb and Ec of the first control signal based on the change amounts ΔFb and ΔFc and the change time Tc, and sets the delay times Td and Tp based on the change time Tc. According to this configuration, in the speed shift in the working machine 1, the change amounts ΔFb and ΔFc, the change rates Eb and Ec, and the delay times Td and Tp of the first control signal for executing the shock mitigation control can be set and changed reliably according to a rotation speed of the prime mover 32 and a traveling speed of the working machine 1.

The traveling change-over valve 34 can be shifted between the first state in which the rotation speeds of the traveling motors 36L and 36R are set to the first speed and the second state in which the rotation speeds of the traveling motors is set to the second speed, which is faster than the first speed. The controller 60, when performing the shock mitigation control in reduction of the rotation speeds of the traveling motors 36L and 36R from the second speed to the first speed, is configured or programmed to change a control value of the first control signal to the mitigation value Ib before setting the set value Ia, and to shift the traveling change-over valve 34 from the second state to the first state during the change of the control value of the first control signal from the mitigation value Ib to the set value Ia. According to this configuration, in the deceleration of the working machine 1 from the second speed to the first speed, change states of the operation states of the actuation valves 69, 55 (55a to 55d), 155L and 155R are regulated according to a traveling speed of the working machine 1 so that delivery rates of hydraulic fluid delivered from the traveling pumps 53L and 53R, rotation speeds of the traveling motors 36L and 36R, and a traveling speed of the working machine 1 can be suppressed from suddenly changing immediately after the speed shift, thereby efficiently mitigating the speed-shift shock.

The controller 60, when performing the shock mitigation control in acceleration of the rotation speeds of the traveling motors 36L and 36R from the first speed to the second speed, is configured or programmed to change the control value of the first control signal to the mitigation value Id before setting the set value Ic, and to shift the traveling change-over valve 34 from the second state to the first state during the change of the first control signal to the mitigation value Id. According to this configuration, in the acceleration of the working machine 1 from the first speed to the second speed, the operation states of the actuation valves 69, 55 (55a to 55d), 155L and 155R are controlled according to a traveling speed of the working machine 1 so that delivery rates of hydraulic fluid delivered from the traveling pumps 53L and 53R, rotation speeds of the traveling motors 36L and 36R, and a traveling speed of the working machine 1 can be suppressed from suddenly changing immediately after the speed shift, thereby efficiently mitigating the speed-shift shock.

The working machine 1 includes the operation device (traveling operation device) 54 configured to operate the traveling device, and the operation valves 55 configured to change angles of the swashplates of the traveling pumps 53L and 53R according to operation of the operation device 54. The actuation value 69 is constituted of a solenoid proportional valve disposed in the fluid passage (delivery fluid passage) 40 fluidly connected upstream of the operation valves 55 or the fluid passages (traveling fluid passages) 45 fluidly connected downstream of the operation valves 55. The controller 60 inputs, as the first control signal, an electric current signal to the actuation valves 69, 55 (55a to 55d), 155L and 155R. According to this configuration, in the speed shift in the working machine 1, hydraulic pressures acting on the fluid passages 40 and 45 fluidly connected upstream or downstream of the operation valves 55 can be regulated by controlling the operation states of the operation valves 69, 55 (55a to 55d), 155L and 155R according to a traveling speed of the working machine 1. Accordingly, delivery rates of hydraulic fluid delivered from the traveling pumps 53L and 53R, rotation speeds of the traveling motors 36L and 36R, and a traveling speed of the working machine 1 can be suppressed from suddenly changing immediately after the speed shift, so that the speed-shift shock can be mitigated efficiently.

The working machine 1 includes the speed-shift switch 61 operable to issue the speed-shift command. The controller 60 is configured or programmed to selectively perform either the automatic speed-shift to automatically shift the rotation speeds of the traveling motors 36L and 36R or the manual speed-shift to shift the rotation speeds of the traveling motors 36L and 36R according to the speed-shift command issued by the speed-shift switch 61. The controller 60, when performing each of the automatic speed-shift and the manual speed-shift, is configured or programmed to perform the shock mitigation control (first shock mitigation control), and the controller 60 is configured or programed to change a value of the control parameter in each of the automatic speed-shift and the manual speed-shift. According to this configuration, in respectively performing the automatic speed change and the manual speed change, the speed-shift shock can be mitigated efficiently. In addition, a mode of the shock mitigation control can be changed to be different in performing the automatic speed-shift from in the manual speed-shift, so that the speed-shift shock can be appropriately and efficiently mitigated respectively in the automatic speed-shift and the manual speed-shift.

The controller 60 is configured or programmed to selectively perform either automatic deceleration to automatically reduce the rotation speeds of the traveling motors 36L and 36R when a predetermined deceleration condition is satisfied or the manual deceleration to reduce the rotation speeds of the traveling motors 36L and 36R according to the speed-shift command issued by the speed-shift switch 61. The controller 60, when performing each of the automatic deceleration and the manual deceleration, is configured or programmed to change the control value of the second control signal input to the proportional solenoid valve serving as the traveling change-over valve 34 so as to shift the traveling change-over valve 34 into the state to reduce the rotation speeds of the traveling motors 36L and 36R. The second change rates Eg and Ei of changing the control value of the second control signal and the shifting periods Tk and Tn included in the delay time Td are each defined as the control parameter, the shifting periods Tk and Tn extending from start of changing the control value of the second control signal until the operation state of the traveling change-over valve 34 is completely shifted, and the controller 60 is configured or programmed to change a value of the second change rates Eg and Ei and lengths of the shifting periods Tk and Tn, which are each defined the value of the control parameter. According to this configuration, in respectively performing the automatic speed change and the manual speed change, the speed-shift shock can be appropriately and efficiently mitigated. In addition, change rate of and changing time for a state of the traveling change-over valve 34 are regulated in performing the automatic deceleration and in performing the manual deceleration, thereby appropriately changing rotation speeds of the traveling motors 36L and 36R and a traveling speed of the working machine 1.

The controller 60 is configured or programmed to selectively perform either the automatic acceleration to automatically increase the rotation speeds of the traveling motors 36L and 36R when a predetermined acceleration condition is satisfied or the manual acceleration to increase the rotation speeds of the traveling motors 36L and 36R according to the acceleration command issued by the speed-shift switch 61. The controller 60, when performing each of the automatic acceleration and the manual acceleration, is configured or programmed to change the control value of the second control signal input to the proportional solenoid valve serving as the traveling change-over valve 34 so as to shift the traveling change-over valve 34 into the state to increase the rotation speeds of the traveling motors 36L and 36R. The second change rates Ed and Ef of changing the control value of the second control signal and the shifting periods Tj and Tm included in the delay times Td and Tp are each defined as the control parameter, the shifting periods Tj and Tm extending from start of changing the control value of the second control signal until the operation state of the traveling change-over valve 34 is completely shifted, and the controller is configured or programmed to change a value of the second change rates Ed and Ef and lengths of the shifting periods Tj and Tm, which are each defined as the value of the control parameter. According to this configuration, in respectively performing the automatic speed change and the manual speed change, the speed-shift shock can be appropriately and efficiently mitigated. In addition, change rate of and changing time for a state of the traveling change-over valve 34 are regulated in performing the automatic deceleration and in performing the manual deceleration, thereby appropriately changing rotation speeds of the traveling motors 36L and 36R and a traveling speed of the working machine 1.

The controller 60 is configured or programmed to selectively perform either automatic acceleration to automatically increase the rotation speed of each of the traveling motors 36L and 36R when a predetermined acceleration condition is satisfied or manual acceleration to increase the rotation speed of each of the traveling motors 36L and 36R according to the speed-shift command issued by the speed-shift switch 61. The controller 60, when performing each of the automatic acceleration and the manual acceleration, is configured or programmed to change the control value of the second control signal input to the proportional solenoid valve serving as the traveling change-over valve so as to shift the traveling change-over valve 34 into a state to increase the rotation speed of each of the traveling motors 36L and 36R. The controller 60 is configured or programmed to change the value of the second change rate as the control parameter and the length of the shifting period Tk, Ti, Tn or Tm as the control parameter in each of the automatic acceleration and the manual acceleration. The controller 60 is configured or programmed so that the second change rate Eg of changing the control value of the second control signal when performing the automatic deceleration is greater than the second change rate Ei of changing the control value of the second control signal when performing the manual deceleration, or the second change rate Ed of changing the control value of the second control signal when performing the automatic acceleration is greater than the second change rate Ef of changing the control value of the second control signal when performing the manual acceleration, and the shifting period Tk or Tj when performing the automatic speed-shift shorter than the shifting period Tn or Tm when performing the manual speed-shift. According to this configuration, in performing the manual deceleration or the manual acceleration, rotation speeds of the traveling motors 36L and 36R and a traveling speed of the working machine 1 can be changed slowly to efficiently mitigate the speed-shift shock. In addition, in performing the automatic deceleration or the automatic acceleration, rotation speeds of the traveling motors 36L and 36R and a traveling speed of the working machine 1 can be shifted quickly to efficiently mitigate the speed-shift shock. Moreover, when a traveling load is large, such as when the working machine 1 moves earth and sand or turns with a heavy load, the automatic deceleration or the automatic acceleration can be performed to quickly change rotation speeds of the traveling motors 36L and 36R and a traveling speed of the working machine 1, so that the traveling motors 36L and 36R, the traveling devices 5, and the like can be prevented from stopping to be driven, thereby preventing the working machine 1 from stopping to travel.

The controller 60 sets change in the control value of the second control signal in performing the manual speed-shift to be slower than change in change in the control value of the second control signal in performing the automatic speed-shift, and sets a waveform of the second control signal in performing the manual speed-shift to be more moderate than a waveform of the second control signal in performing the automatic speed-shift. According to this configuration, in performing the manual deceleration or the manual acceleration rather than in performing the automatic deceleration or the automatic acceleration, rotation speeds of the traveling motors 36L and 36R and a traveling speed of the working machine 1 can be shifted more slowly and appropriately.

The controller 60 changes the values of the second change rates Ed, Eg, Ef, and Ei of the second control signal and the lengths of the shifting periods Tj, Tk, Tm, and Tn according to a traveling speed of the machine body 2. According to this configuration, in respectively performing the automatic acceleration and the manual acceleration, change rate of and changing time for a state of the traveling change-over valve 34 are regulated in relatively performing the automatic acceleration and in performing the manual acceleration, thereby appropriately and efficiently mitigating the speed-shift shock.

The working machine 1 includes the second detection device (pressure detection device) 80 configured to detect the traveling loads (traveling pressures V1 to V4) applied to the traveling motors 36L and 36R. The controller 60 shifts the traveling change-over valve 34 from the second state to the first state during or immediately after the automatic deceleration when the traveling load detected by the second detection device 80 is not less than the restoration threshold to automatically restores the rotation speeds of the traveling motors 36L and 36R to a speed before the automatic deceleration, and sets the restoration threshold to be higher than the traveling load detected by the second detection device 80 in normal traveling of the machine body 2 (in not performing the speed shift of the traveling motors 36L and 36R). According to this configuration, rotation speeds of the traveling motors 36L and 36R and a traveling speed of the working machine 1 can be quickly and automatically restored to the second speed at a timing when a traveling load is still higher than a traveling load in the normal traveling during or immediately after the performing of the automatic deceleration.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

The invention claimed is:

1. A working machine comprising:
   a traveling pump including a swashplate and configured to deliver hydraulic fluid and change a flow rate of the hydraulic fluid delivered therefrom in correspondence to an angle of the swashplate;
   a traveling motor configured to be rotated by the hydraulic fluid delivered from the traveling pump so as to have a rotation speed shiftable between a first speed and a second speed higher than the first speed;
   a traveling change-over valve shiftable between a first state to set the rotation speed of the traveling motor to the first speed and a second state to set the rotation speed of the traveling motor to the second speed;
   an operation device;
   an operation valve configured to change the angle of the swashplate of the traveling pump according to operation of the operation device;
   an actuation valve provided upstream or downstream of the operation valve and fluidly connected to the operation valve; and
   a controller configured or programmed to output a control signal to control the actuation valve in such a way that, when the traveling change-over valve is shifted from the second state to the first state, a value of the control signal is reduced from a set value to a mitigation value less than the set value and then restores to the set value, wherein
   the controller is configured or programmed to reduce the value of the control signal from the set value to the mitigation value for a mitigation period in such a way that a first reduction rate that is a rate of reducing the value of the control signal for a first part of the mitigation period between a start point thereof and an intermediate point thereof is larger than a second reduction rate that is a rate of reducing the value of the control signal for a second part of the mitigation period between the intermediate point thereof and an end point thereof.

2. The working machine according to claim 1, wherein the controller includes
   a setting unit configured or programmed
      to set a first line representing the first reduction rate that is a first reduction amount per unit time kept constant for the first part of the mitigation period between the start point thereof and the intermediate point thereof, and
      to set a second line representing the second reduction rate that is a second reduction amount per unit time kept constant for the second part of the mitigation period between the intermediate point thereof and the end point thereof, the second reduction amount being less than the first reduction amount, and a control unit configured or programmed to control the first reduction rate and the second reduction rate based on the first line and the second line set by the setting unit.

3. The working machine according to claim 2, wherein the control unit is configured or programmed to control the first reduction rate and the second reduction rate based on the first line and the second line when a traveling load is not less than a predetermined threshold value.

4. The working machine according to claim 3, wherein the setting unit is configured or programmed to change the value of the control signal at a bending point defined as a boundary point between the first line and the second line based on the traveling load when the traveling change-over valve is shifted from the second state to the first state.

5. The working machine according to claim 3, wherein the setting unit is configured or programmed to adopt, as the traveling load, the highest pressure of the hydraulic pressure delivered from the traveling pump.

6. The working machine according to claim 4, wherein the setting unit is configured or programmed
to shift the value of the control signal at the bending point toward the set value as the traveling load becomes larger, and
to shift the value of the control signal at the bending point toward the mitigation value as the traveling load becomes smaller.

7. The working machine according to claim 1, wherein the controller is configured or programmed to restore, after the reduced value of the control signal reaches the mitigation value, the set value of the control signal by increasing the value of the control signal at a restoration amount per unit time, the restoration amount per unit time being larger than the second reduction amount per unit time that is the second reduction rate.

8. A working machine comprising:
a prime mover;
a traveling pump driven by power of the prime mover so as to deliver hydraulic fluid;
a traveling motor configured to be rotated by the hydraulic fluid delivered from the traveling pump so as to have a rotation speed shiftable between a first speed and a second speed higher than the first speed;
a machine body provided thereon with the prime mover, the traveling pump and the traveling motor;
a traveling change-over valve shiftable between a first state to set the rotation speed of the traveling motor to the first speed and a second state to set the rotation speed of the traveling motor to the second speed;
a speed-shift switch operable to issue a speed-shift command that is either one of an acceleration command and a deceleration command;
an actuation valve configured to control hydraulic fluid flowing to the traveling pump; and
a controller configured or programmed to selectively perform either automatic deceleration to shift the traveling change-over valve from the second state to the first state or manual deceleration to shift the traveling change-over valve from the second state to the first state according to the speed-shift command issued by the speed-shift switch, wherein the controller is configured or programmed to be capable of performing a first shock mitigation control to reduce an opening degree of the actuation valve and a second shock mitigation control to reduce the rotation speed of the prime mover.

9. The working machine according to claim 8, wherein the controller is configured or programmed
to perform the first shock mitigation control when performing the automatic deceleration, and
to perform the first shock mitigation control or the second shock mitigation control when performing the manual deceleration.

10. The working machine according to claim 9, wherein the controller is configured or programmed to set the opening degree of the actuation valve in the first shock mitigation control when performing the manual deceleration as larger than the opening degree of the actuation valve in the first shock mitigation control when performing the automatic deceleration.

11. The working machine according to claim 8, wherein the actuation valve is configured to change the opening degree thereof in correspondence to a control signal output from the controller, and
the controller is configured or programmed
to perform the first shock mitigation control by reducing a value of the control signal to a first mitigation value, and
to perform the second shock mitigation control by reducing the rotation speed of the prime mover to a second mitigation value less than a target rotation speed of the prime mover.

12. The working machine according to claim 10, wherein the controller, when performing the first shock mitigation control, is configured or programmed to reduce the value of the control signal output to the actuation valve to the first mitigation value for a first mitigation period in such a way that a first reduction rate that is a rate of reducing the value of the control signal for a first part of the mitigation period between a start point thereof and an intermediate point thereof is larger than a second reduction rate that is a rate of reducing the value of the control signal for a second part of the mitigation period between the intermediate point thereof and an end point thereof.

13. The working machine according to claim 11, wherein the controller, when performing the second shock mitigation control, is configured or programmed to reduce an actual rotation speed of the prime mover for a second mitigation period until the reduced actual rotation speed reaches the mitigation value in such a way that a third reduction rate that is a rate of reducing the actual rotation speed of the prime mover is kept constant for the second mitigation period.

14. A working machine comprising:
a traveling device travelably supporting a machine body;
a traveling pump to deliver hydraulic fluid;
a traveling motor configured to be rotated by the hydraulic fluid delivered from the traveling pump so as to output power to the traveling device;
a traveling change-over valve configured to shift an operation state thereof so as to shift a rotation speed of the traveling motor;
an actuation valve configured to change an operation state thereof so as to change the delivery rate of hydraulic fluid delivered from the traveling pump; and
a controller to control the traveling change-over valve and the actuation valve, wherein the controller, when shifting the rotation speed of the traveling motor, is configured or programmed
to output a first control signal to control the operation state of the actuation valve and change a control value of the first control signal output therefrom in such a way that the control value of the first control signal is changed to a mitigation value such as to reduce the delivery rate of hydraulic fluid delivered from the traveling pump to a value less than that corresponding to a set value of the control value, and then is set to the set value, and
during the changing of the control value of the first control signal, the controller is configured or programmed
to perform a shock mitigation control for mitigating a speed-shift shock by shifting the operation state of the traveling change-over valve, and
to change a value of a control parameter for performing the shock mitigation control in correspondence to a traveling speed of the machine body.

15. The working machine according to claim 14, further comprising:
a prime mover serving as a power source for the traveling pump; and
a first detection device configured to detect a rotation speed of the prime mover, wherein
a value of either a first change rate or a first change amount of changing the control value of the first control signal to the mitigation value or a length of a delay time of shifting the operation state of the traveling change-over valve after start of changing the control value of the first control signal toward the mitigation value is defined as the control parameter, and
the controller is configured or programmed to change the first change rate, the first change amount or the delay time defined as the control parameter in correspondence to the rotation speed of the prime mover detected by the first detection device.

16. The working machine according to claim 15, wherein the controller is configured or programmed to increase the first change rate or the first change amount or elongate the delay time according to increase of the rotation speed of the prime mover.

17. The working machine according to claim 14, wherein the traveling change-over valve is shiftable between a first state to set the rotation speed of the traveling motor to a first speed and a second state to set the rotation speed of the traveling motor to a second speed faster than the first speed, and
the controller, when performing the shock mitigation control in reduction of the rotation speed of the traveling motor from the second speed to the first speed, is configured or programmed
to change a control value of the first control signal to the mitigation value before setting the set value, and
to shift the traveling change-over valve from the second state to the first state during the change of the control value of the first control signal from the mitigation value to the set value.

18. The working machine according to claim 14, further comprising:
a speed-shift switch operable to issue a speed-shift command, wherein
the controller is configured or programmed to selectively perform either automatic speed-shift to automatically shift the rotation speed of the traveling motor or manual speed-shift to shift the rotation speed of the traveling motor according to the speed-shift command issued by the speed-shift switch,
the controller, when performing each of the automatic speed-shift and the manual speed-shift, is configured or programmed to perform the shock mitigation control, and
the controller is configured or programed to change a value of the control parameter in each of the automatic speed-shift and the manual speed-shift.

19. The working machine according to claim 18, wherein the controller is configured or programmed to selectively perform either automatic deceleration to automatically reduce the rotation speed of the traveling motor when a predetermined deceleration condition is satisfied or manual deceleration to reduce the rotation speed of the traveling motor according to the speed-shift command issued by the speed-shift switch,
the controller, when performing each of the automatic deceleration and the manual deceleration, is configured or programmed to change a control value of a second control signal input to a proportional solenoid valve serving as the traveling change-over valve so as to shift the traveling change-over valve into a state to reduce the rotation speed of the traveling motor,
a second change rate of changing a control value of the second control signal and a shifting period included in the delay time are each defined as the control parameter, the shifting period extending from start of changing the control value of the second control signal until the operation state of the traveling change-over valve is completely shifted, and
the controller, when each of the automatic deceleration and the manual deceleration, is configured or programmed to change a value of the second change rate and a length of the shifting period, which are each defined as the value of the control parameter.

20. The working machine according to claim 19, wherein the controller is configured or programmed to selectively perform either automatic acceleration to automatically increase the rotation speed of the traveling motor when a predetermined acceleration condition is satisfied or manual acceleration to increase the rotation speed of the traveling motor according to the speed-shift command issued by the speed-shift switch,
the controller, when performing each of the automatic acceleration and the manual acceleration, is configured or programmed to change the control value of the second control signal input to the proportional solenoid valve serving as the traveling change-over valve so as to shift the traveling change-over valve into a state to increase the rotation speed of the traveling motor,
the controller is configured or programmed to change the value of the second change rate as the control parameter and the length of the shifting period as the control parameter in each of the automatic acceleration and the manual acceleration, and
the controller is configured or programmed so that
the second change rate of changing the control value of the second control signal when performing the automatic deceleration is greater than the second change rate of changing the control value of the second control signal when performing the manual deceleration, or the second change rate of changing the control value of the second control signal when performing the automatic acceleration is greater than the second change rate of changing the control value of the second control signal when performing the manual acceleration, and the shifting period when performing the automatic speed-shift is shorter than the shifting period when performing the manual speed-shift.

* * * * *